United States Patent
Kondo

(10) Patent No.: US 8,019,476 B2
(45) Date of Patent: Sep. 13, 2011

(54) CONTROL DEVICE, CONTROL METHOD, RECORDING MEDIUM, PROGRAM, AND BUILDING

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 10/570,617

(22) PCT Filed: Sep. 8, 2004

(86) PCT No.: PCT/JP2004/013051
§ 371 (c)(1),
(2), (4) Date: Jan. 17, 2007

(87) PCT Pub. No.: WO2005/026488
PCT Pub. Date: Mar. 24, 2005

(65) Prior Publication Data
US 2007/0118831 A1    May 24, 2007

(30) Foreign Application Priority Data

Sep. 8, 2003 (JP) ................ 2003-315455
Sep. 17, 2003 (JP) ................ 2003-324046
Oct. 21, 2003 (JP) ................ 2003-360189

(51) Int. Cl.
G05B 11/01 (2006.01)
G05B 9/02 (2006.01)
G05B 15/00 (2006.01)
G05B 23/02 (2006.01)
G06F 19/00 (2006.01)
G08B 29/00 (2006.01)
G08B 25/00 (2006.01)

(52) U.S. Cl. .............. 700/275; 700/17; 700/27; 700/80; 700/83; 700/108; 340/3.7; 340/506; 340/511; 340/525

(58) Field of Classification Search ............... 700/17, 700/27, 80, 83, 96, 108, 275; 340/560, 511, 340/525, 506
See application file for complete search history.

(56) References Cited

U.S. PATENT DOCUMENTS 4,418,333 A * 11/1983 Schwarzbach et al. .. 340/310.11
(Continued)

FOREIGN PATENT DOCUMENTS

JP    3-221639    9/1991
(Continued)

Primary Examiner — Albert Decady
Assistant Examiner — Jennifer L Norton
(74) Attorney, Agent, or Firm — Oblon, Spivak, McClelland, Maier & Neustadt, L.L.P.

(57) ABSTRACT

The present invention relates to a control device, control method, recording medium, and program, and building, wherein intelligent and active integration of electronic apparatuses and dwelling-places can be realized. A receiving unit 21 receives broadcasting signals, and supplies the signals to a receiving information determining unit 22. The receiving information determining unit 22 acquires a voice signal from the broadcasting signals supplied from the receiving unit 21, and a voice recognizing unit 23 subjects the voice signal to speech recognition. A determining unit 24 detects danger information such as information relating to a person such as a burglar, or information relating to a district where the person has appeared, or the like from the voice signal subjected to speech recognition by the voice recognizing unit 23. An actuator control unit 28 controls, by deforming the shape of a shape-variable member disposed around a building gap based on the danger information detected by the determining unit 24, the status of the facility of the building. That is to say, the actuator control unit 28 controls, for example, a door to be locked. The present invention can be applied to, for example, a house having a door.

20 Claims, 56 Drawing Sheets

U.S. PATENT DOCUMENTS

| | | | | |
|---|---|---|---|---|
| 5,003,800 A | * | 4/1991 | Bublewicz | 70/264 |
| 5,227,121 A | * | 7/1993 | Scarola et al. | 376/216 |
| 5,586,254 A | * | 12/1996 | Kondo et al. | 714/25 |
| 5,818,710 A | * | 10/1998 | LeVan Suu | 700/12 |
| 5,927,019 A | * | 7/1999 | Ichida | 49/501 |
| 6,059,230 A | * | 5/2000 | Leggett et al. | 244/129.5 |
| 6,275,617 B1 | * | 8/2001 | Kondo | 382/236 |
| 6,298,603 B1 | * | 10/2001 | Diaz | 49/68 |
| 6,492,901 B1 | * | 12/2002 | Ridolfo | 340/506 |
| 6,990,489 B2 | * | 1/2006 | Kondo et al. | 707/8 |
| 7,650,520 B2 | * | 1/2010 | Shaffer et al. | 713/300 |
| 2003/0135539 A1 | * | 7/2003 | Kondo et al. | 709/201 |
| 2004/0098915 A1 | * | 5/2004 | Baldry | 49/339 |
| 2004/0268264 A1 | * | 12/2004 | Kondo | 715/751 |
| 2007/0201107 A1 | * | 8/2007 | Ando et al. | 358/468 |

FOREIGN PATENT DOCUMENTS

| | | |
|---|---|---|
| JP | 3-123005 | 12/1991 |
| JP | 4-131482 | 5/1992 |
| JP | 06-046479 | 2/1994 |
| JP | 07-095475 | 4/1995 |
| JP | 7-29275 | 6/1995 |
| JP | 8-13817 | 1/1996 |
| JP | 9-235945 | 9/1997 |
| JP | 10-280821 | 10/1998 |
| JP | 2000-122767 | 4/2000 |
| JP | 2000-172394 | 6/2000 |
| JP | 2001-090356 | 4/2001 |
| JP | 2001-155277 | 6/2001 |
| JP | 2001-333030 | 11/2001 |
| JP | 2002-290765 | 10/2002 |
| JP | 2002-290848 | 10/2002 |
| JP | 2002-325215 | 11/2002 |
| JP | 2002-349108 | 12/2002 |
| JP | 2003-184370 | 7/2003 |
| JP | 2003-187366 | 7/2003 |
| JP | 2003-219287 | 7/2003 |
| JP | 2004-245041 | 9/2004 |

* cited by examiner

FIG. 7

| RELEVANT DISTRICT LIST | MUST | DISTRICT |
|---|---|---|
| | | A TOWN |
| | | B TOWN |
| | | C TOWN |
| | | ... |

| STATUS LIST | STATUS |
|---|---|
| | UNDER INVESTIGATION |
| | IN FLIGHT |
| | IN HIDING |
| | ... |

| PERSON LIST | PERSON |
|---|---|
| | INTRUDER |
| | THIEF |
| | SUSPECT |
| | ... |

| PERSONAL BELONGINGS LIST | PERSONAL BELONGINGS |
|---|---|
| | DEADLY WEAPON |
| | GUN |
| | KNIFE |
| | ... |

FIG. 14

| RELEVANT DISTRICT LIST | MUST | |
|---|---|---|
| | DEGREE OF DANGER | DISTRICT |
| | 1 | A TOWN |
| | 2 | B TOWN |
| | 3 | C TOWN |
| | ... | ... |

| STATUS LIST | | |
|---|---|---|
| | DEGREE OF DANGER | STATUS |
| | 3 | UNDER INVESTIGATION |
| | 3 | IN FLIGHT |
| | 1 | IN HIDING |
| | ... | ... |

| PERSON LIST | | |
|---|---|---|
| | DEGREE OF DANGER | PERSON |
| | 2 | INTRUDER |
| | 2 | THIEF |
| | 2 | SUSPECT |
| | ... | ... |

| PERSONAL BELONGINGS LIST | | |
|---|---|---|
| | DEGREE OF DANGER | PERSONAL BELONGINGS |
| | 2 | DEADLY WEAPON |
| | 1 | GUN |
| | 1 | KNIFE |
| | ... | ... |

FIG. 23

| ELECTRIC SOCKET | ELECTRONIC APPLIANCE |
|---|---|
| 121-1 | IRON ELECTRIC POT |
| 121-2 | ELECTRIC HEATER |
| 121-3 | REFRIGERATOR MICROWAVE OVEN |
| 121-4 | PC |

FIG. 24

| PRIORITY ORDER | ELECTRONIC APPLIANCE |
|---|---|
| 1 | IRON |
| 2 | ELECTRIC HEATER |
| 3 | ELECTRIC COOKER |
| 4 | ELECTRIC HOT-WATER POT |
| 5 | REFRIGERATOR |
| ⋮ | ⋮ |

FIG. 25

| PRIORITY ORDER | ELECTRONIC APPLIANCE |
|---|---|
| M | PC |
| M-1 | LIGHTS |
| ⋮ | ⋮ |

FIG. 26

| POWER-OFF ORDER | ELECTRONIC APPLIANCE | ELECTRIC SOCKET |
|---|---|---|
| 1 | IRON | . . . . |
| 2 | ELECTRIC HEATER | . . . . |
| 3 | ELECTRIC HOT-WATER POT | . . . . |
| 4 | REFRIGERATOR | . . . . |
| ⋮ | ⋮ | ⋮ |
| N-1 | LIGHTS | . . . . |
| N | PC | . . . . |

FIG. 31

| RELEVANT DISTRICT LIST | LEVEL OF IMPORTANCE | DISTRICT |
|---|---|---|
| | 1 | HOKKAIDO REGION |
| | 2 | TOHOKU REGION |
| | 3 | KANTO REGION |
| | ... | ... |

| KEYWORD LIST | LEVEL OF IMPORTANCE | KEYWORD |
|---|---|---|
| | 2 | FLOOD |
| | 2 | HEAVY RAIN |
| | 2 | TYPHOON |
| | ... | ... |

FIG. 44

```
ACQUISITION INFORMATION → MODIFICATION OF POSITION

SUNSHINE → THE POSITION OF THE CLOTHES-DRYING ROOM: A POSITION WHERE
           THE SUN HITS
PERIOD-OF-TIME (MORNING) → THE POSITION OF THE BEDROOM: NEARBY THE FRONT DOOR
PERIOD-OF-TIME (NIGHT) → THE POSITION OF THE BEDROOM: A POSITION WHERE
                         THE MORNING SUN HITS
IN USE → THE POSITION OF THE LIVING ROOM: A SCENIC POSITION
NOT IN USE → THE POSITION OF THE LIVING ROOM: AN ARBITRARY POSITION
PEOPLE'S ACTION → THE POSITION OF THE LIVING ROOM (A POSITION WITHOUT WINDOWS)
 (VIEWS LISTENS TO DVD OR THE LIKE)
WEATHER FORECAST → THE POSITION OF THE CLOTHES-DRYING ROOM: LIVING ROOM
```

FIG. 49

```
1: MAKE IT TRANSPARENT
2: MAKE IT TRANSLUCENT
3: MAKE IT OPAQUE
4: WALLPAPER PATTERN
5: CURTAIN PATTERN
6: SHOJI PATTERN
7: OUTER SCENERY (CAMERA IMAGE)
8: LANDSCAPE IMAGE
9: REGISTERED IMAGE
```

FIG. 50

```
1: WALLPAPER PATTERN
2: CURTAIN PATTERN
3: SHOJI PATTERN
4: OUTER SCENERY (CAMERA IMAGE)
5: LANDSCAPE IMAGE
6: VASE
7: PAINTING
8: BOOKSHELF IMAGE
9: REGISTERED IMAGE
```

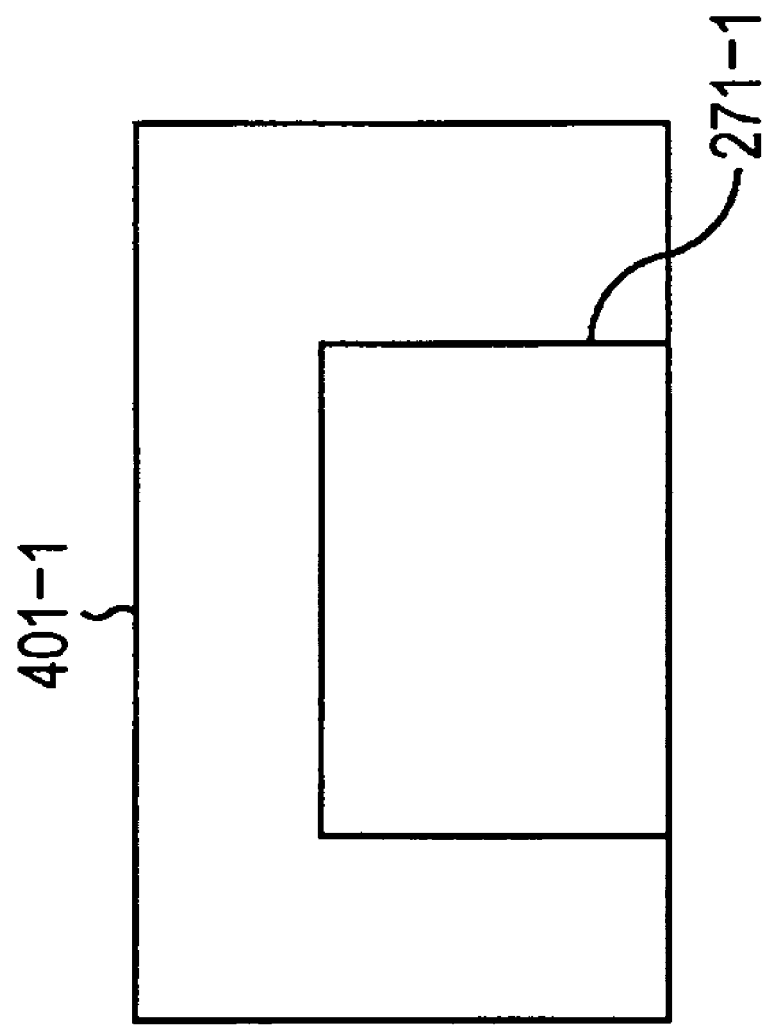

FIG. 56

| GENRE | RESIDENT | PRIORITY ORDER |
|---|---|---|
| SPORTS IN GENERAL | MR. A, MR. B, MR. C | 4 |
| SOCCER | MR. A, MR. B | 2 |
| MLB | MR. A, MR. C | 3 |
| ANIMATION | MR. D, MR. E | 5 |
| NEWS IN GENERAL | MR. D | 1 |
| DRAMA | MR. C, MR. E | 6 |

| RESIDENT | ROOM | DISPLAY | SENSOR |
|---|---|---|---|
| MR. A | ROOM #1 | DISPLAY #1, SP #1 | SENSOR #1 |
| MR. B | ROOM #2 | DISPLAY #2, SP #2 | SENSOR #2 |
| MR. C | ROOM #3 | DISPLAY #3, SP #3 | SENSOR #3 |
| MR. D | ROOM #4 | DISPLAY #4, SP #4 | SENSOR #4 |
| MR. E | ROOM #5 | DISPLAY #5, SP #5 | SENSOR #5 |

CONTROL DEVICE, CONTROL METHOD, RECORDING MEDIUM, PROGRAM, AND BUILDING

TECHNICAL FIELD

The present invention relates to a control device and control method, recording medium, program, and a building, and particularly relates to a control device and control method, recording medium, program, and a building, wherein control is performed with regard to a building.

BACKGROUND ART

Conventional dwelling-places have been for enduring rain, dew, and so forth, but electronic apparatuses such as so-called electric appliances (home electronic apparatuses) have been spread through many homes with the times, so that the demand of people to dwelling-places has changed and integration of electronic apparatuses and dwelling-places has been demanded. Note that hereinafter, dwelling-places are also referred to as a house or residence system.

An example of electronic apparatuses and dwelling-places being united and integrated (morphotype) is a residence called a TRON residence which includes an electric door which is electrically opened and closed, an automatic opening-and-closing window which is automatically opened and closed, a chair with a pulse measurement function of which measurement results can be transmitted and received via a network or the like, and a control device which can control all of the electronic apparatuses in the case in which the electronic apparatuses include a CPU (Central Processing Unit). As for a method for electrically opening and closing a door, a method has been known wherein an object on a doorway is detected by casting emitted light of the light emitting element of a luminescence unit on a floor as two or more spot lights through a division lens, and a door is electrically opened and closed depending on the detection result, for example (e.g., see Patent Document 1).

Also, various arrangements have been made to conventional houses, such as sliding shutters or double-glazed windows to prevent intrusion of burglars or the like.

Description will be made regarding a door provided to a conventional house with reference to FIG. 1. With a conventional house, for example, a door panel 4 which is opened and closed towards the inside or outside the house for going in and out from the house is fixed and jointed to an outer wall 1 making up the wall outside the house using screws with two hinges of a hinge 6-1 and hinge 6-2 serving as joint members.

Between the outer wall 1 and the door panel 4, i.e., between the edge portion (hereinafter, referred to as outer wall edge as appropriate) of an opening portion which is opened for providing the door panel 4 and an outer edge 3 serving as the frame portion of the outer edge of the door panel 4, a gap 2 is provided. The gap 2 is provided for preventing cases wherein it becomes impossible to open and close the door panel 4 smoothly without resistance due to the temperature of the atmosphere surrounding the door panel 4 or the outer wall 1 changing, which causes the outer wall 1 or the door panel 4 to expand and change in shape, leading to the outer wall edge of the outer wall 1 and the outer edge 3 of the door panel 4 fitting tightly against each other.

The door panel 4 is attached with a doorknob 5, hinge 6-1, and hinge 6-2. The door panel 4 is an outward-opening door or inward-opening door, and is opened and closed towards the inside or outside the house with the hinge 6-1 and hinge 6-2 joined at the left end of the door panel 4 serving as fulcrums in FIG. 1 by a person who goes in and out from the house grasping the doorknob 5 attached to the door panel 4 to twist it to the right or left, further pulling the doorknob 5 to the front or pushing out the doorknob 5 from the state twisted to the right or the left.

The doorknob 5 is provided with a lock mechanism, of which the inside is not shown. The door panel 4, which is opened and closed at the time of going in and out the house, can be locked with the lock mechanism not shown. Accordingly, in the event that the door panel 4 is locked with the lock mechanism equipped with the doorknob 5, even if a person grasps the doorknob 5 to attempt to twist it to the right or left, the person cannot twist the doorknob 5, so cannot open and close the door panel 4 towards outside or inside the house.

The hinge 6-1 and hinge 6-2 are joint members which join the outer wall 1 to the door panel 4, and are configured such that two plates are combined as a pair, one edges of the respective two plates are joined at a rod shaft, and thus, the two plates are opened and closed with the rod shaft serving as a base shaft. One plate of the hinge 6-1 and hinge 6-2 is fixed to the left frame, which is the left end portion of the outer edge 3 of the door panel 4, with the screws, and further the other plate of the hinge 6-1 and hinge 6-2 is fixed to the outer wall 1 with the screws, whereby the door panel 4 and the outer wall 1 are joined such that the door panel 4 can be opened and closed.

On the other hand, with Patent Document 2, a key device is described wherein a key body is changed to an unlocked state by a code serving as an optical signal being exchanged between a key such as a key plate for example and a key body in which a latch mechanism is built in, these being combined to form a the key device, for example.

Further, with Patent Document 3, a power supply device for an electric appliance is described wherein a computer detects the value of a current flowing in an electric appliance from an electric socket for connecting the appliance, and in the event that determination is made that the electric appliance is in a standby state, power supply to the electric appliance is shut off.

Incidentally, examples of a common device utilized within a building (indoor) such as a residence, public facility, and the like include a receiving device which receives a broadcasting signal such as terrestrial analog broadcasting/BS (Broadcasting Satellite) or CS (Communication Satellite) digital broadcasting/terrestrial digital broadcasting, and outputs the received image or voice to a display or speaker connected thereto. Such a receiving device is employed as a television receiver or the like, for example. In other words, a device in which the receiving device, display, and speaker are integrated is, for example, a television receiver.

The receiving device outputs the broadcasting signal of the channel tuned in by a user operating a remote commander (hereinafter, referred to as remote control) or the like attached to the receiving device to the display and speaker as an image or voice. Thus, the user can view and listen to a program of the tuned-in channel.

In recent years, with digital broadcasting which has been rapidly spread, the number of channels tuned in by a user has become great, and thus, the user sometimes feels the operation for tuning in the channel which is broadcasting the desired program to be troublesomeness.

Examples of such a receiving device for receiving a digital broadcasting signal, in order to improve the operability of a user, include a receiving device wherein preferred channels are registered such that the receiving device can tune in the desired channel quickly from the broadcasting signals of a great number of channels received by the receiving device (e.g., see Patent Document 4).

Also, with some receiving devices, an arrangement is made wherein there is no need for channel switching operations by creating a virtual channel in which the desired program alone specified by a user is selected and broadcasted (e.g., see Patent Document 5).

The receiving device which is applied to a conventional television receiver and the like as described above is for realizing improvement of operability in the case of a user tuning in a channel.

[Patent Document 1] Japanese Unexamined Patent Application Publication No. 2003-003750

[Patent Document 2] Japanese Unexamined Patent Application Publication No. 5-141139 (Japanese Patent No. 3286995)

[Patent Document 3] Japanese Unexamined Patent Application Publication No. 2002-186187 (Japanese Patent No. 3417919)

[Patent Document 4] Japanese Unexamined Patent Application Publication No. 2000-165769

[Patent Document 5] Japanese Unexamined Patent application Publication No. 2000-341596

DISCLOSURE OF INVENTION

However, with conventional integration forms between electronic apparatuses and dwelling-places, the electronic apparatuses have electrically performed only what a person has performed within the dwelling-places. That is to say, for example, an electric door electrically opens and closes a door instead of a person opening and closing the door, and an automatic opening-and-closing window automatically opens and closes a window instead of a person opening and closing the window.

Accordingly, with the conventional integration forms between electronic apparatuses and dwelling-places, the electronic apparatuses perform operations as to facilities present in the dwelling-places instead of a person, so this cannot be called as intelligent and active integration between electronic apparatuses and dwelling-places. That is to say, it has been difficult to operate the facilities of dwelling-places so as to dynamically determine a surrounding situation, and let people live more comfortable lives.

FIG. 2 illustrates a state wherein the lock mechanism of the doorknob 5 in FIG. 1 has been destroyed.

In FIG. 2, in the event that the unshown lock mechanism of the doorknob 5 has been destroyed due to a certain cause, the door panel 4 is in a state in which anyone can easily open and close it. This case allows burglars, robbers, and the other prowlers to open the door panel 4 and easily invade the house.

Accordingly, for example, in a case wherein no user is present in a house, it is preferable for the house to operate intelligently and also dynamically such that the house itself can recognize danger information all the time, and correspond to the danger information all the time, for example, when receiving an airwave which is broadcasting the report which tells of a risk threatening safety, such as incident information that a burglar has struck near the house, or disaster information that a typhoon has landed and that warnings, such as heavy rain and flooding warnings, have been issued, by perceiving danger from the contents of the broadcast received, for example, such that even if a burglar destroys the key, the house prevents the burglar from opening and closing the door automatically, or, in order to prevent the damage of electric shock and fire by short-circuiting as the result of flooding or water immersion, the house automatically turns power supply to electronic appliances off.

However, heretofore, crime prevention measure as to a prowler and the like, and behavior such as turning power supply to electronic apparatuses on/off have been performed by a person perceiving danger, i.e., a person performs those by operating the facilities of a house as necessary. Accordingly, in the event of no persons being present in the house, or even if a person is present but is in a panic, it is impossible to prevent a prowler or the like from invading from the door or a window, or to take measures such as turning off the power supply to electronic appliances, in real-time in light of danger, so countermeasures for danger prevention are far from sufficient.

Also, no receiving device of which user operability is improved by integrating (associating) the receiving device with a building in which it is installed has been proposed. For example, in the event that there are multiple users who inhabit a building such as a residence, the room frequently utilized by each of the multiple users is determined as his/her own room, for example. Accordingly, associating the respective rooms of the building with the receiving devices to be installed therein enables the receiving device to tune in to broadcasting set to the user of that room, so it is convenient for the user to readily view and listen to his/her preferred programs.

Further, no arrangement has been proposed so far wherein the facilities within a building are aggressively (spontaneously (dynamically)) driven (run) in conjunction with the contents of a broadcasting signal which is received by a receiving device within the building. For example, with a building such as a residence, an automatic door or the like has been provided for automatically opening and closing the door of the entrance or a window, but is for mechanically driving the facilities within the building simply instead of the labor of a person, so is not related to a receiving device within the building.

The present invention has been made in light of such a situation, and it is an object of the present invention to realize intelligent active integration between electronic apparatuses and dwelling-places.

A control device according to the present invention comprises: control means for changing the configuration of at least one component, of components making up a building; and acquiring means for acquiring status information; wherein the control means change the configuration physically or visually based on the status information acquired by the acquiring means.

The status information may be information which is transmitted by broadcasting.

The status information may be information indicating the status of a person present in the component, illumination in the component, temperature in the component, volume in the component, information to be transmitted by broadcasting, or point-in-time.

The control device may further comprise status information storing means which stores a list relating to the status information.

The control means may capable of changing the configuration by deforming the shape of a shape-variable member disposed around a gap formed in the building based on the status information.

The control device may further comprise determining means for determining importance of the status information, and the control means deform the shape of the shape-variable member based on the importance.

The control device may further comprise status information storing means storing a list which associates the status information with the importance of the status information thereof.

The shape variable member may change in shape by being subjected to application of pressure under a predetermined condition, the control means comprising: preparing means for performing preparation, by giving a predetermined condition to the shape-variable member, to deform the shape thereof; pressure measurement means for measuring pressure applied to the shape-variable member by an actuator for applying pressure; and actuator control means for controlling the actuator which applies pressure to the shape-variable member depending on the pressure value to be measured by the pressure measurement means.

The shape-variable member may change in shape by being subjected to application of pressure under a predetermined condition in which the shape-variable member is in a electricity conducting state.

The shape-variable member may make transition to a shape-fixed state in which the shape thereof is not changed, and a shape-variable state in which the shape thereof can be changed.

The shape-variable member may be made up of shape memory alloy.

The control means may change the configuration relating to power supply to an electric socket installed in the building based on the status information.

The control device may further comprise order storing means storing a list relating to the order for shutting off power supply to an electronic appliance connected to the electric socket, and the control means shut off power supply to the electric socket connected with the electronic appliance in the order in accordance with the list.

The control device may further comprise correlation acquiring means for acquiring the correlation between the electric socket and the electronic apparatus connected to the electric socket, and the control means shut off power supply to an electric socket connected with the electronic apparatus based on the correlation.

The correlation acquiring means may acquire the correlation, in the event of the status information being acquired by the acquiring means.

The plug of the electronic apparatus connected to the electric socket may comprise: storing means storing identification information which identifies said electronic apparatus; and an antenna for transmitting said identification information stored in said storing means using airwaves, and the correlation acquiring means recognize the electronic apparatus based on the identification information transmitted by the antenna.

The correlation acquiring means may recognize said electronic apparatus connected to the electric socket using a wireless tag.

The plug of the electronic apparatus connected to the electric socket may transmit identification information which identifies the electronic apparatus using airwaves, and the correlation acquiring means receive the identification information using the airwaves through an antenna having directivity, and recognize the electronic apparatus from the identification information thereof.

The correlation acquiring means may recognize the position of the plug by receiving the airwaves transmitted from the plug of the electronic apparatus connected to the electric socket through an antenna having directivity, and recognize the correlation based on the position of the plug thereof.

The control device may further comprise determining means for determining importance of the status information acquired by the acquiring means, and the control means change the configuration relating to power supply to the electronic apparatus connected to the electric socket based on the importance.

The control device may further comprise status information storing means storing a list which associates the status information with the importance of the status information thereof.

The control device may further comprise: image display means for displaying an image; and function control means for changing the function of the image display means, and the function control means control the function of the image display means depending on the change of the configuration.

The image display means may be made up of a windowpane.

The function control means may change the transparency of the windowpane.

The control device may further comprise image display means for displaying an image, the image display means are made up of a wall, and the control means visually change the configuration by displaying the image on the image display means based on the status information.

A control method according to the present invention comprises: a control step for changing the configuration of at least one component of components making up a building; and an acquiring step for acquiring status information; wherein the processing in the control step changes the configuration physically or visually based on the status information acquired with the processing in the acquiring step.

A program recorded in a recording medium according to the present invention comprises: a control step for changing the configuration of at least one component, of components making up a building; and an acquiring step for acquiring status information; wherein the processing in the control step changes the configuration physically or visually based on the status information acquired with the processing in the acquiring step.

A program according to the present invention comprises a control step for changing the configuration of at least one component, of components making up a building; and an acquiring step for acquiring status information; wherein the processing in the control step changes the configuration physically or visually based on the status information acquired with the processing in the acquiring step.

A building according to the present invention comprises: control means for changing the configuration of at least one component of components making up a building; and acquiring means for acquiring status information; wherein the control means change the configuration physically or visually based on the status information acquired by the acquiring means.

The control device may be an independent device, or may be a block for performing the control processing of one device.

The control device, control method, recording medium, and program, and building according to the present invention acquire status information, and physically or visually change the configuration of at least one component based on the status information, of components making up the building.

According to the present invention, intelligent active integration between electronic apparatuses and dwelling-places can be realized.

BRIEF DESCRIPTION OF THE DRAWINGS

FIG. 7 is a diagram illustrating a danger information list stored in the memory 53 in FIG. 6.

FIG. 14 is a diagram illustrating a danger information list.

FIG. 23 is a diagram illustrating a connected electronic apparatus list.

FIG. 24 is a diagram illustrating an electronic-apparatus power-off order-of-priority list.

FIG. 25 is a diagram illustrating another example of an electronic-apparatus power-off order-of-priority list.

FIG. 26 is a diagram illustrating a connected electronic-apparatus order-of-off list.

FIG. 31 is a diagram illustrating a danger information list stored in the memory 103 in FIG. 30.

FIG. 44 is a diagram illustrating a relation example between the acquisition information acquired by an information acquiring unit and the positions of residence units determined by the unit-position determining unit.

FIG. 49 is a diagram illustrating examples of functions displayed on the windowpanes, in the event that the positions of the residence units are determined to be the positions where there is a window outside of the residence units.

FIG. 50 is a diagram illustrating examples of functions displayed on the windowpanes, in the event that the positions of the residence units are determined to be the positions where there is no window outside of the residence units.

FIG. 51A illustrates examples of the functions of a windowpane to be displayed on the windowpane of a wall of a residence unit.

FIG. 56 is a diagram describing data stored in the memory 636 in FIG. 55.

REFERENCE NUMERALS

Figure 1:
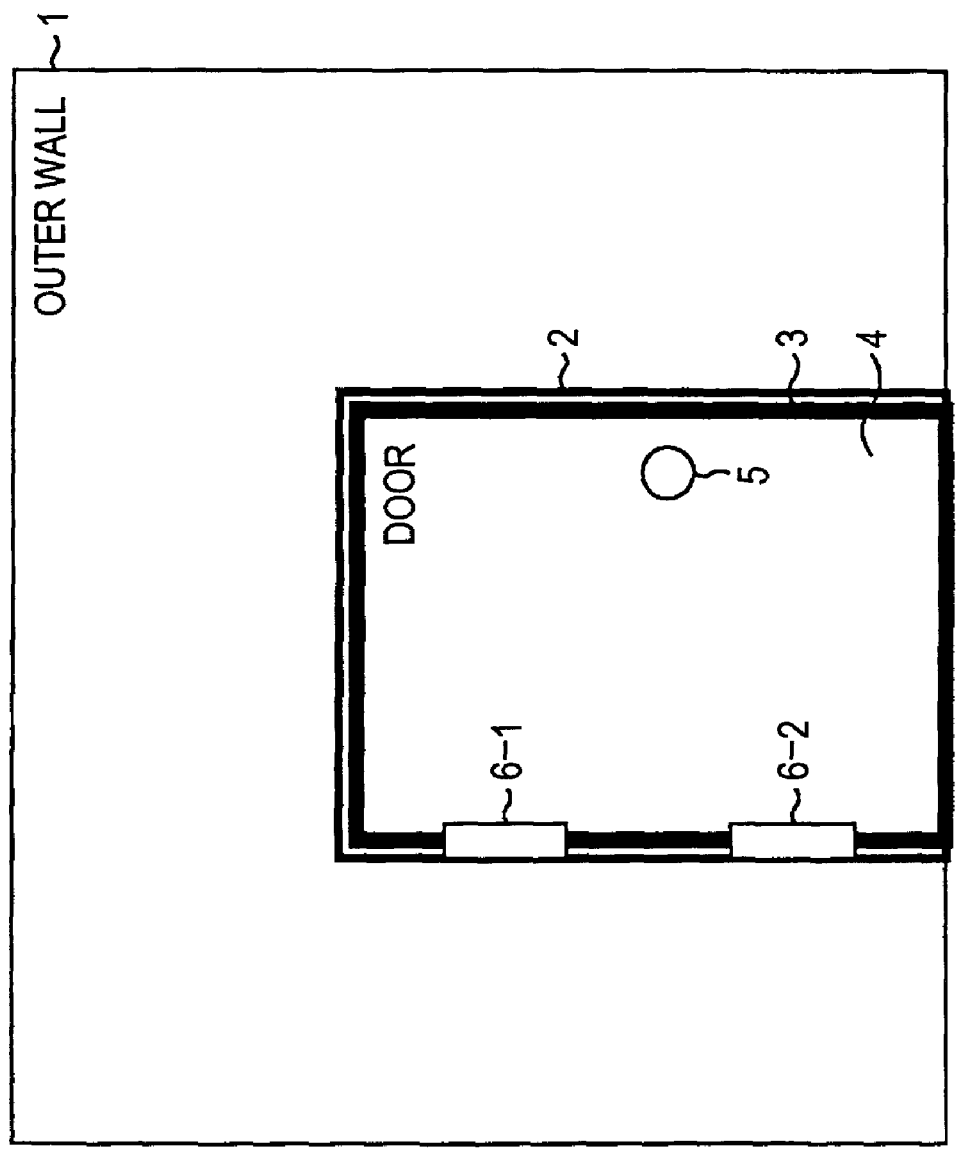
FIG. 1 is a diagram describing a door provided in a conventional house.
Figure 2:
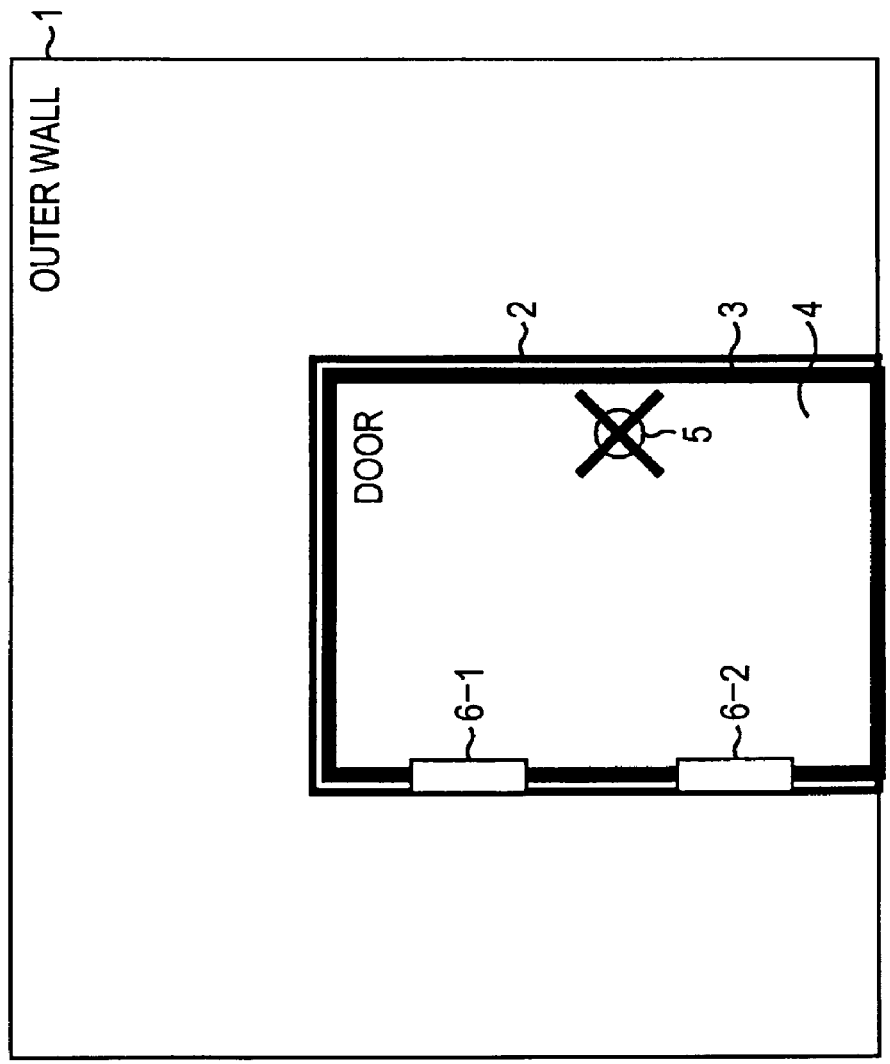
FIG. 2 is a diagram describing a case wherein the lock mechanism of the doorknob 5 in FIG. 1 is destroyed.

1 outer wall, 2 gap, 3 outside edge, 4 door panel, 5 doorknob, 6-1 hinge, 6-2 hinge, 7 transmitting unit, 11-1 through 11-3 doorframes, 12-1 through 12-3 electrodes, 13 sensor, 14 sensor switch, 15 actuator, 16 control device, 17 antenna, 21 receiving unit, 22 receiving information processing device, 23 voice recognizing unit, 24 determining unit, 25 storing unit, 26 power supply processing unit, 27 detecting unit, 28 actuator control unit, 30 control unit, 41 decoder unit, 42 matching unit, 43 memory, 51 memory, 52 danger information determining unit, 53 memory, 61 level-of-danger determining unit, 71 house, 72 antenna, 73 control device, 74-1 though 74-6 actuators, 75 room, 76 room, 77 room, 78 room, 79-1 switchboard, 79-2 switchboard, 80-1 power-distribution cable, 80-2 power-distribution cable, 81 iron, 82 electric heater, 83 refrigerator, 84 PC, 91 receiving unit, 92 receiving information processing unit, 93 voice recognizing unit, 94 determining unit, 95 detecting unit, 96 antenna, 97 power control unit, 101 memory, 102 danger information determining unit, 103 memory, 111 receiving unit, 112 ID acquiring unit, 113 information identifying unit, 114 priority-list creating unit, 115 information storing unit, 121-1 through 121-4 electric sockets, 131 plug, 132 ID storing unit, 133 transmitting unit, 134 antenna, 141 level-of-danger determining unit, 151 CPU, 152 ROM, 153 RAM, 154 bus, 155 input/output interface, 156 input unit, 157 output unit, 158 storing unit, 159 communication unit, 160 drive, 161 magnetic disk, 162 optical disc, 163 magneto-optical disc, 164 semiconductor memory, 201 building, 202 roof, 203-1 through 203-6 residence units, 211 sensor, 212-1 and 212-2 windows, 251-1 through 251-6 window frames, 252-1 through 252-2 doors, 271-1 through 271-6 windowpanes, 272-1 through 272-6 sliding portions, 290 control device, 291 information acquiring unit, 292 unit-position determining unit, 293 control unit, 294 driving unit, 311 broadcasting information extracting unit, 312 illumination sensor, 313 temperature sensor, 314 clock, 315 infrared sensor, 316 sound sensor, 317 action detecting unit, 350 control device, 351 control unit, 352 display image selecting unit, 353 video camera, 371 request acquiring unit, 372 function determining unit, 373 image storing unit, 374 transparency modifying unit, 375 function modifying unit, 376 image storing unit, 501 bus, 502 CPU, 503 ROM, 504 RAM, 505 hard disk, 506 output unit, 507 input unit, 508 communication unit, 509 drive, 510 input/output interface, 511 removable recording medium, 601 receiving device, 611 tuner, 612 demodulation unit, 613 error-correction processing unit, 614 demultiplexer, 615 video decoder, 616 audio decoder, 617 DRC unit, 618 synthesizing unit, 619 OSD unit, 620 and 621 selectors, 622-1 through 622-5 displays, 623-1 through 623-5 speakers, 631 controller, 632 key-input unit, 633 display unit, 634 remote-control I/F, 635 photo-receiving unit, 636 memory, 637-1 through 637-5 sensors, 721-1 through 721-5 cameras, 722-1 through 722-5 movie projector

BEST MODE FOR CARRYING OUT THE INVENTION

Hereinafter, description will be made regarding examples according to the present invention.

First Embodiment

Figure 3:
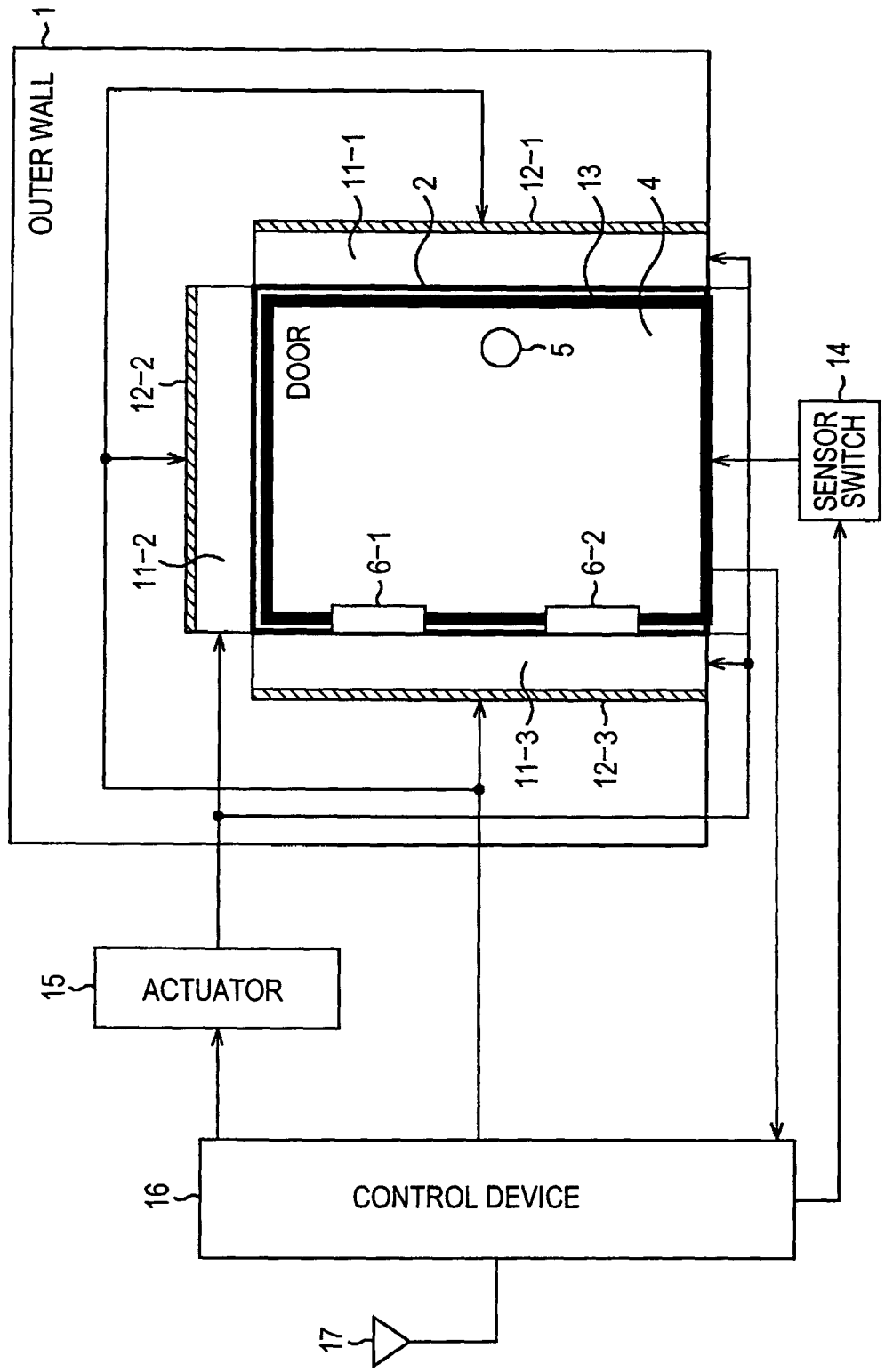
FIG. 3 is a diagram illustrating a configuration example of a house to which the present invention is applied, serving as a first embodiment.

FIG. 3 is a block diagram illustrating a configuration example of a house to which the present invention is applied, serving as a first embodiment. In FIG. 3, description of the same components as those in FIG. 1 will be omitted as appropriate.

Doorframe 11-1 through doorframe 11-3 are disposed on the outer wall 1 in FIG. 3. The doorframe 11-1 through doorframe 11-3 are made up of, for example, a shape memory alloy which is a shape-variable member having features of a shape-fixed state in which the shape cannot be changed, and a shape-variable state in which the shape can be changed by a current being flowed therein (an electricity conducting state). The doorframe 11-1 is disposed along the right frame which is the edge portion of the right end of the door panel 4, the doorframe 11-2 is disposed along the upper frame which is the edge portion of the upper end of the door panel 4, and the doorframe 11-3 is disposed along the left frame, respectively. That is to say, the doorframe 11-$j$ (wherein $j=1, 2, 3$) is disposed so as to surround the right frame, upper frame, and left frame of the door panel 4. Further, one plate of the hinge 6-1 and hinge 6-2, as with FIG. 1, is fixed to the left frame which is the left end portion of the door panel 4 with screws, and further, the other plate of the hinge 6-1 and hinge 6-2 is fixed to the outer wall 1 with screws, and thus, the door panel 4 is fixed outside so as to turn with the hinge 6-1 and hinge 6-2 serving as fulcrums.

Between the door panel 4 and the doorframe 11-$j$, the gap 2 is provided, as in FIG. 1. The reason why the gap 2 is provided is as described with FIG. 1.

An edge facing the frame of the door panel 4 of the doorframe 11-$j$, and the edge on the opposite side thereof, i.e., the edge jointed to the outer wall 1, have electrodes 12-$j$ attached thereto.

The electrodes 12-$j$ are connected to an unshown power source via the control device 16. Accordingly, voltage is applied from the power source to the electrodes 12-$j$ via the control device 16.

Upon voltage being applied to the electrode 12-$j$, current is applied to the doorframe 11-$j$ between the electrodes 12-$j$, in accordance with the voltage thereof. The shape-variable member which is the doorframe 11-$j$ enters a shape-variable state from the shape-fixed state upon current being applied thereto, i.e., when making the transition to an electricity conducting state. Further, the doorframe 11-$j$ enters a shape-variable state, and upon pressure being applied thereto from an actuator 15, the doorframe 11-$j$ changes its shape under the pressure. For example, upon pressure being applied to the direction where the width of the gap 2 becomes narrower, i.e., the direction where the door panel 4 is compressed, the doorframe 11-$j$ changes its shape to be jammed against the door panel 4 by pressure. Subsequently, upon application of voltage to the electrodes 12-$j$ being stopped, and the doorframe 11-$j$ between the electrodes 12-$j$ entering a state in which current is not applied thereto, the doorframe 11-$j$ makes transition to the shape-fixed state from the shape-variable state. In this case, the door panel 4 and the doorframe 11-$j$ are in a jammed state with no gaps therebetween, so it becomes difficult to open the door panel 4 even in an unlocked state.

On the other hand, in the shape-fixed state which is a jammed state wherein there is no gap 2 between the doorframe 11-*j* and the door panel 4, upon application of voltage to the electrodes 12-*j* being resumed, and the doorframe 11-*j* between the electrodes 12-*j* entering the state in which current is applied thereto, the doorframe 11-*j* takes transition to the shape-variable state from the shape-fixed state, and in the event that pressure is not applied from the actuator 15, the doorframe 11-*j* is restored to the original shape. Further, upon application of voltage to the electrode 12-*j* being stopped in a state restored to the original shape, the doorframe 11-*j* enters the shape-fixed state in the original shape, i.e., can return to the state in FIG. 3.

Note that electrodes and doorframe can be disposed also on the frame under the door panel 4. Further, the doorframe 11-*j* may be restored to the original shape by pressure being applied from the actuator 15 in the direction where the width of the gap 2 is expanded, i.e., the direction contrary to the direction the door panel 4 is compressed.

A sensor 13 is attached to the outer edge of each four sides of the door panel 4, for example. Upon a sensor switch 14 being turned on under control of the control device 16, the sensor 13 starts measurement of pressure which the doorframe 11-*j*, to which pressure was applied from the actuator 15 in a shape-variable state, applies to the door panel 4, and supplies the pressure measured to the control device 16. On the other hand, upon the sensor switch 14 being turned off, the sensor 13 stops measurement of the pressure which the doorframe 11-*j* applies to the door panel 4.

The sensor switch 14 is supplied with a switch control signal from the control device 16. The sensor switch 14 turns on or off based on the switch control signal supplied from the control device 16 to cause the sensor 13 to start or stop measurement of pressure.

The actuator 15 is supplied with an actuating signal from the control device 16. The actuator 15 applies pressure to the doorframe 11-*j*, which enters a shape-variable state, based on the actuating signal supplied from the control device 16 to deform the shape thereof.

The control device 16 applies voltage to the electrode 12-*j* based on the broadcasting signal received at an antenna 17, and also supplies a switch control signal to the sensor switch 14, and an actuating signal to the actuator 15, respectively. Further, the control device 16 receives a pressure value from the sensor 13.

Figure 4:
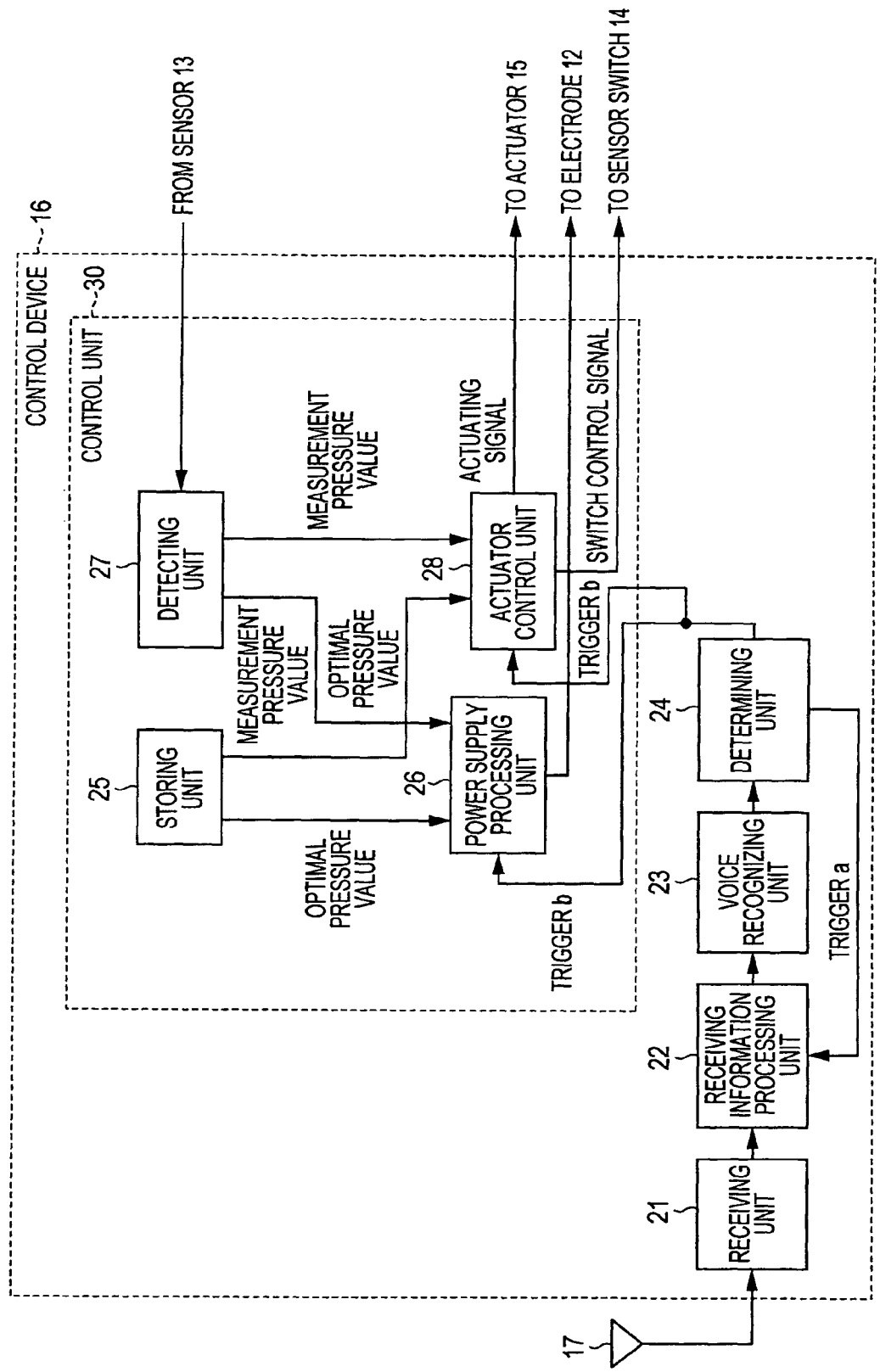
FIG. 4 is a block diagram illustrating a configuration example of a control device 16.

FIG. 4 is a block diagram illustrating a configuration example of the control device 16 in FIG. 3.

The control device 16 comprises a receiving unit 21, a receiving information processing unit 22, a voice recognizing unit 23, a determining unit 24, a storing unit 25, a power supply processing unit 26, a detecting unit 27, and an actuator control unit 28.

The receiving unit 21 is connected to the antenna 17 by cable. The antenna 17 receives a broadcasting signal transmitted via airwaves, and supplies this to the receiving unit 21. The receiving unit 21 subjects the broadcasting signal supplied from the antenna 17 to predetermined processing such as demodulation for example, and supplies this to the receiving information processing unit 22.

The receiving information processing unit 22 is supplied with a broadcasting signal from the receiving unit 21, and also is supplied with a trigger a from the determining unit 24. The receiving information processing unit 22 detects (acquires) a voice signal (audio data) serving as information from the broadcasting signal supplied from the receiving unit 21 in accordance with the trigger a from the determining unit 24, and supplies this to the voice recognizing unit 23.

The voice recognizing unit 23 performs speech recognition regarding the voice signal supplied from the receiving information processing unit 22, and supplies a text serving as the speech recognition result to the determining unit 24.

The determining unit 24 performs processing for detecting danger information relating to danger such as information relating to a person such as a burglar, and information relating to districts where the person appeared based on the text supplied from the voice recognizing unit 23 as predetermined specific information. Further, the determining unit 24, upon detecting danger information, supplies a trigger b serving as a control signal to the power supply processing unit 26 and actuator control unit 28 based on the danger information. Also, the determining unit 24 controls the receiving information processing unit 22 by supplying a trigger a serving as a control signal to the receiving information processing unit 22.

The storing unit 25 stores an optimal pressure value serving as an appropriate pressure value to be applied to the door panel 4 by the doorframe 11-*j* for when jamming the door panel 4 and the doorframe 11-*j* by pressure.

The power supply processing unit 26 is supplied with a trigger b from the determining unit 24, and also is supplied with a measured pressure value indicating pressure measured by the sensor 13 from the detecting unit 27. The power supply processing unit 26 applies voltage to the electrodes 12-*j* in accordance with the trigger b supplied from the determining unit 24. Also, the power supply processing unit 26 compares the optimal pressure value stored in the storing unit 25 with the measured pressure value supplied from the detecting unit 27, and stops application of voltage to the electrodes 12-*j* depending on the comparison result.

The detecting unit 27 processes the measured pressure value measured by the sensor 13, and supplies this to the power supply processing unit 26 and actuator control unit 28.

The actuator control unit 28 supplies an actuating signal to the actuator 15 in accordance with the trigger b supplied from the determining unit 24, and also supplies a switch control signal to the sensor switch 14. Further, the actuator control processing unit 28 compares the optimal pressure value stored in the storing unit 25 with the measured pressure value supplied from the detecting unit 27, and stops supply of an actuating signal to the actuator 15 depending on the comparison result.

Now, the storing unit 25, power supply processing unit 26, detecting unit 27, and actuator control unit 28, make up a control unit 30 which controls the status of a door serving as a facility of the house in FIG. 3.

Figure 5:
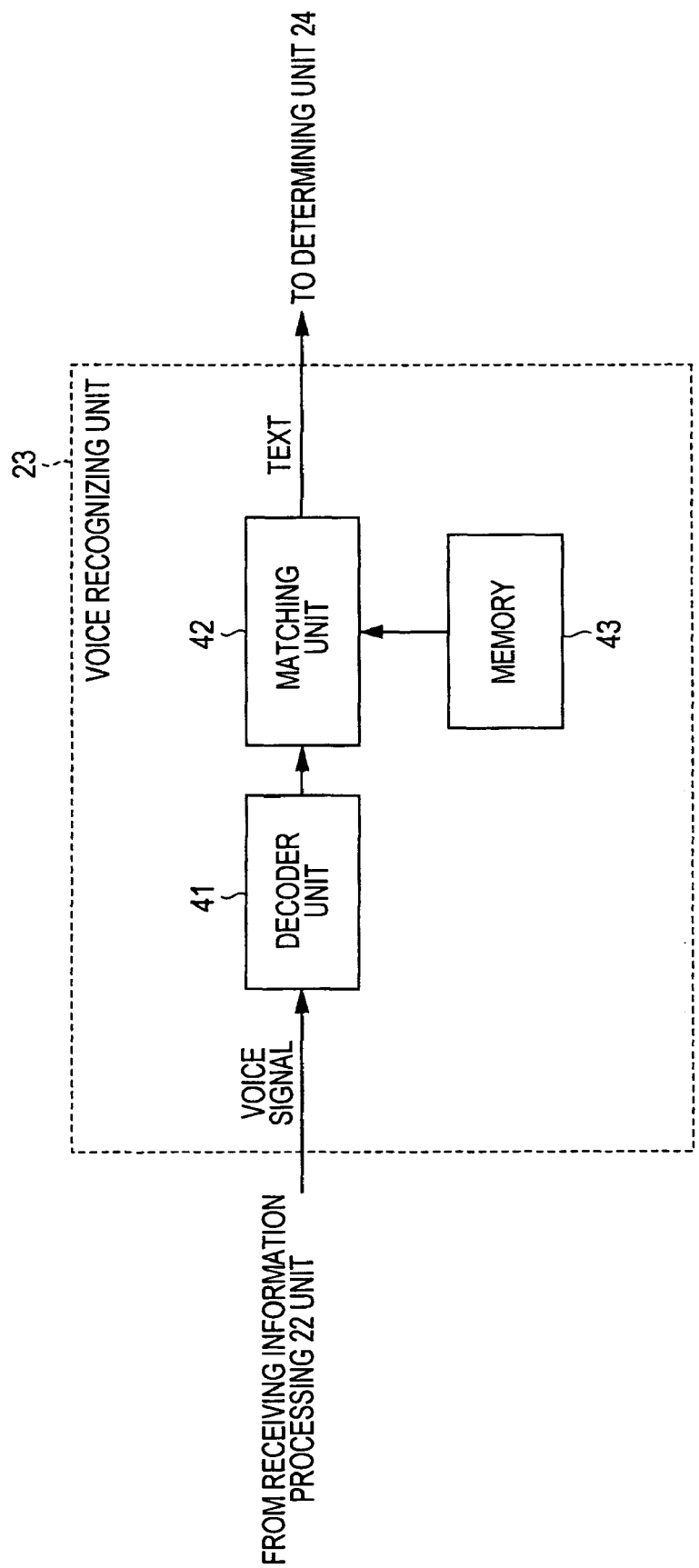
FIG. 5 is a block diagram illustrating a configuration example of a voice recognizing unit 23.

FIG. 5 is a block diagram illustrating a configuration example of the voice recognizing unit 23 in FIG. 4.

The voice recognizing unit 23 comprises a decoder unit 41, a matching unit 42, and memory 43.

In the event that the voice signal supplied from the receiving information processing unit 22 is encoded, the decoder unit 41 decodes the encoded voice signal, and supplies the decoded voice signal to the matching unit 42.

The matching unit 42 subjects the voice signal supplied from the decoder unit 41 to speech recognition with the vocabulary registered in a speech recognition dictionary stored in the memory 43 as vocabulary to be subjected to speech recognition, and supplies the result of the speech recognition to the determining unit 24 as a text.

The memory 43 stores a speech recognition dictionary. The speech recognition dictionary has registered therein a very wide vocabulary.

Figure 6:
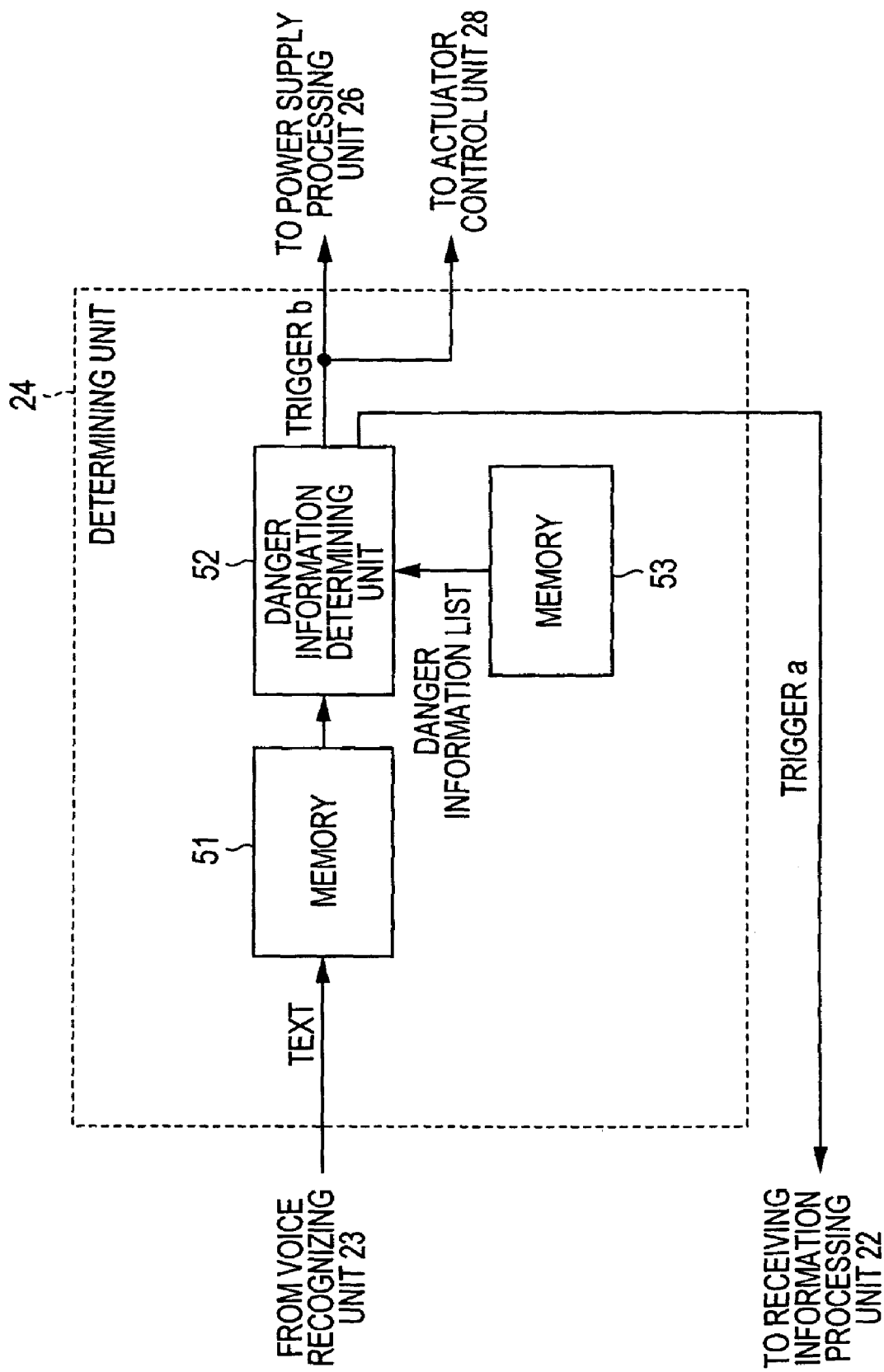
FIG. 6 is a block diagram illustrating a configuration example of a determining unit 24.

FIG. 6 is a block diagram illustrating a configuration example of the determining unit 24 in FIG. 4.

The determining unit 24 comprises memory 51, a danger information determining unit 52, and memory 53.

The memory 51 temporally stores the text supplied from the voice recognizing unit 23.

The danger information determining unit 52 reads out danger information serving as words registered in a danger information list (the details thereof will be described later in FIG. 7) stored in the memory 53. Further, the danger information determining unit 52 reads out a text from the memory 51, and extracts words which represent a noun, state, action, and the like from the text. Subsequently, the danger information determining unit 52 determines whether or not the word extracted from the text corresponds to (is in agreement with) the danger information. In the event that determination is made that the word extracted from the text corresponds to the danger information, i.e., in the event that the danger information is detected from the text, the danger information determining unit 52 supplies a trigger b to the power supply processing unit 26 and actuator control unit 28. On the other hand, in the event that determination is made that the word extracted from the text does not correspond to the danger information, the danger information determining unit 52 supplies a trigger a to the receiving information processing unit 22.

The memory 53 stores danger information lists.

Description will be made regarding the danger information lists stored in the memory 53 in FIG. 6 with reference to FIG. 7.

The memory 53 in FIG. 6 stores four danger information lists shown in the upper left, lower left, upper right, and lower right of FIG. 7, for example.

The upper left diagram illustrates the danger information list to which names representing places such as A town, B town, and C town are registered (hereinafter, referred to as relevant district list as appropriate). For example, in the event that a dangerous person such as an intruder who illegally invades dwelling-places appears, whether or not danger from the intruder will affects a user's house is greatly influenced by the spatial relationship between the place where the intruder has invaded and the place where the user's house exists. Accordingly, the relevant district list in which places are registered are a vital list (MUST list) at the time of determining whether or not danger is approaching the districts near the user's house. Examples of danger information registered in the relevant district list includes districts near the user's house in distance, such as the town where the user's house is, i.e., the town where the user lives, neighboring towns where the user lives, and so forth, with the names of the districts where danger may reach the user's house in the event that a dangerous person has appeared in such a district being used in the list.

The lower left diagram illustrates the danger information list to which names representing persons such as an intruder, burglar, and suspect are registered as danger information (hereinafter, referred to as person list as appropriate). Note that as for person information serving as danger information which is registered to the person list, the names of dangerous persons whereby danger may reach the user's house are used, such as an "intruder" who illegally invades dwelling-places, a "burglar" who steals others' personal belongings, and a "suspect" who has committed a crime against the law.

The upper right diagram illustrates the danger information list to which nouns or the like representing statuses such as under investigation, in flight, and in hiding are registered as danger information (hereinafter, referred to as status list as appropriate). Note that as for the danger information registered in the status list, the nouns representing statuses in which danger may reach the user's house are employed, such as a dangerous person who is registered in the person list is "under investigation" representing a status in which the police is investigating the person, "in flight" representing a status in which the person is fleeing, and "in hiding" representing a status in which the person is hiding out to conceal himself/herself.

The lower right diagram illustrates the danger information list into which names representing personal belongings such as a weapon, gun, and knife are registered as danger information (hereinafter, referred to as personal belongings list as appropriate). Note that as for the danger information registered in the personal belongings list, the nouns of the personal belongings of a dangerous person who is registered in the person list whereby danger may reach the user are employed, such as a "weapon" for inflicting injury on a third party, a "gun" for discharging bullets, and a "knife" such as a sharp edged tool like a kitchen knife.

Note that creation of the danger information lists may be requested of the user, for example. Also, of the danger information lists, the relevant district list can be created by recognizing the position of the user's house using GPS (Global Positioning System), and registering the district names of the position and surrounding districts. Further, the other danger information lists can be created and registered beforehand.

Figure 8:
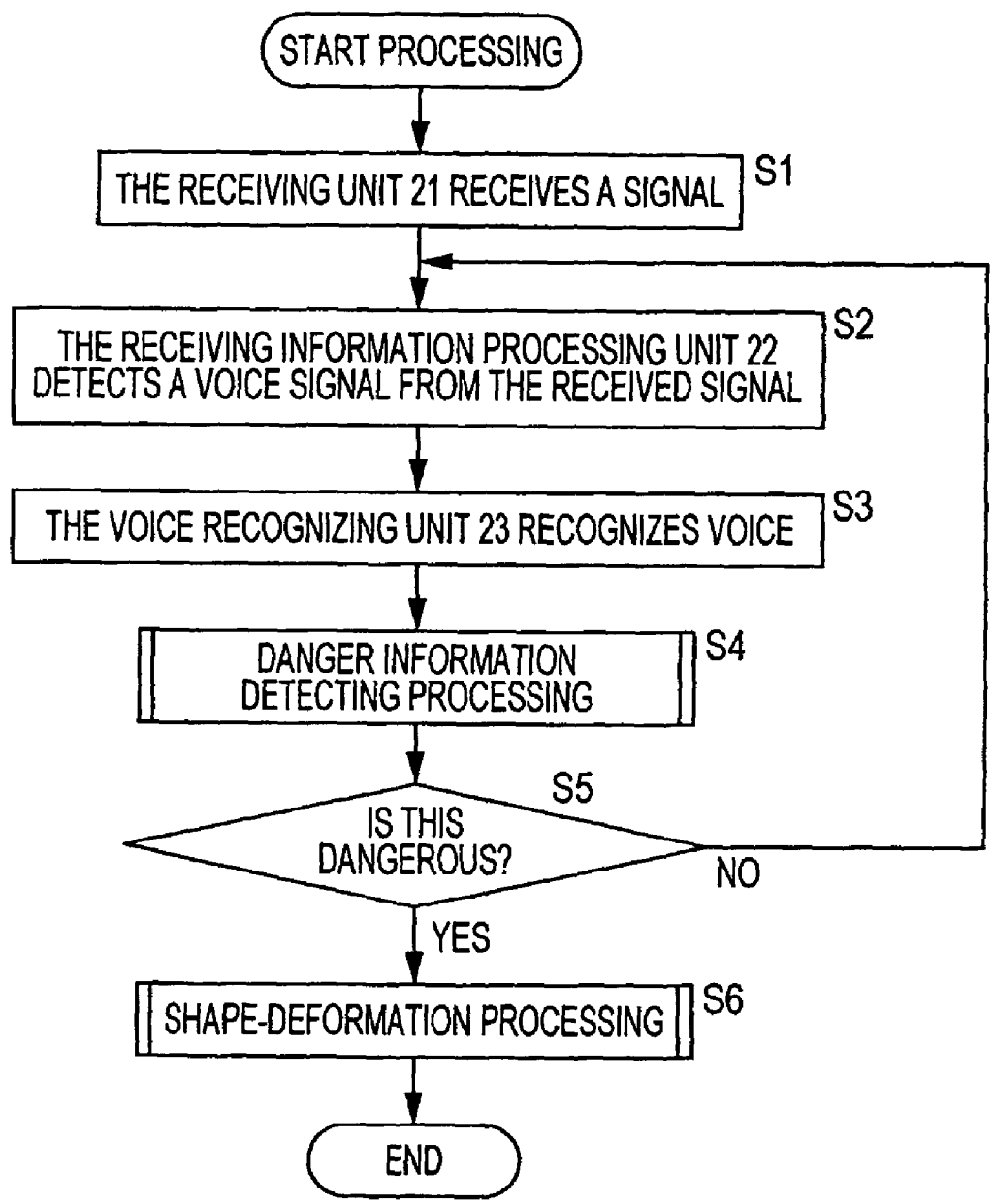
FIG. 8 is a flowchart describing the processing of the control device 16.

FIG. 8 is a flowchart describing the processing of the control device 16 in FIG. 4. The processing in FIG. 8 starts upon the power source of the control device 16 being turned on, whereby the control device 16 becomes operative.

In step S1, the receiving unit 21 starts reception of the broadcasting signal supplied from the antenna 17, subjects the received broadcasting signal to predetermined processing, and supplies this to the receiving information processing unit 22. Note that the receiving unit 21 may be arranged to receive only the broadcasting signal of a certain channel, or to also receive the broadcasting signals of multiple channels in a time-sharing manner. Also, the receiving unit 21 can acquire, for example, an EPG (Electronic Program Guide), and receive the broadcasting signal of news programs based on the EPG. Further, the receiving unit 21 may be arranged to receive the broadcasting signals of multiple channels using multiple tuners.

Subsequently, in step S2, the receiving information processing unit 22 acquires a voice signal by detecting a voice signal from the broadcasting signal supplied from the receiving unit 21, supplies this to the voice recognizing unit 23, and the flow proceeds to step S3.

In step S3, the voice recognizing unit 23 performs speech recognition regarding the voice signal supplied from the receiving information processing unit 22, supplies the speech recognition result in a text format to the determining unit 24, and the flow proceeds to step S4.

In step S4, the determining unit 24 performs danger information detecting processing for detecting danger information from the text supplied from the voice recognizing unit 23, the flow proceeds to step S5, where determination is made based on the processing result regarding whether or not there is a danger potential wherein there is a possibility that danger will approach the user (user's house).

In step S5, in the event that determination is made that there is no danger potential, the determining unit 24 supplies a trigger a to the receiving information processing unit 22, and the flow returns to step S2. In step S2, the receiving information processing unit 22 detects a voice signal from the broadcasting signal next supplied from the receiving unit 21 in accordance with the trigger a from the determining unit 24, and hereinafter, the same processing is repeated.

On the other hand, in step S5, in the event that there is a danger potential, the determining unit 24 supplies a trigger b to the power supply processing unit 26 and actuator control unit 28, and the flow proceeds to step S6.

In step S6, the power supply processing unit 26 and actuator control unit 28 and the like perform shape deformation processing for deforming the shapes of the doorframe 11-*j* in FIG. 3 in accordance with the trigger b from the determining unit 24 and end the processing. That is to say, in the event that there is a danger potential, the control device 16 in FIG. 4 performs the shape deformation processing, and thus, as described later, the door panel 4 and the doorframe 11-*j* are jammed by pressure, thereby protecting the user (user's house) from danger.

Figure 9:
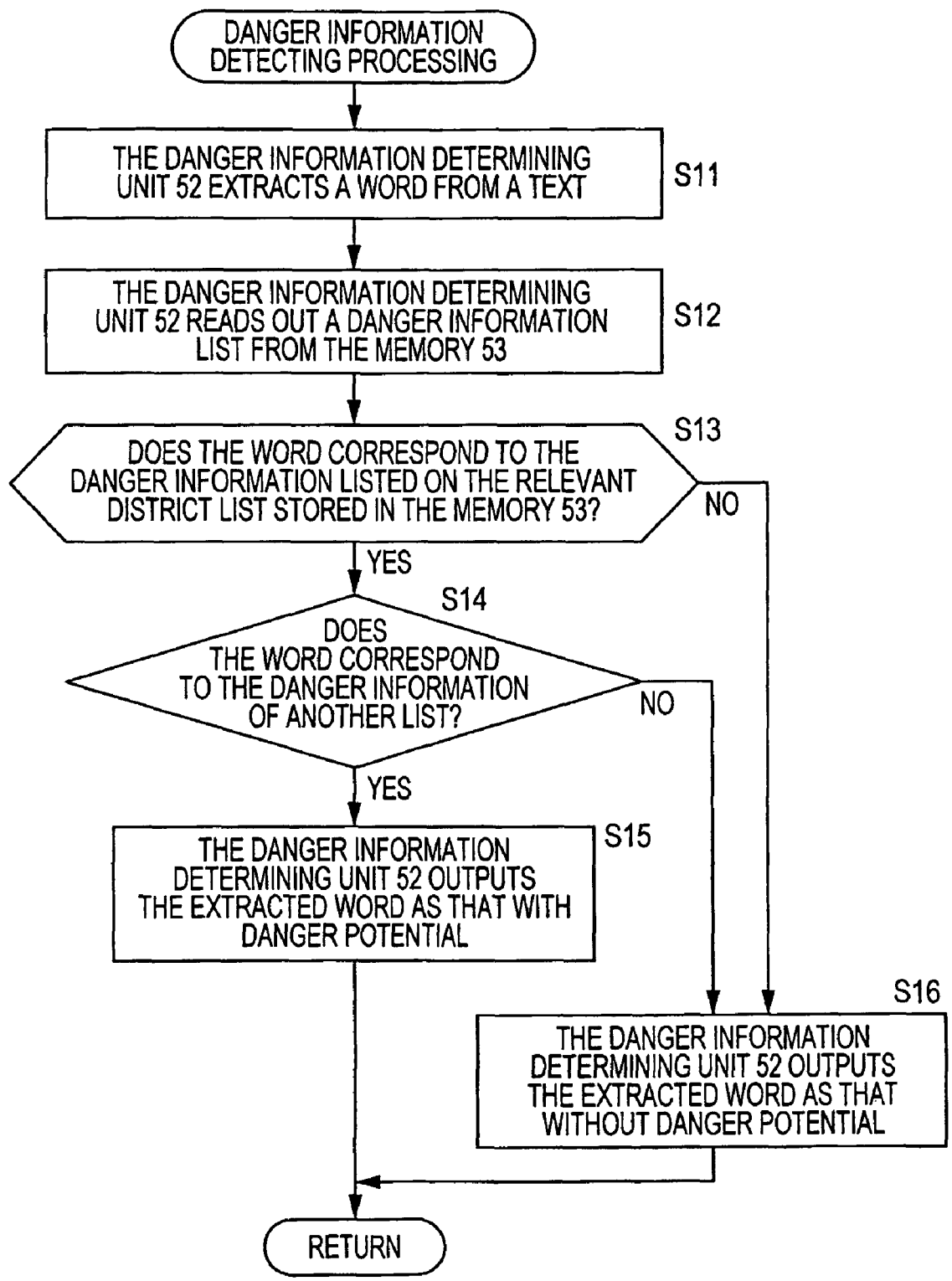
FIG. 9 is a flowchart describing danger information detecting processing.

FIG. 9 is a flowchart describing the danger information detecting processing in step S4 in FIG. 8, i.e., the processing of the determining unit 24 in FIG. 6.

The text serving as the speech recognition result output by the voice recognizing unit 23 is supplied to the memory 51, and the memory 51 temporally stores the text. That is to say, the memory 51 temporally stores the text of the speech recognition result of the voice of the program broadcasted within a certain time.

Subsequently, in step S11, the danger information determining unit 52 extracts words from the text stored in the memory 51, and the flow proceeds to step S12.

In step S12, the danger information determining unit 52 sequentially reads out the danger information list in FIG. 7 stored in the memory 53, and the flow proceeds to step S13

In step S13, the danger information determining unit 52 determines whether or not any one of the words extracted from the text in step S11 corresponds to the danger information (relevant district information) listed in the relevant district list, of the danger information lists read out in step S12.

In step S13, in the event that determination is made that any one of the words extracted from the text does not correspond to (is not in agreement with) any danger information of the relevant district list, the flow proceeds to step S16.

On the other hand, in step S13, in the event that determination is made that any one of the words extracted from the text corresponds to (is in agreement with) any danger information of the relevant district list, the flow proceeds to step S14, where the danger information determining unit 52 determines whether or not any one of the words extracted from the text corresponds to the danger information listed in any danger information list other than the relevant district list, i.e., the person list, status list, and personal belongings list in FIG. 7.

In step S14, in the event that determination is made that any one of the words extracted from the text corresponds to any danger information listed in the other danger information lists, i.e., in the event that the text includes the word listed in the relevant district list and the word listed in the other danger information list, the flow proceeds to step S15, where the danger information determining unit 52 recognizes that there is a danger potential, and the flow returns. That is to say, in the event that the contents of the broadcasting signal received in step S1 in FIG. 8 are for broadcasting that a person listed in the person list in FIG. 7 as a dangerous person such as an intruder has appeared in the district listed in the district information list in FIG. 7 for example, this means that the text includes both the word of the relevant district list and the word of the other danger information list, and thus, the danger information determining unit 52 recognizes that there is a danger potential.

On the other hand, in step S14, in the event that determination is made that none of the words extracted from the text correspond to any danger information listed in the other danger information lists, the flow proceeds to step S16, where the danger information determining unit 52 recognizes that there is no danger potential, and the flow returns. For example, in the event that the contents of the broadcasting signal received in step S1 in FIG. 8 is not for broadcasting that a dangerous person has appeared, or even if the contents of the broadcasting signal is for broadcasting that a dangerous person has appeared, but in the event that the dangerous person has appeared in a far distant district, this means that the text never includes both the word of the relevant district list and the word of the other danger information list, and thus, the danger information determining unit 52 recognizes that there is no danger potential.

Figure 10:
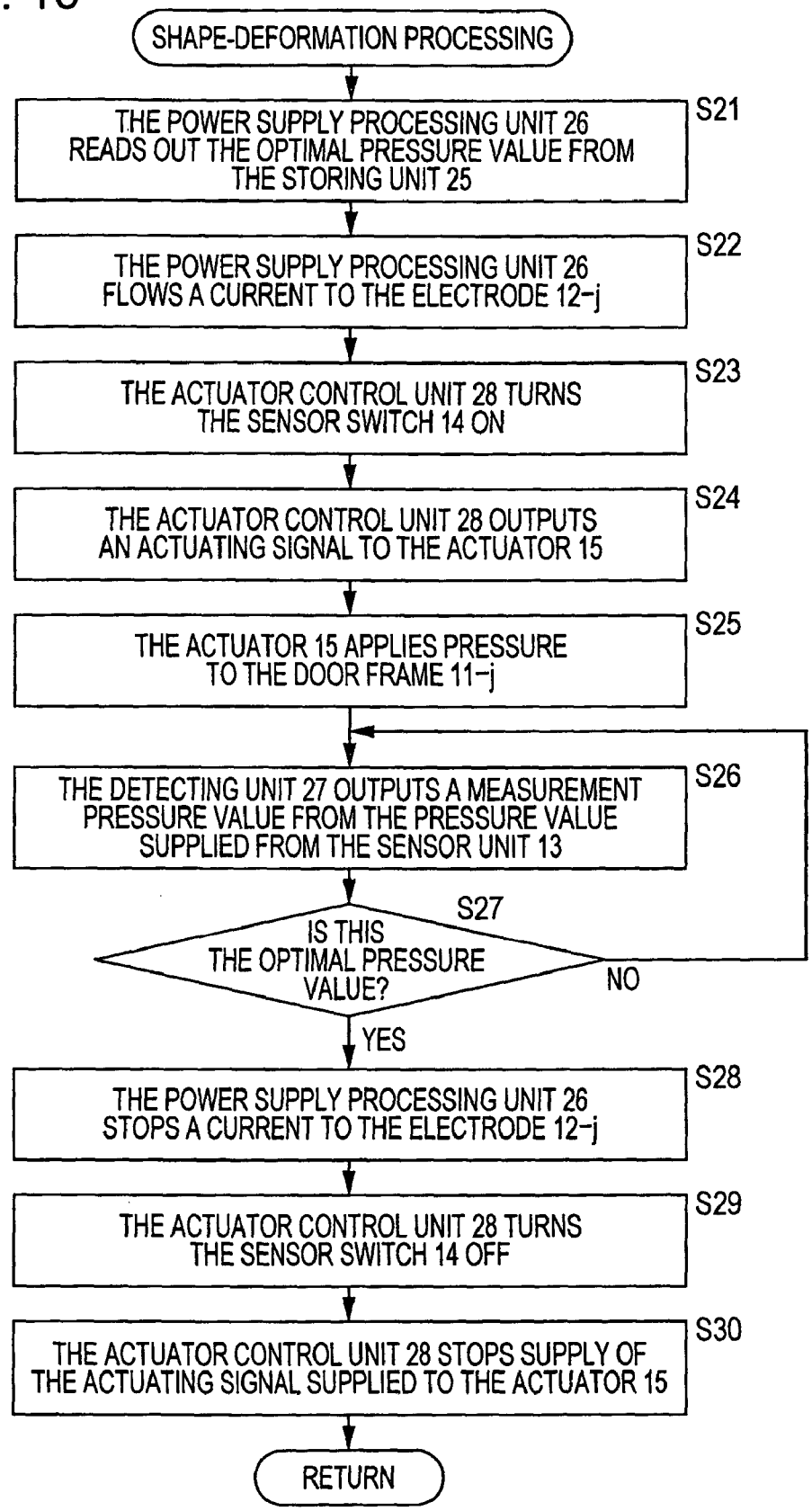
FIG. 10 is a flowchart describing shape deformation processing.

FIG. 10 is a flowchart describing the shape deformation processing in step S6 in FIG. 8. As described in FIG. 8, in the event that there is a danger potential, i.e., in the event that danger approaches the user (user's house), this shape deformation processing is performed for preventing the danger. In other words, with a building such as a house, this processing is performed in order to automatically protect the resident (user) of the house or the like from danger.

In step S21, the power supply processing unit 26 reads out an optimal pressure value from the storing unit 25, and the flow proceeds to step S22.

In step S22, the power supply processing unit 26 flows current in the doorframe 11-*j* serving as a shape-variable member by applying current to the electrodes 12-*j*, transforms the doorframe 11-*j* into a shape-variable state from a shape-fixed state as preparation for changing the shape thereof, and the flow proceeds to step S23.

In step S23, the actuator control unit 28 reads out an optimal pressure value from the storing unit 25, and further supplies a switch control signal to the sensor switch 14, and the flow proceeds to step S24. Thus, the sensor switch 14 turns on, and the sensor 13 starts measurement of pressure applied from the doorframe 11-*j*.

In step S24, the actuator control unit 28 further starts supply of an actuating signal to the actuator 15, and the flow proceeds to step S25.

In step S25, the actuator 15 starts application of pressure to the doorframe 11-*j* in accordance with the actuating signal from the actuator control unit 28, and the flow proceeds to step S26.

In step S26, the detecting unit 27 supplies the measured pressure value supplied from the sensor 13 to the power supply processing unit 26 and actuator control unit 28, and the flow proceeds to step S27.

Now, description will be made regarding a state in which pressure is applied to the doorframe 11-*j* in FIG. 3 with reference to FIG. 11.

Figure 11:
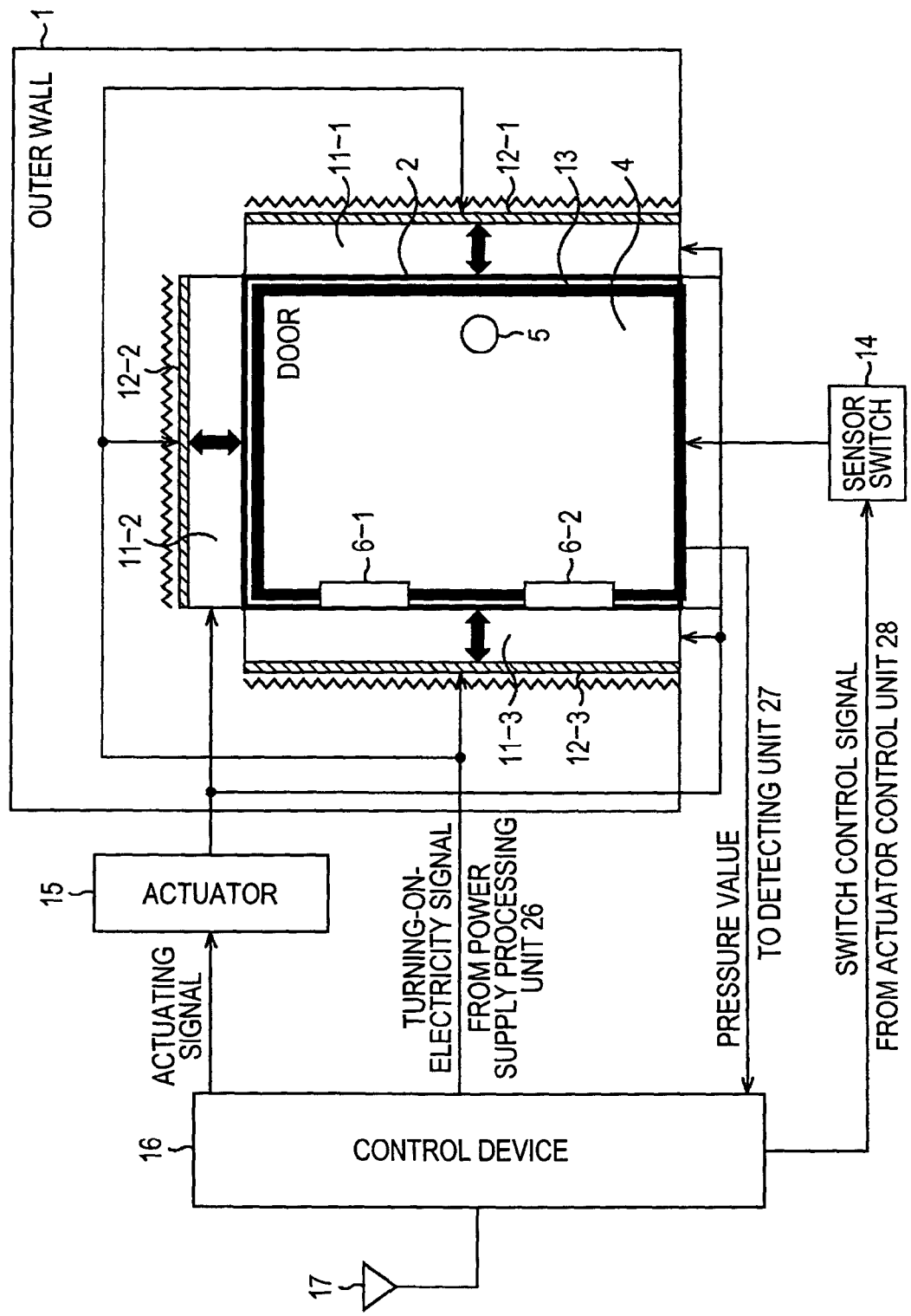
FIG. 11 is a diagram describing a state in which pressure is applied to a doorframe 11-*j*.

In FIG. 11, current is applied to the doorframe 11-*j* with the processing in step S22 in FIG. 10, so the doorframe 11-*j* is in a shape-variable state. Further, pressure is applied to the doorframe 11-*j* by the actuator 15. Thus, the doorframe 11-*j* to which pressure is applied in a shape-variable state changes its shape in the direction where the width of the gap 2 is reduced, i.e., in the direction where the door panel 4 is pressed.

In the event that the doorframe 11-*j* is in contact with the door panel 4, or in the event that the doorframe 11-*j* is not in contact with the door panel 4, but the doorframe 11-*j* has not changed its shape up to a state in which the doorframe 11-*j* is sufficiently jammed to the door panel 4 by pressure, the measured pressure value measured by the sensor 13 has not attained the optimal pressure value stored in the storing unit 25. In this case, the power supply processing unit 26 continuously applies current to the electrodes 12-*j*, and consequently, the doorframe 11-*j*. Further, the actuator control unit 28 continuously supplies an actuating signal to the actuator 15, and the actuator 15 continuously applies pressure to the doorframe 11-*j*.

Returning to FIG. 10, in step S27, the power supply processing unit 26 and actuator control unit 28 determine whether or not the measured pressure value supplied from the detecting unit 27 has attained the optimal pressure value. In step S27, in the event that determination is made that the measured pressure value has not attained the optimal pressure value, the flow returns to step S26, and hereinafter, the same processing is repeated. That is to say, the power supply processing unit 26 continuously applies current to the doorframe 11-*j*. Further, the actuator control unit 28 continuously supplies an actuating signal to the actuator 15, and subsequently, the actuator 15 continuously applies pressure to the doorframe 11-*j*.

On the other hand, in the event that determination is made in step S27 that the measured pressure value has attained the optimal pressure value, the flow proceeds to step S28, the power supply processing unit 26 stops supply of current to the electrode 12-*j*, i.e., stops supply of current to the doorframe 11-*j* to change the doorframe 11-*j* into a shape-fixed state from a shape-variable state, and the flow proceeds to step S29.

In step S29, the actuator control unit 28 supplies a switch control signal to the sensor switch 14 to turn off the sensor switch 14, and the flow proceeds to step S30.

In step S30, the actuator control unit 28 further stops supply of an actuating signal supplied to the actuator 15, and thus, the actuator 15 stops application of pressure to the doorframe 11-*j*, and the flow returns.

Thus, the door panel 4 and the doorframe 11-*j* are in a jammed state.

Description will be made regarding a state in which the doorframe 11-*j* is jammed to the door panel 4 by pressure, with reference to FIG. 12.

Figure 12:
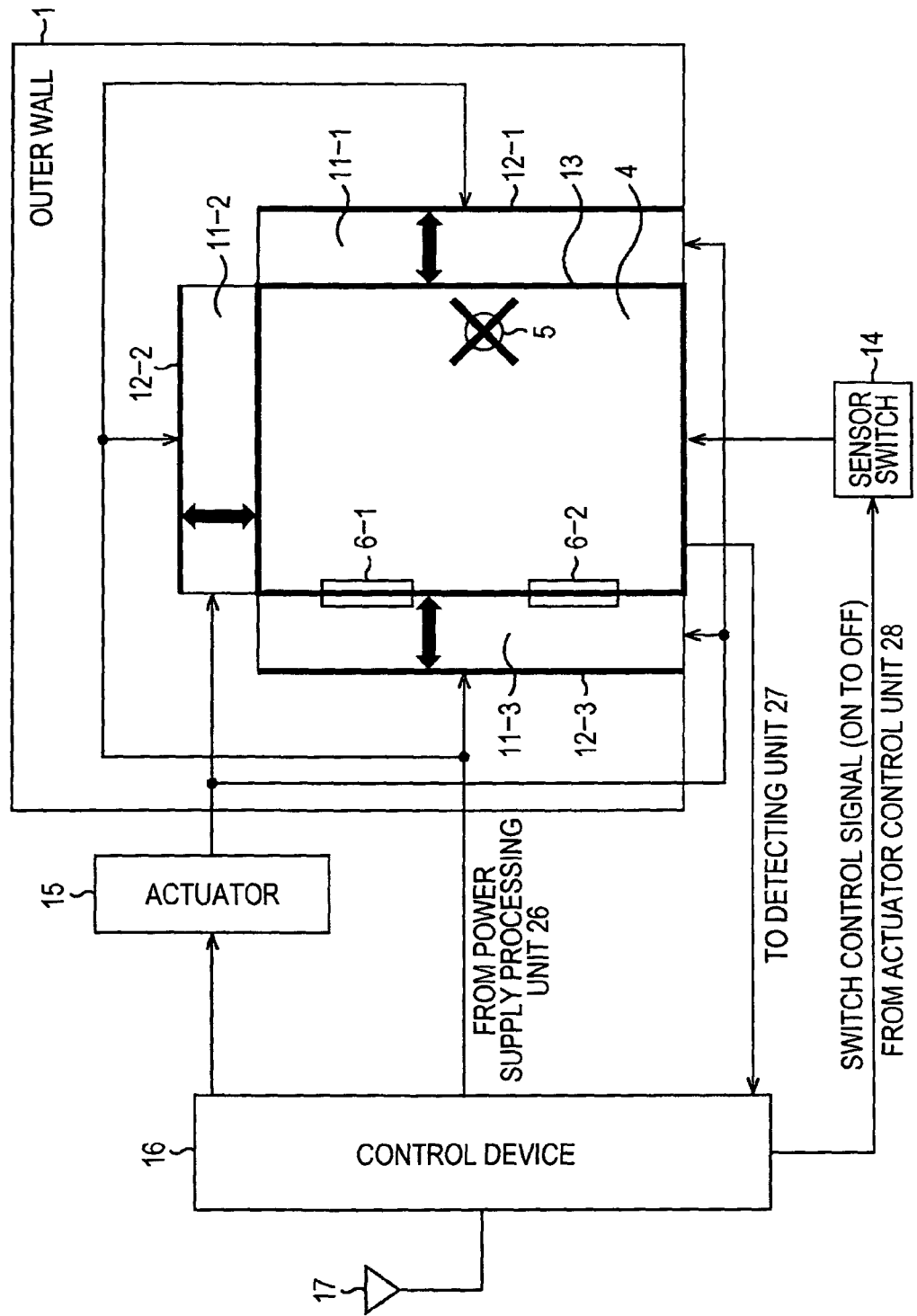
FIG. 12 is a diagram describing a state in which the doorframe 11-*j* is jammed against the door panel 4 by pressure.

In FIG. 12, the measured pressure value measured by the sensor 13 has attained the optimal pressure value stored in the memory 25. In this case, supply of current to the doorframe 11-*j* is stopped in step S28 in FIG. 10, and the doorframe 11-*j* makes transition to a shape-fixed state from a shape-variable state. Further, appliance of pressure to the doorframe 11-*j* is stopped in step S30 in FIG. 10. Thus, the doorframe 11-*j* changes its shape to a state in which the doorframe 11-*j* is sufficiently jammed to the door panel 4 by pressure, and reaches a shape-fixed state wherein there is no more gap 2.

Accordingly, in FIG. 12, even if the unshown lock mechanism of the doorknob 5 is in an unlocked state, or destroyed by someone, the doorframe 11-*j* and door panel 4 are in a state in which the doorframe 11-*j* is sufficiently jammed to the door panel 4 by pressure, so the door panel 4 cannot be opened and closed, thereby preventing a prowler or the like from invading the house.

Figure 13:
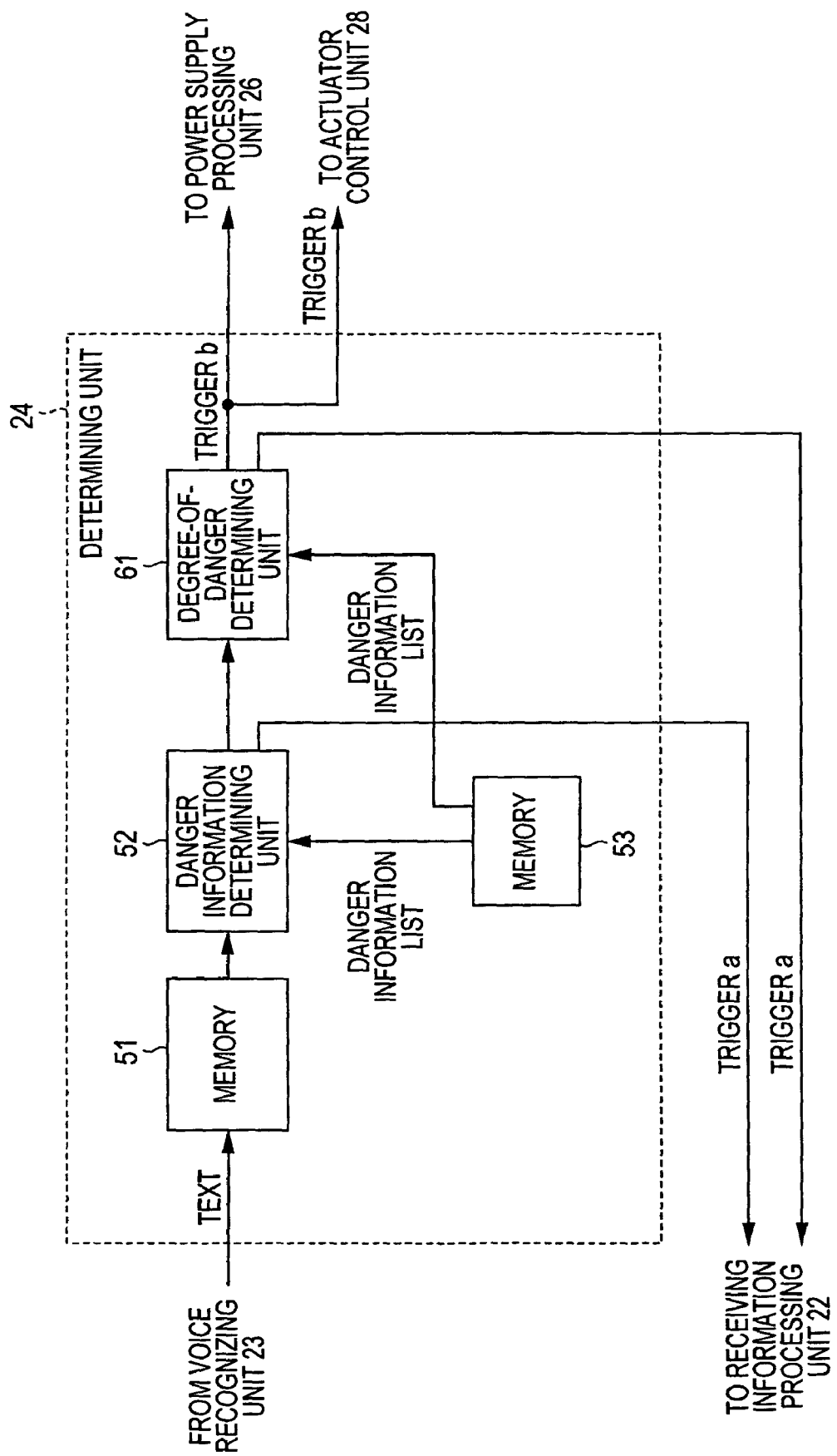
FIG. 13 is a block diagram illustrating another configuration example of the determining unit 24.

FIG. 13 is a block diagram illustrating a configuration example of the determining unit 24 in FIG. 4.

The determining unit 24 in FIG. 13 comprises memory 51, a danger information determining unit 52, memory 53, and a level-of-danger determining unit 61. In FIG. 13, the memory 51, danger information determining unit 52, and memory 53 have the same configuration as the case in FIG. 6, so description thereof will be omitted as appropriate. However, the memory 53 stores a danger information list which lists danger information accompanying a level of danger serving as importance of danger information. Also, the danger information determining unit 52, as with the case described in FIG. 6, is configured so as to detect the danger information registered in the danger information list stored in the memory 53 from the text, and determine whether or not there is a danger potential, and further supply the determination result to the level-of-danger determining unit 61, and also supply the danger information detected from the text to the level-of-danger determining unit 61.

Upon receiving information that there is a danger potential from the danger information determining unit 52, the level-of-danger determining unit 61 determines the level of danger with reference to the danger information list stored in the memory 53. That is to say, the level-of-danger determining unit 61 recognizes the level-of-danger of the danger information supplied from the danger information determining unit 52 along with the information that there is a danger potential based on the danger information list stored in the memory 53, and determines the level of the danger potential depending on the level-of-danger thereof. Subsequently, in the event that determination is made that the danger potential is high, the level-of-danger determining unit 61 supplies a trigger b to the power supply processing unit 26 and actuator control unit 28, as with the danger information determining unit 52 in FIG. 6. On the other hand, in the event that determination is made that the danger potential is low, the level-of-danger determining unit 61 supplies a trigger a to the receiving information processing unit 22, as with the danger information determining unit 52 in FIG. 6.

FIG. 14 illustrates a danger information list stored in the memory 53 in FIG. 13. Note that in FIG. 14, the danger information listed in the danger information list is the same as that shown in FIG. 7.

However, with the danger information list in FIG. 14, a word serving as danger information registered therein is associated with a level-of-danger representing the level of danger in the case of the word being included in the text. Note that here, let us say that the smaller the value representing a level-of-danger, the higher the level of danger.

Now, let us say that the user's house is in A town, and the neighboring towns are B town and C town. Further, let us say that B town is near the user's house, but C town is far from the user's house.

In this case, the probability that danger will reach the user (user's house) is higher when an incident occurs in B town than when an incident occurs in C town. Also, the probability that danger will reach the user (user's house) is higher when an incident occurs in A town than when an incident occurs in B town.

Accordingly, in FIG. 14, the level-of-danger of danger information "A town" is "1" representing that the level of danger is the highest in the relevant district list which is a danger information list. Also, the level-of-danger of danger information "B town" is "2" representing that the level of danger is next highest. Subsequently, the level-of-danger of danger information "C town" is "3" representing that the level of danger is one rank lower than the danger information "B town".

The danger information registered in the danger information lists (person list, status list, and personal belongings list) other than the relevant district list is also associated with a level-of-danger in the same way.

Note that of the danger information lists, a level-of-danger in the relevant district list, for example, can be determined depending on the distance between the position of the district registered in the relevant district list and the position of the user's house, and registered, by recognizing the position of the user's house using GPS. Also, a level-of-danger of the other danger information lists can be registered beforehand, for example.

Figure 15:
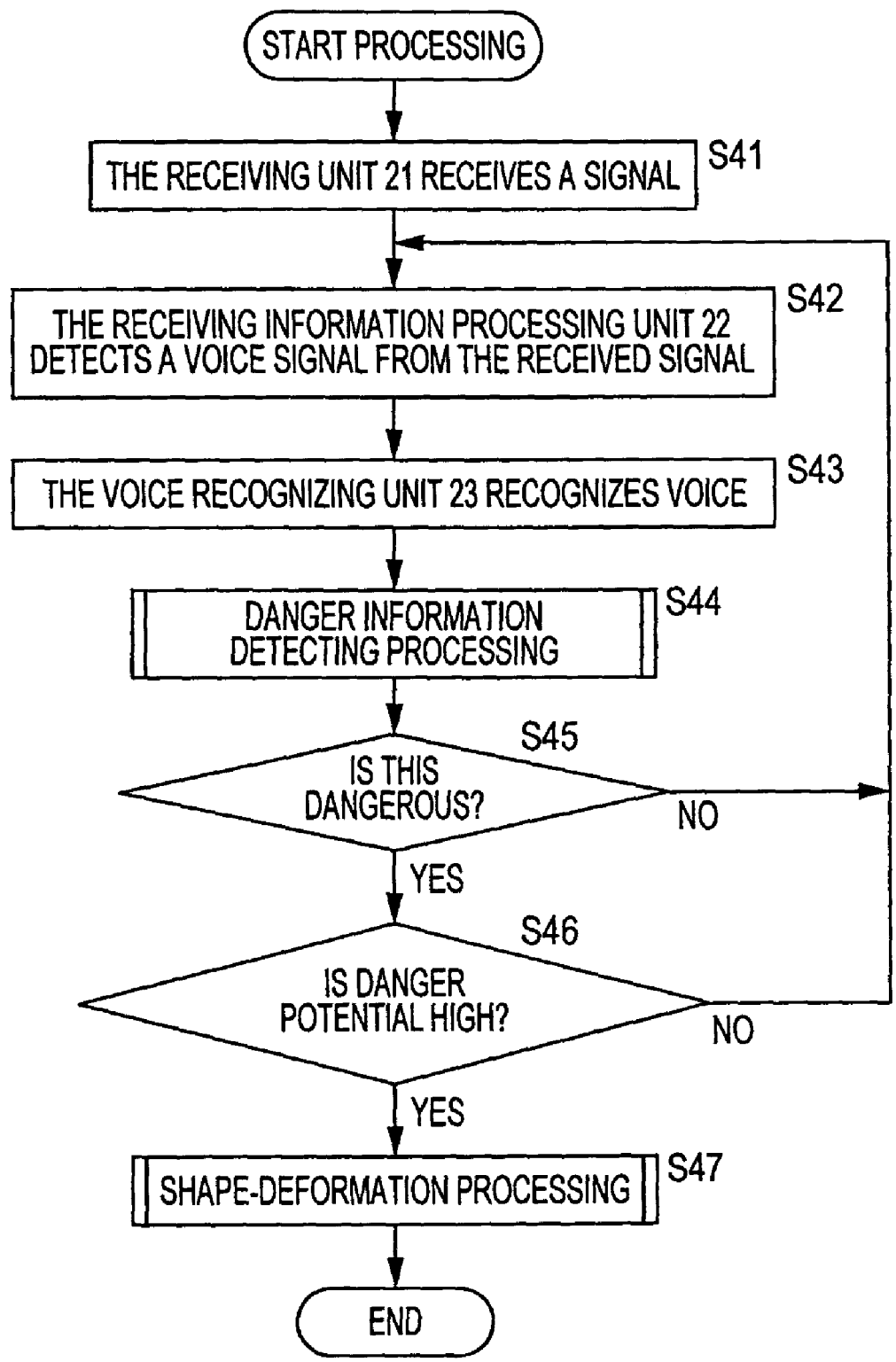
FIG. 15 is a flowchart describing the processing of the control device 16.

FIG. 15 is a flowchart describing the processing of the control device 16 in the case in which the determining unit 24 in FIG. 4 is configured such as shown in FIG. 13.

Note that as with the case in FIG. 8, the processing in FIG. 15 starts upon the power source of the control device 16 being turned on, and the control device 16 becoming operative. Also, the processing in step S41 through the processing in step S45 in FIG. 15 are the same as the processing in step S1 through the processing in step S5 in FIG. 8, so description thereof will be omitted.

However, in step S45, upon determining that there is a danger potential, the danger information determining unit 52 supplies the danger information included in the text obtained with the danger information detecting processing in step S44 corresponding to step S4 in FIG. 8 to the level-of-danger determining unit 61 along with the information that there is a danger potential, and the flow proceeds to step S46.

In step S46, the level-of-danger determining unit 61 recognizes the level-of-danger of the danger information from the danger information determining unit 52 with reference to the danger information list stored in the memory 53, and determines the level of the danger potential of the user (user's house) based on the level-of-danger.

Here, in step S46, the level of the danger potential can be determined depending on the magnitude of the average value of the level-of-danger of the danger information from the danger information determining unit 52, for example. Also, in step S46, of the level-of-danger of the danger information from the danger information determining unit 52, the level of the danger potential can be determined depending on the magnitude of the lowest value, for example.

In step S46, in the event that determination is made that a danger potential is not high, the flow returns to step S42, and hereinafter, the same processing is repeated. On the other hand, in step S46, in the event that determination is made that a danger potential is high, the flow proceeds to step S47, where the same shape deformation processing as that in the case in step S6 in FIG. 8 is performed, and the processing ends. Note that the shape deformation processing in step S47 is the same processing as described in FIG. 10, so the description thereof will be omitted.

Thus, with the house in FIG. 3, when there is a danger potential, or when the danger potential is high, the shape of the doorframe 11-*j* disposed around the gap 2 is deformed so as to sufficiently jam the doorframe 11-*j* with the door panel 4 by pressure, so that the door for going in and out from the house is prevented from being opened even if the key thereof is destroyed, and thus, safety of the user (user's house) can be secured.

Note that in the above case, the door of the house is placed in a jammed state so as not to open, but other arrangements may be employed, for example, an arrangement may be made wherein windows and other certain facilities serving as doorways are also placed in a jammed state so as not to open.

Second Embodiment

Figure 16:
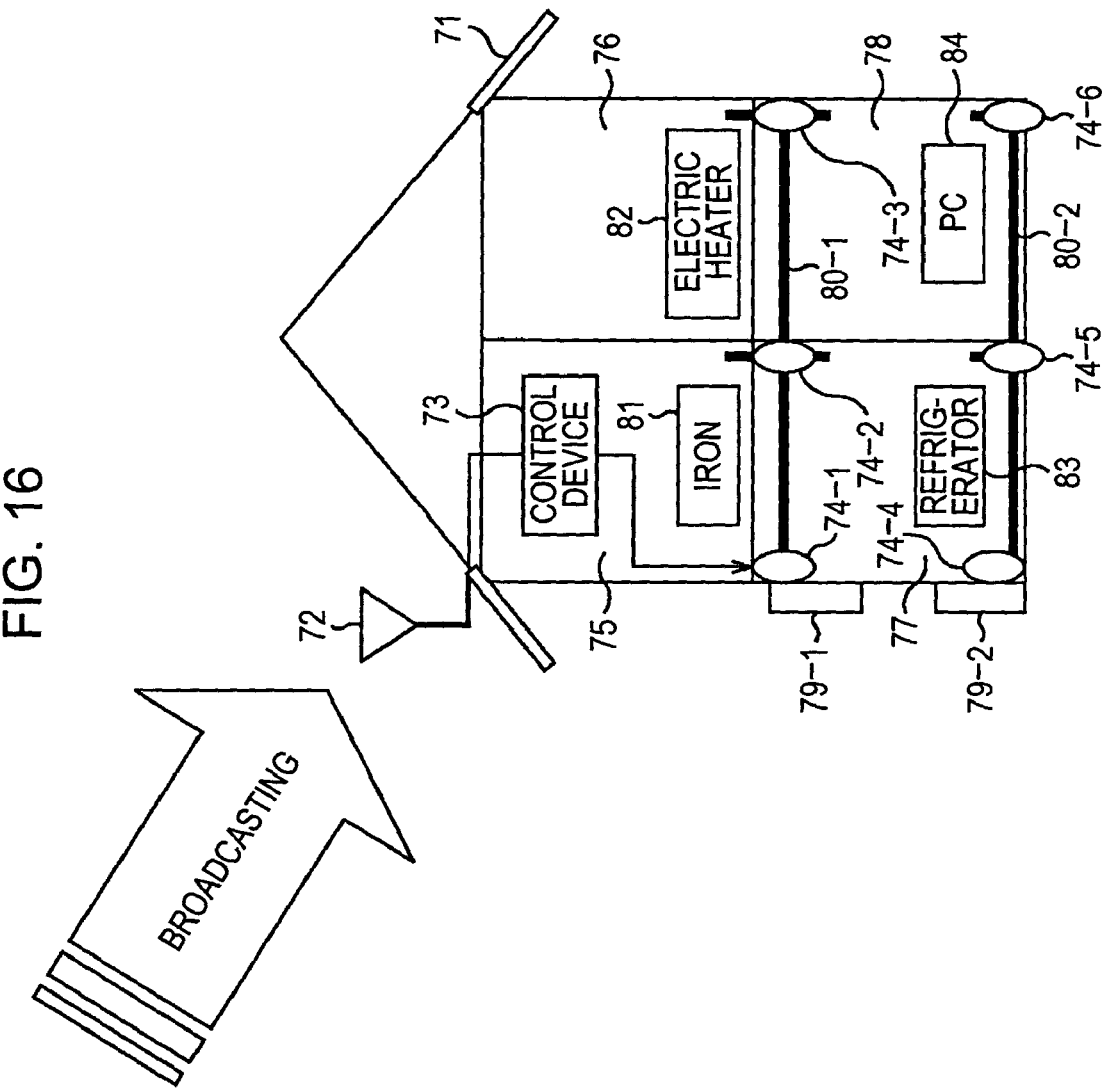
FIG. 16 is a diagram illustrating a configuration example of a house to which the present invention is applied, serving as a second example.

FIG. 16 is a diagram illustrating a configuration example of a house to which the present invention is applied, serving as a second embodiment.

A house 71 comprises an antenna 72, a control device 73, actuator 74-1 through actuator 74-6, room 75 through room 78, switchboard 79-1 and switchboard 79-2, power-distribution cable 80-1 and power-distribution cable 80-2, and the like. Further, in FIG. 16, a clothes iron 81 is disposed in the room 75, an electric heater 82 in the room 76, a refrigerator 83 in the room 77, and a PC (Personal Computer) 84 in the room 78, respectively.

The antenna 72 is connected to the control device 73. The antenna 72, which is disposed outdoors, receives a broadcasting signal transmitted via airwaves, and supplies this to the receiving unit 73.

The control device 73 detects danger information serving as predetermined specific information from the broadcasting signal supplied from the antenna 72, controls the actuator 74-1 through actuator 74-6 based on the danger information, and thus, controls the state of power supply to an electric socket installed in the house 71. Note that though not shown in the drawing, the control device 16 is also connected to the actuator 74-2 through actuator 74-6 other than the actuator 74-1.

The actuator 74-1 through actuator 74-6 control supply of power to be supplied to unshown electric sockets installed in each of the room 75 through room 78 via the power-distribution cable 80-1 or power-distribution cable 80-2 from the switchboard 79-1 or switchboard 79-2 under control of the control device 73. That is to say, the actuator 74-1 through actuator 74-6 control power supply to the electric sockets by driving an unshown switch disposed in the power-distribution cable 80-1 or power-distribution cable 80-2, for example.

The room 75 is a room on the left side in the drawing of the second floor of the house 71. The room 76 is a room on the right side in the drawing of the second floor of the house 71. The room 77 is a room on the left side in the drawing of the first floor of the house 71. The room 78 is a room on the right side in the drawing of the first floor of the house 71. In FIG. 16, the iron 81 is disposed in the room 75, the electric heater 82 in the room 76, the refrigerator 83 in the room 77, and the PC 84 in the room 78, respectively. Note that the other electronic apparatuses can be disposed in the room 75 through room 78.

The switchboard 79-1 and switchboard 79-2 supply power to the electric sockets of the room 75 through room 78 via the power-distribution cable 80-1 and power-distribution cable 80-2 respectively.

The power-distribution cable 80-1 and power-distribution cable 80-2 connect the switchboard 79-1 and switchboard 79-2 to the electric sockets of the room 75 through room 78.

The iron 81, electric heater 82, refrigerator 83, and PC 84 receive power supply by inserting the plugs thereof in the electric sockets in the room 75 through room 78, and operate. Note that the plugs of the iron 81, electric heater 82, refrigerator 83, and PC 84 have a function for transmitting identification information for identifying the electronic apparatuses thereof using a wireless tag.

Figure 17:
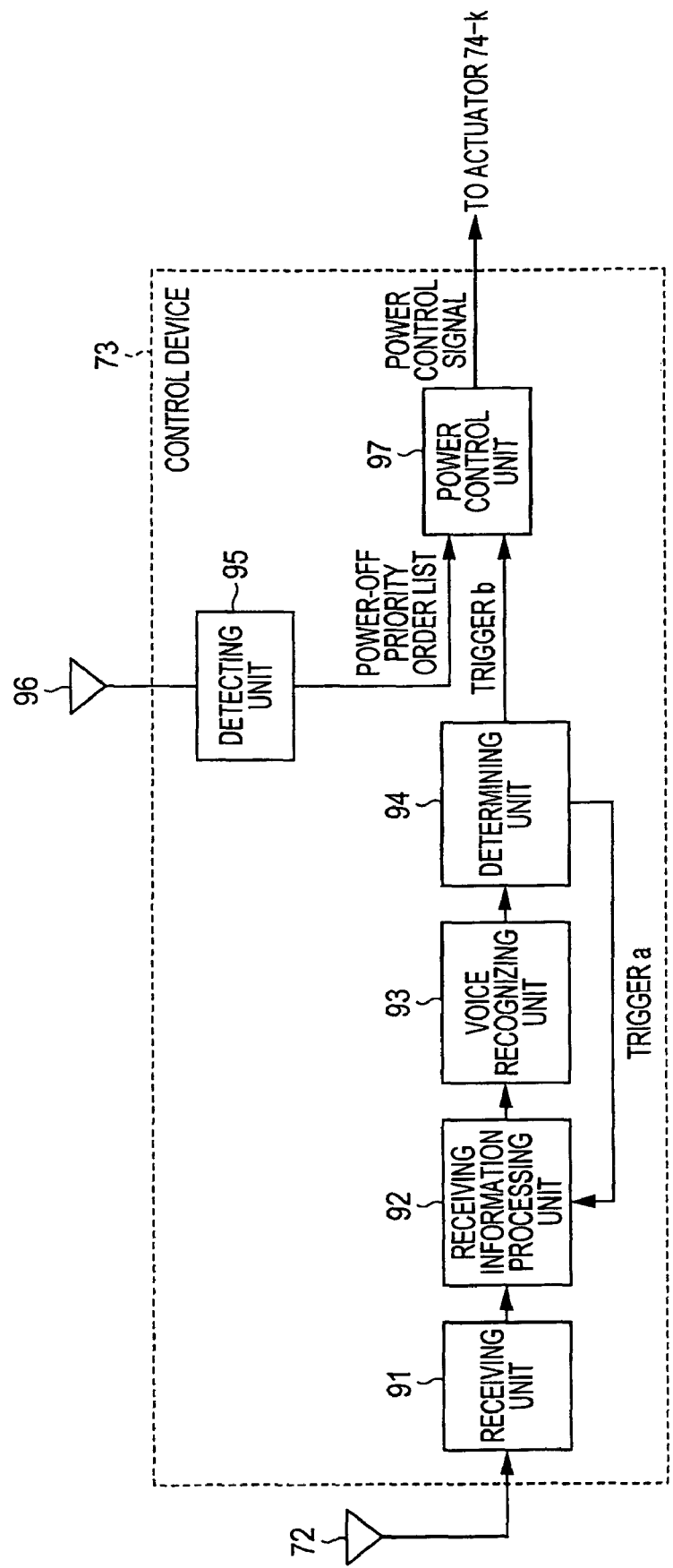
FIG. 17 is a block diagram illustrating a configuration example of a control device 73.

FIG. 17 is a block diagram illustrating a configuration example of the control device 73 in FIG. 16.

The control device 73 comprises a receiving unit 91, a receiving information processing unit 92, a voice recognizing unit 93, a determining unit 94, a detecting unit 95, an antenna 96, and an electric control unit 97. Note that the receiving unit 91, receiving information processing unit 92, voice recognizing unit 93, and determining unit 94 correspond to the receiving unit 21, receiving information processing unit 22, voice recognizing unit 23, determining unit 24 in FIG. 4 respectively, and perform basically the same processing of the receiving unit 21, receiving information processing unit 22, voice recognizing unit 23, determining unit 24 in FIG. 4.

The detecting unit 95, based on the wireless tag received at the antenna 96, transmitted from the iron 81, electric heater 82, refrigerator 83, PC 84, and the other unshown electronic apparatuses, identifies the type of an electronic apparatus connected to an electric socket of the room 75 through room 78 and the electric socket connected with the electronic apparatus. Further, the detecting unit 95 generates a power-off order-of-priority list which lists the order of turning off power supply to the electronic apparatuses connected to the electric sockets of the room 75 through room 78, and supplies this to the power control unit 97.

The antenna 96, for example, is a non-directional antenna, which receives a wireless tag transmitted from the electronic apparatus connected to the electric socket of the room 75 through room 78, such as the iron 81, for example, and supplies this to the detecting unit 95.

Upon the determining unit 94 recognizing that there is a danger potential to output a trigger b, the power control unit 97 acquires a power-off order-of-priority list from the detecting unit 95, and controls the actuator 74-$k$ based on the power-off order-of-priority list. Thus, the power control unit 97 shuts off power supply to the electric sockets of the room 75 through room 78, and consequently, the electronic apparatuses connected to the electric sockets.

Figure 18:
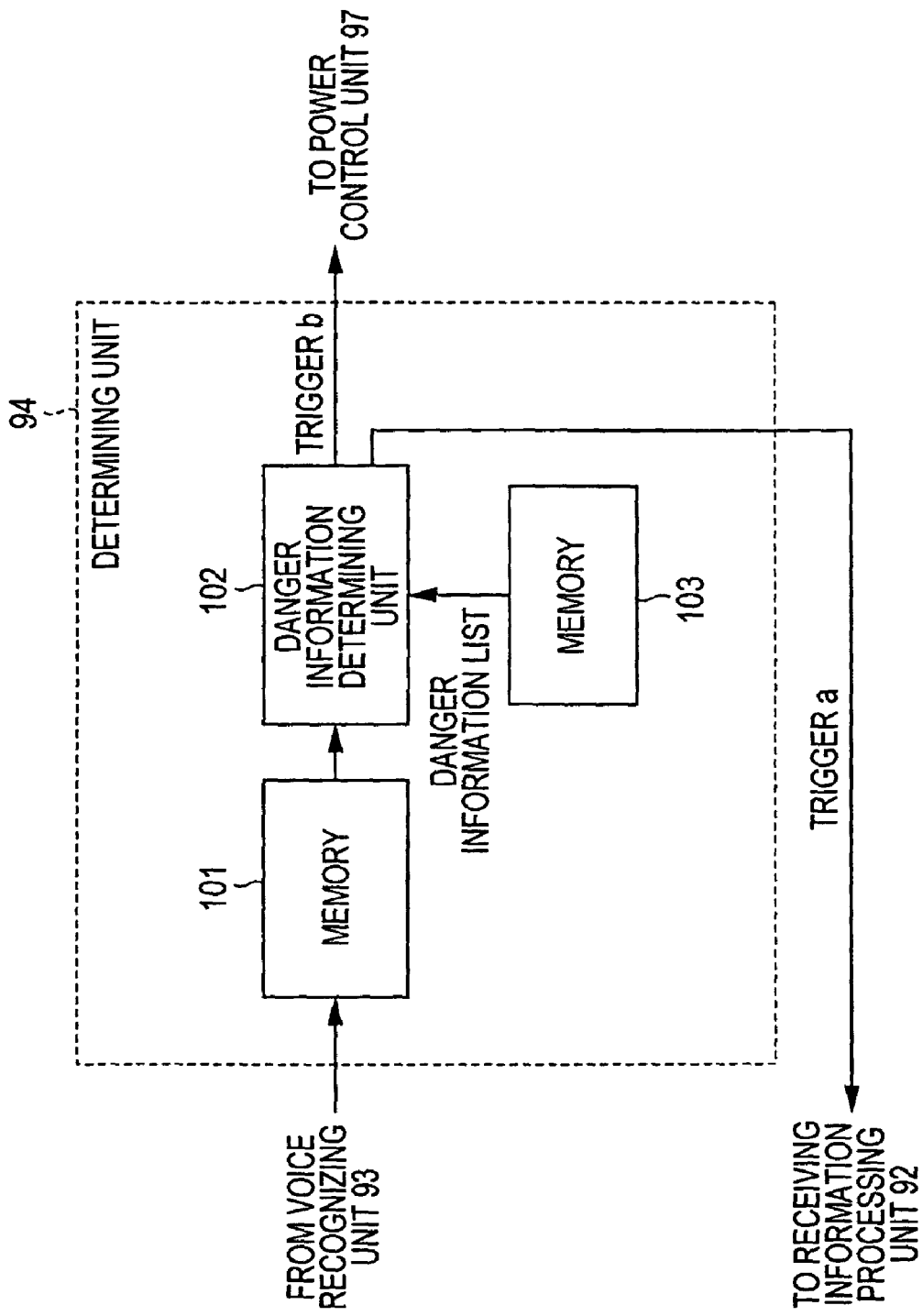
FIG. 18 is a block diagram illustrating a configuration example of a determining unit 94.

FIG. 18 is a block diagram illustrating a configuration example of the determining unit 94 in FIG. 17.

The determining unit 94 in FIG. 18 comprises memory 101, a danger information determining unit 102, and memory 103. Note that the memory 101, danger information determining unit 102, and memory 103 in FIG. 18 correspond to the memory 51, danger information determining unit 52, and memory 53 in FIG. 6 respectively, and perform the same processing as those.

Note however, that the memory 103 stores a danger information list which is different from the danger information list stored in the memory 53 in FIG. 6.

Figure 19:
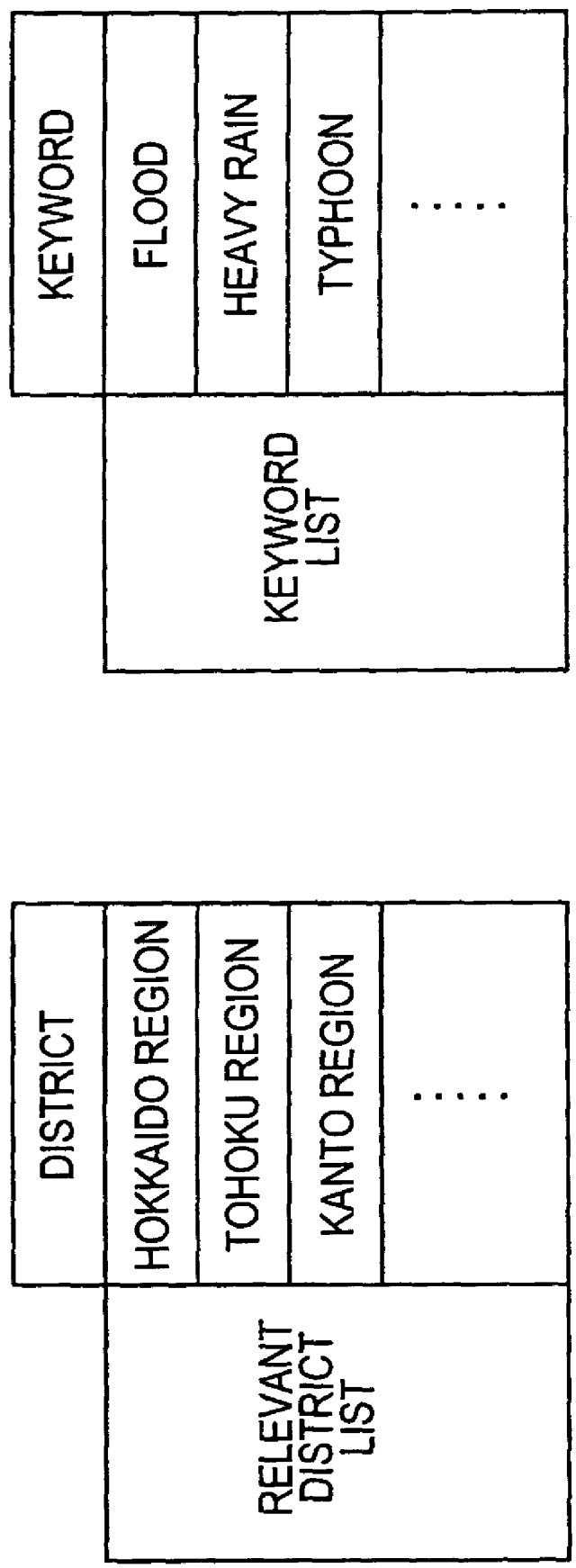
FIG. 19 is a diagram illustrating a danger information list stored in the memory 103 in FIG. 18.

FIG. 19 illustrates an example of the danger information list stored in the memory 103 in FIG. 18.

The memory 103 stores two danger information lists shown in the left and right of FIG. 19, for example.

The left diagram illustrates the danger information list into which names representing places such as Hokkaido region, Tohoku region, and Kanto region are registered as danger information (hereinafter, referred to as relevant district list as appropriate). For example, in the event that a phenomenon which brings disasters such as flooding and water immersion, whether or not danger due to the phenomenon which brings disaster such as flooding and water immersion approaches the user's house is greatly influenced by the spatial relationship between the place where the phenomenon which brings disaster such as flooding and water immersion occurs and the place where the user's house is present, for example. Accordingly, the relevant region list into which places are registered are a vital list (MUST list) at the time of determining whether or not danger is approaching the districts near the user's house. Examples of relevant district information serving as danger information which is registered in the relevant district list include the names of the districts where danger may reach the user's house in the event that a phenomenon which brings disaster such as flooding and water immersion occurs at such a district, such as districts near the user's house in distance such as the district where the user's house is built, i.e., the district where the user lives, districts adjacent to the district where the user lives, and so forth.

The right diagram illustrates a danger information list into which keywords serving as names representing dangerous phenomena such as floods, heavy rain, and typhoons are registered as danger information (hereinafter, referred to as keyword list as appropriate). Note that as for keywords serving as names representing dangerous phenomena which are danger information, and registered in the keyword list, names of dangerous phenomena whereby danger may approach the user's house are employed, such as "floods" causing damage such as water immersion, "heavy rains" causing roof leaks, flooding, and further land subsidence, and the like, and "typhoons" accompanied by torrential rains.

Note that as for a creating method and the like of the danger information list in FIG. 19, the same method in the case of the danger information list in FIG. 7 can be employed.

Figure 20:
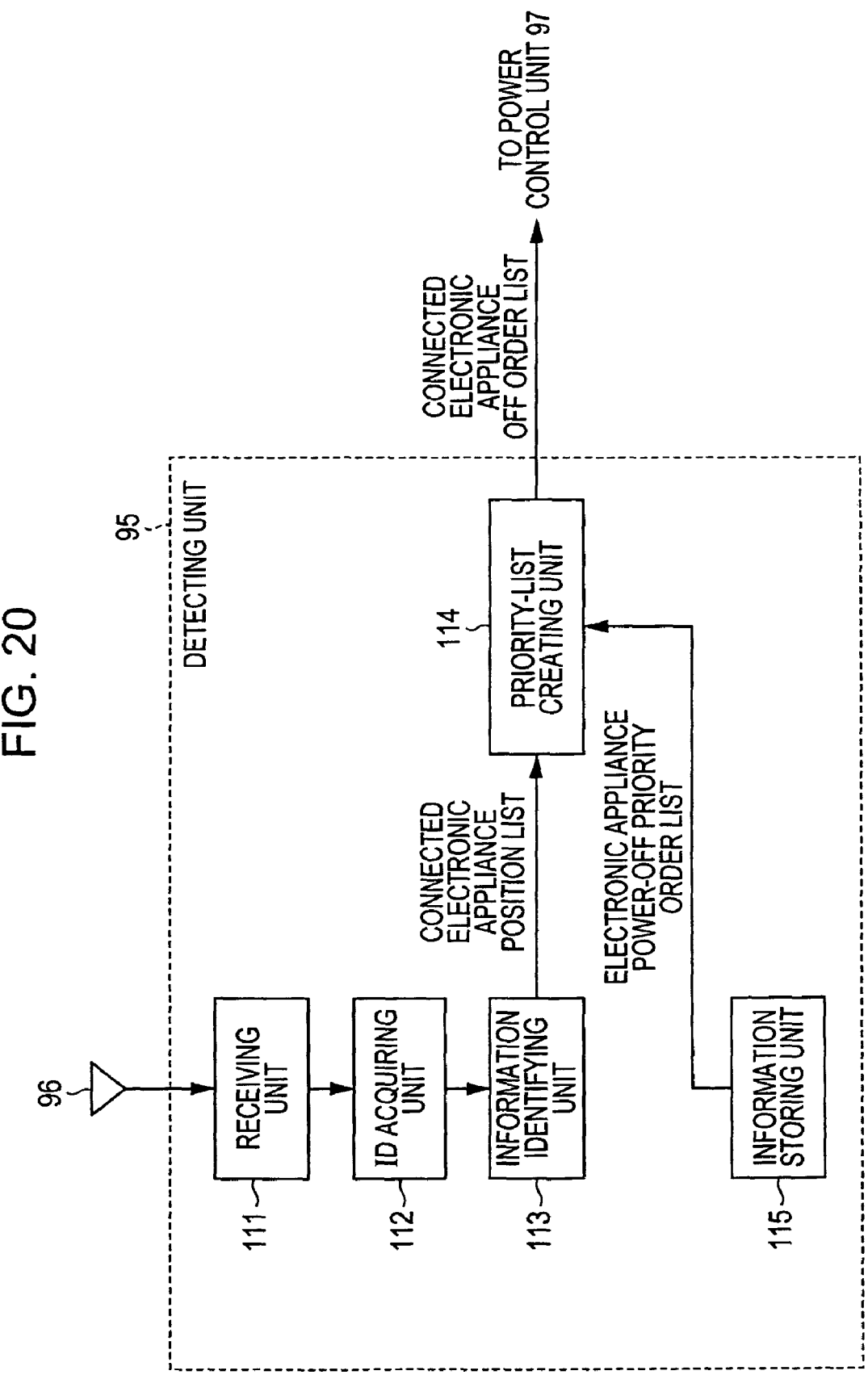
FIG. 20 is a block diagram illustrating a configuration example of a detecting unit 95.

FIG. 20 is a block diagram illustrating a configuration example of the detecting unit 95 in FIG. 17.

The detecting unit 95 comprises a receiving unit 111, an ID (Identification) acquiring unit 112, an information identifying unit 113, a priority list creating unit 114, and an information storing unit 115.

The receiving unit 111 receives a wireless tag, which is supplied from the antenna 96, transmitted from the plug of an electronic apparatus connected to an electric socket of the room 75 through room 78 such as the iron 81 (the details will be described later in FIG. 22), and supplies this to the ID acquiring unit 112. Note that the plug of an electronic apparatus receives power supply from the electric socket and transmits a wireless tag only in the event of being connected to (inserted in) an electric socket. Also, a wireless tag transmitted from an electronic apparatus includes the ID peculiar to the electronic apparatus, and electric socket information which is information for identifying the electric socket to which the electronic apparatus is connected.

The ID acquiring unit 112 recognizes and acquires the ID of an electronic apparatus, and the electric socket information of the electric socket to which the electronic apparatus is connected from the wireless tag supplied from the receiving unit 111, and supplies the ID and electric socket information to the information identifying unit 113.

The information identifying unit 113 creates and acquires a connected electronic apparatus list which associates (the type of) the electronic apparatus identified by the ID with the electric socket information of the electric socket to which the electronic apparatus is connected (correlation between an electronic apparatus and the electric socket to which the electronic apparatus is connected) based on a set of the ID and electric socket information of an electronic apparatus supplied from the ID acquiring unit 112, and supplies this to the priority-list creating unit 114.

The priority-list creating unit 114 reads out an electronic-apparatus power-off order-of-priority list which stores the order of priority of electronic apparatuses of which power supply is shut off from the information storing unit 115. Further, the priority-list creating unit 114, based on the order of priority listed in the electronic-apparatus power-off order-of-priority list read out from the information storing unit 115, creates a connected electronic-apparatus order-of-off list in which the electronic apparatuses listed in the connected electronic apparatus list supplied from the information identifying unit 113 are sorted in the order which turns off the power supply thereof, and supplies this to the power control unit 97.

The information storing unit 115 stores the electronic-apparatus power-off order-of-priority list.

Figure 21:
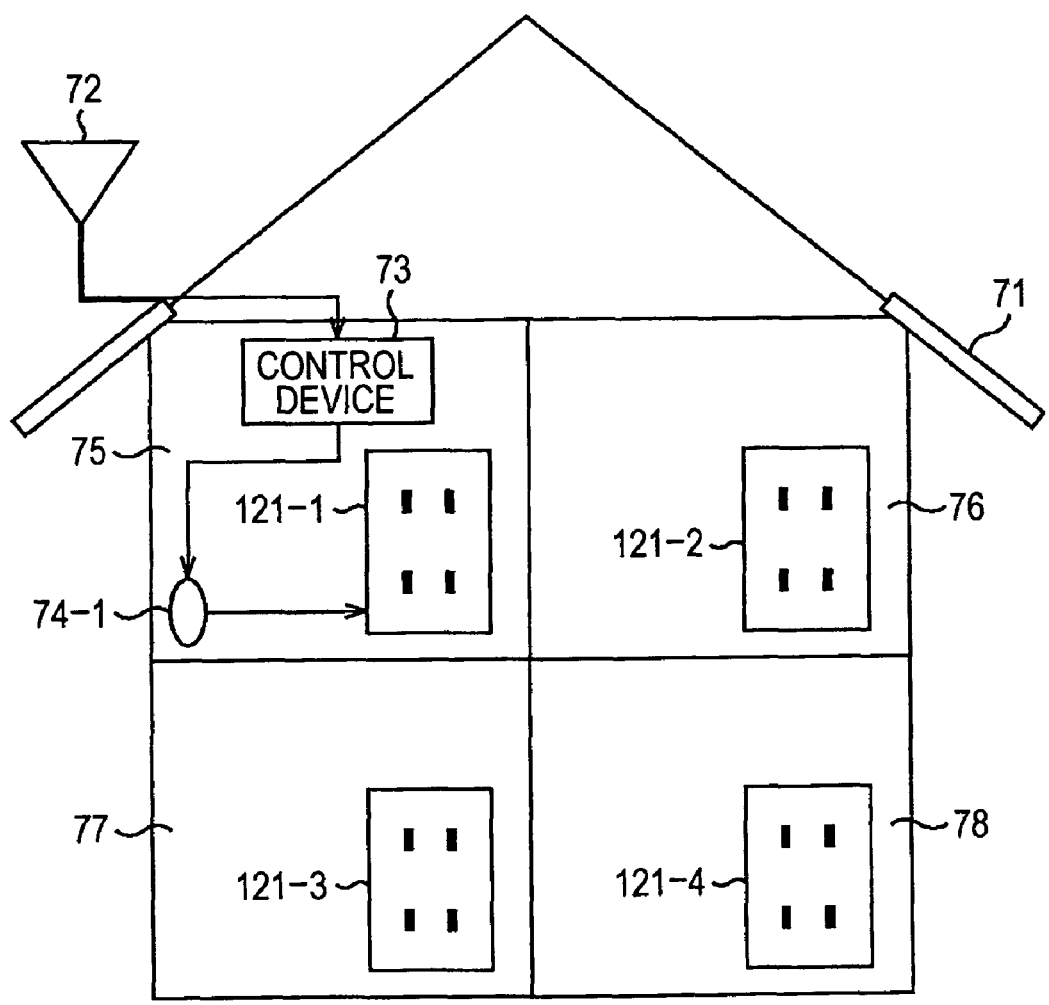
FIG. 21 is a diagram illustrating an electric socket installed in a house 71.

FIG. 21 illustrates an electric socket 121-1 through electric socket 121-4 installed in the room 75 through room 78 of the house 71.

In FIG. 21, for example, the actuator 74-1 is configured so as to control power supply to the electric socket 121-1.

Also, the control device 73 recognizes that it is the actuator 74-1 to control power supply to the electric socket 121-1 installed in the room 75. In the same way, even with regard to the other electric socket 121-2 through electric socket 121-4, the control device 73 recognizes the actuators to control power supply thereof. Subsequently, the control device 73, for example, in the event that power supply to the electric socket 121-1 needs to be shut off, controls the actuator 74-1 to shut off power supply to the electric socket 121-1.

Figure 22:
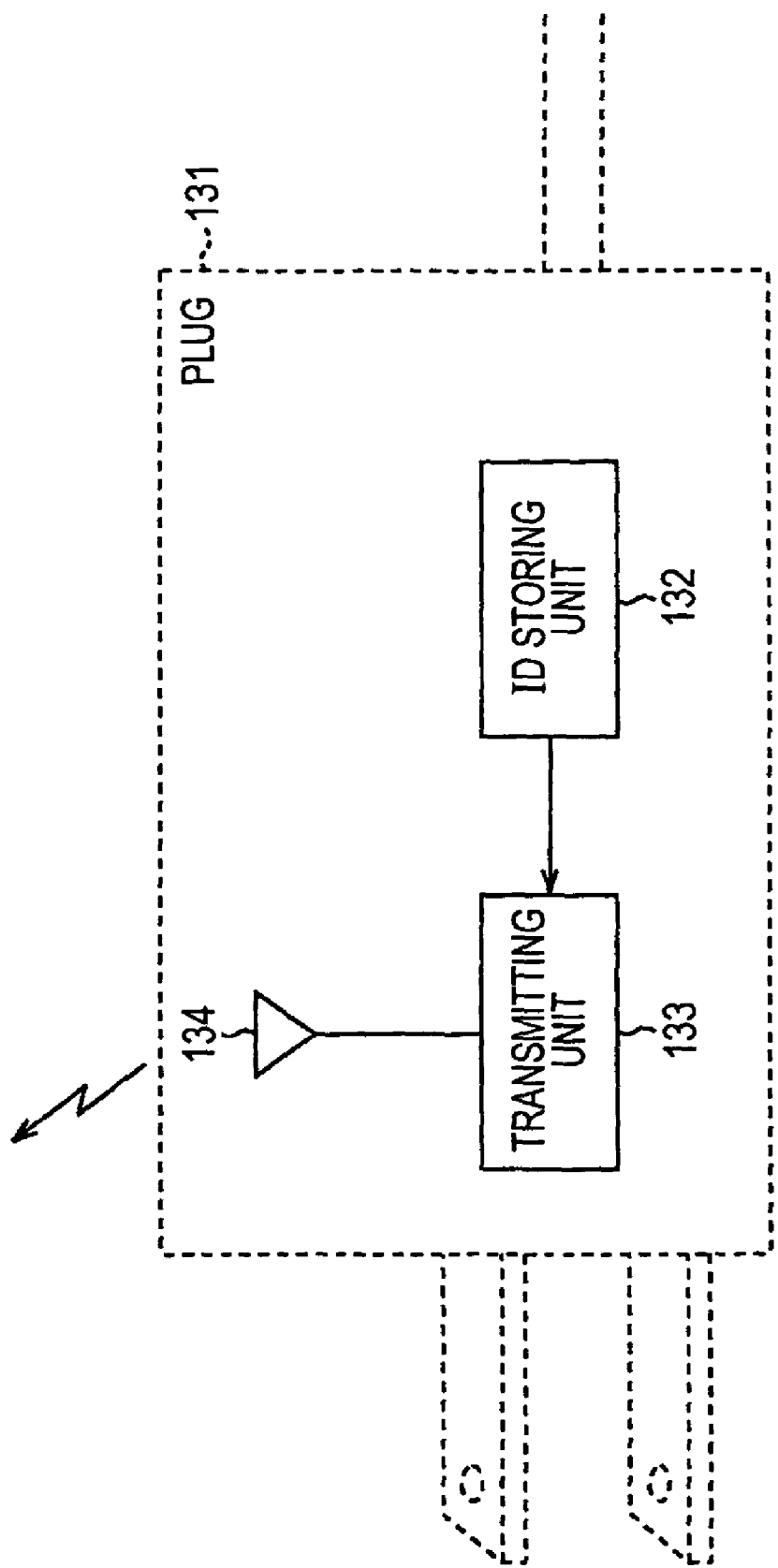
FIG. 22 is a block diagram illustrating a configuration example of a plug 131 of an electronic apparatus.

FIG. 22 is a block diagram illustrating an configuration example of the plug of an electronic apparatus such as the iron 81, electric heater 82, refrigerator 83, and PC 84.

A plug 131 comprises an ID storing unit 132, a transmitting unit 133, and an antenna 134.

The ID storing unit 132 stores the ID, which can identify an electronic apparatus, unique to the electronic apparatus. Note that a part of the IDs stored in the ID storing unit 132 are, for example, unique for every type of the electronic apparatus. Accordingly, with this ID, in addition to identifying an electronic apparatus itself, the type of the electronic apparatus can be also distinguished (identified).

In the event that the plug 131 is connected to the electric socket 121-$m$ (here, m=1, 2, 3, 4), the transmitting unit 133 starts its operation in response to power supply from the electric socket 121-$m$, and reads out an ID from the ID storing unit 132. Also, the transmitting unit 133 acquires from the electric socket 121-$m$ connected with the plug 131 the electric socket information for identifying the electric socket 121-$m$. That is to say, the electric socket 121-$m$ stores the electric socket information for identifying itself. The electric socket 121-$m$, upon the plug 131 being connected thereto, outputs the electric socket information of itself to the plug 131, and the transmitting unit 133 acquires the electric socket information thus supplied from the electric socket 121-$m$. Further, the transmitting unit 133 transmits the set of the ID from the ID storing unit 132 and the electric socket information acquired from the electric socket 121-$m$ from the antenna 134 via airwaves as a wireless tag.

Here, as for electric socket information, arbitrary information may be employed, such as the ID which can identify the electric socket 121-$m$. For example, in the event that an IP (Internet Protocol) address is assigned to the electric socket 121-$m$, the IP address may be employed as electric socket information.

FIG. 23 illustrates an example of the connected electronic apparatus list created by the information identifying unit 113 in FIG. 20.

The connected electronic apparatus list in FIG. 23 illustrates that the electric socket 121-1 is connected with the iron 81 and an unshown electric hot-water pot serving as electronic apparatuses. Similarly, it is illustrated that the electric socket 121-2 is connected with the electric heater 82, the electric socket 121-3 is connected with the refrigerator 83 and an unshown electronic oven, and the electric socket 121-4 is connected with the PC 84, respectively. That is to say, the detecting unit 95 in FIG. 17, in the event that the plug 131 of the electronic apparatus in FIG. 22 is connected to the electric socket 121-$m$, receives the ID peculiar to the electronic apparatus transmitted from the plug 131 as a wireless tag, and the electric socket information of the electric socket 121-$m$ connected with the electronic apparatus, and associates the ID with the electric socket information, thereby creating the connected electronic apparatus list in FIG. 23.

FIG. 24 illustrates an example of the electronic-apparatus power-off order-of-priority list stored by the information storing unit 115 in FIG. 20.

The electronic-apparatus power-off order-of-priority list in FIG. 24 associates an electronic apparatus with the order of priority of shutting off power supply to the electronic apparatus when there is a danger potential. In FIG. 24, the order of priority of an iron is set to 1, the order of priority of an electric heater is set to 2, the order of priority of an electric cooker is set to 3, the order of priority of an electric hot-water pot is set to 4, and the order of priority of a refrigerator is set to 5, respectively.

In FIG. 24, the sets of an electronic apparatus and an order of priority are sorted in the order of priority.

Note that with the electronic apparatuses which generate heat, such as an iron, and an electric heater, in the event that danger occurs, such as disaster occurring in the district where the house 71 is present, the power source thereof are preferably quickly turned off with high priority, to avoid a secondary disaster, fire (or to prevent the electronic apparatuses from failure). To this end, with the electronic-apparatus power-off order-of-priority list in FIG. 24, the order of priority of the electronic apparatuses which generate heat, such as the iron and electric heater, is set as high ranking.

On the other hand, it is desirable that a PC which is necessary as means for acquiring information, such as searching the current situation of disaster using the Internet, can be used even when disaster occurs. Also, it is desirable that lights, which light the room 75 through room 78 of the house 71, can be used until evacuation has been completed, in the event that disaster occurs and it is necessary to take evacuate the house 71. To this end, with the electronic-apparatus power-off order-of-priority list, the order of priority of the electronic apparatuses such as a PC and lighting is set as low ranking. Note that with the electronic-apparatus power-off order-of-priority list in FIG. 24, a period since it is recognized that there is a danger potential until power supply is turned off can be associated with each of the electronic apparatuses and registered such that the electronic apparatuses which generate heat, such as an iron, electric heater are quickly turned off, also such that a PC, lights, and the like, can be used for a predetermined period as necessary.

FIG. 25 illustrates another example of the electronic-apparatus power-off order-of-priority list.

The electronic-apparatus power-off order-of-priority list in FIG. 25 is the same as the case in FIG. 24 except that the electronic apparatuses are sorted in the order of ascending priorities, so the description thereof will be omitted.

FIG. 26 illustrates the connected electronic-apparatus order-of-off list created by the priority-list creating unit 114.

The priority-list creating unit 114 creates the connected electronic-apparatus order-of-off list in FIG. 26 by sorting (the ID of) the electronic apparatuses registered in the connected electronic apparatus list in FIG. 23 supplied from the information identifying unit 113 along with the electric socket information associated with the electronic apparatuses in the order of priority registered in the electronic-apparatus power-off order-of-priority list in FIG. 24.

Note that with the connected electronic-apparatus order-of-off list in FIG. 26, in addition to the sets of (the ID of) an electronic apparatus and electric socket information, a power-off order serving as an order of priority for shutting off power supply to an electronic apparatus is also illustrated as a matter of convenience. In FIG. 26, the power-off order of the iron is set to 1, the power-off order of the electric heater is set to 2, the power-off order of the electric hot-water pot is set to 3, the power-off order of the refrigerator is set to 4, the power-off order of the lights is set to N−1, and the power-off order of the PC is set to N, respectively.

Figure 27:
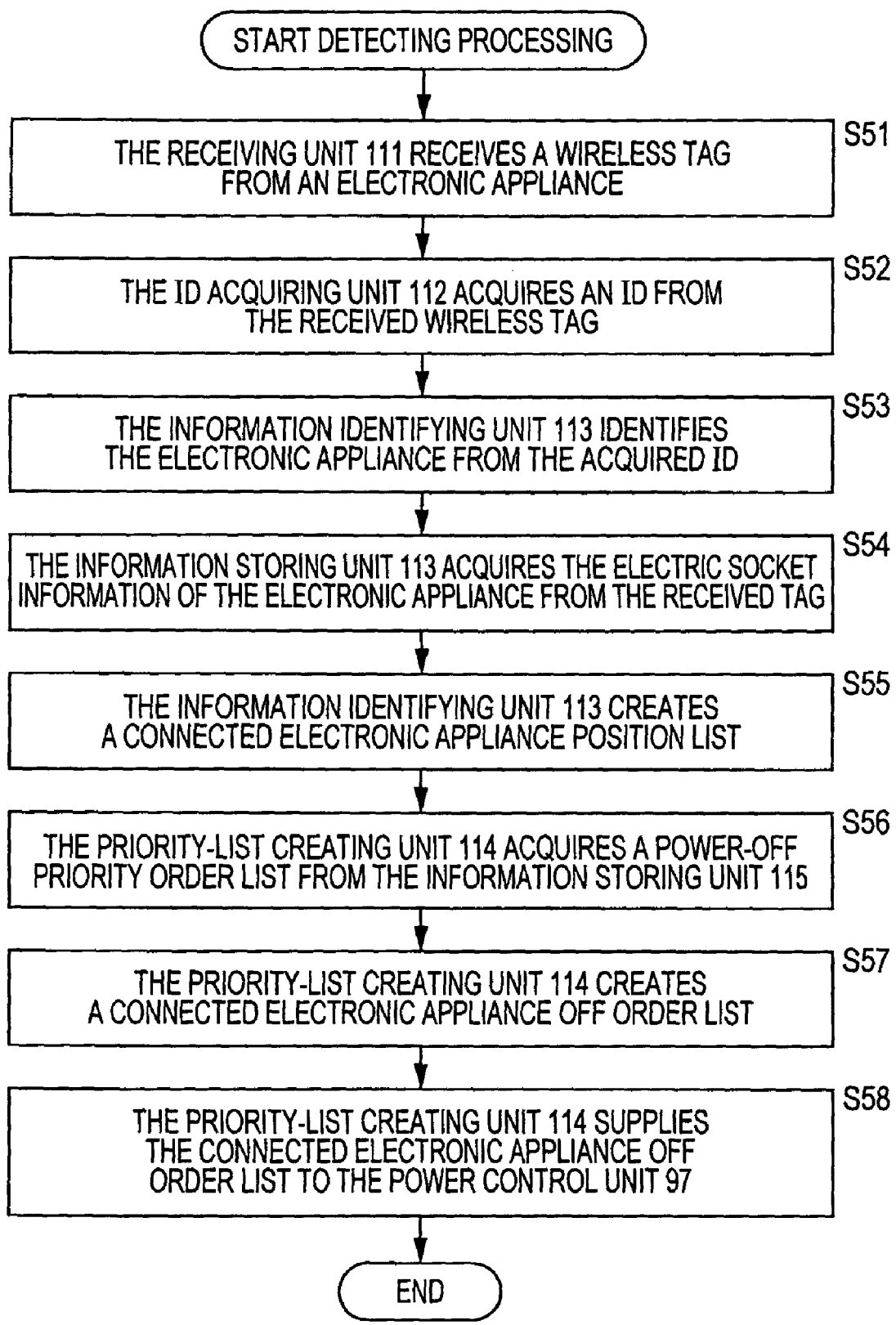
FIG. 27 is a flowchart describing the detecting processing of the detecting unit 95.

FIG. 27 is a flowchart describing the processing (detecting processing) of the detecting unit 95 in FIG. 20.

In step S51, the receiving unit 111 starts receiving of a wireless tag transmitted from the plug 131 of the electronic apparatus connected to the electric socket 121-$m$, supplied from the antenna 96. Subsequently, the receiving unit 111 subjects the received wireless tag to predetermined processing, supplies this to the ID acquiring unit 112, and the flow proceeds to step S52 from step S51.

In step S52, the ID acquiring unit 112 acquires the ID of the electronic apparatus from the wireless tag supplied from the receiving unit 111, supplies this along with the wireless tag to the information identifying unit 113, and the flow proceeds to step S53.

In step S53, the information identifying unit 113 identifies from the ID of the electronic apparatus supplied from the ID acquiring unit 112 the electronic apparatus, and the flow proceeds to step S54.

In step S54, the information identifying unit 113 further acquires from the wireless tag received at the receiving unit 111 in step S51 the electric socket information of the electric socket to which the electronic apparatus is connected, and the flow proceeds to step S55.

In step S55, the information identifying unit 113 creates the connected electronic apparatus list described in FIG. 23 by associating the electronic apparatus identified in step S53 with the electric socket information of the electric socket to which the identified electronic apparatus is connected, supplies this to the priority-list creating unit 114, and the flow proceeds to step S56.

In step S56, the priority-list creating unit 114 reads and acquires the power-off order-of-priority list from the information storing unit 115, and the flow proceeds to step S57.

In step S57, the priority-list creating unit 114 creates the connected electronic-apparatus order-of-off list in FIG. 26 by sorting the electronic apparatuses listed in the connected electronic apparatus list supplied from the information identifying unit 113 in step S55 in the order of power-off based on the electronic-apparatus power-off order-of-priority list acquired from the information storing unit 115 in step S56, and the flow proceeds to step S58.

In step S58, the priority-list creating unit 114 supplies the connected electronic-apparatus order-of-off list created to the power control unit 97, and the processing ends. Note that the processing in step S53 and the processing in step S54 may be processed in time series, or may be processed in parallel. Also, in FIG. 27, the processing in step S58 for transmitting the connected electronic-apparatus order-of-off list created to the power control unit 97 can be performed when the power control unit 97 requests the connected electronic-apparatus order-of-off list of the priority-list creating unit 114, for example.

Figure 28:
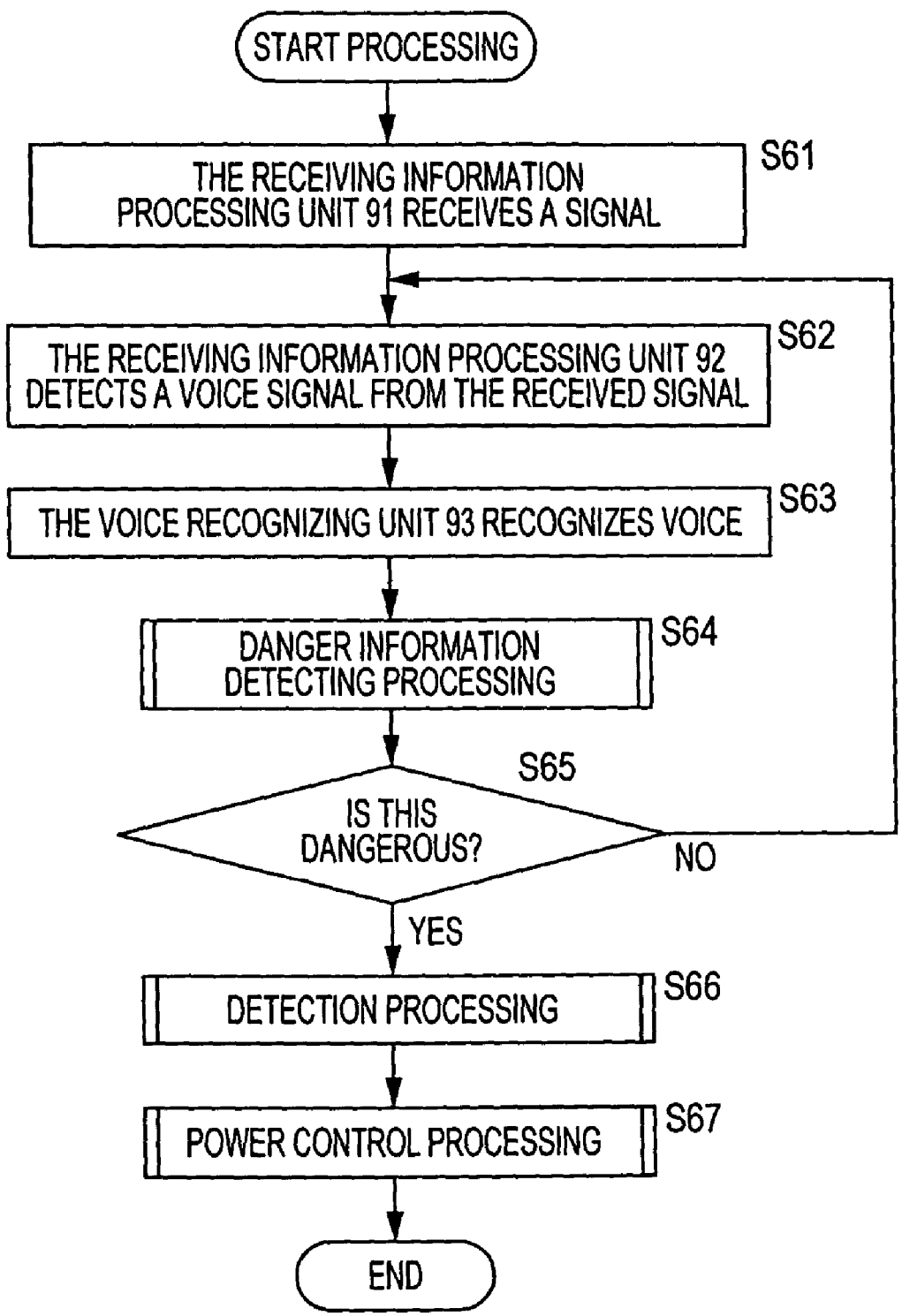
FIG. 28 is a flowchart describing the processing of the control device 73.

FIG. 28 is a flowchart describing the processing of the control device 73 in FIG. 17. Note that the processing in FIG. 28 starts upon the power source of the control device 73 being turned on, and the control device 73 becoming operative.

In step S61 through step S65, the same processing as that in step S1 through step S5 in FIG. 8 is performed. However, in step S64, with the danger information detecting processing performed by the determining unit 94 in FIG. 17, rather than danger information such as an intruder or burglar registered in the danger information list in FIG. 7, for example, danger information such as floods or heavy rain, for example, registered in the danger information list in FIG. 19, is detected. Subsequently, the determining unit 94 recognizes whether or not there is a danger potential based on the detection result of the danger information, and the flow proceeds to step S65 from step S64.

Subsequently, in step S65, in the event that determination is made that there is a danger potential, the determining unit 94 supplies a trigger b to the power control unit 97, and the flow proceeds to step S66.

In step S66, upon the trigger b being supplied from the determining unit 94, for example, the power control unit 97 requests the connected electronic-apparatus order-of-off list of the detecting unit 95. In response to the request of the power control unit 97, the detecting unit 95 performs the detecting processing described in FIG. 27, and thus, creates the connected electronic-apparatus order-of-off list in FIG. 26, and supplies this to the power control unit 97, and the flow proceeds to step S67 from step S66.

In step S67, the power control unit 97, based on the connected electronic-apparatus order-of-off list supplied from the detecting unit 95, supplies a power control signal to the actuator 79-$k$, performs power control processing for controlling power supply so as to turn off the power sources of the electronic apparatuses in the order of the connected electronic-apparatus order-of-off list, and the processing ends.

Note that the detecting processing in step S66 is not performed immediately following determining that there is a danger potential in step S65, but is performed periodically or irregularly, and the processing in step S67 can be performed using the connected electronic-apparatus order-of-off list obtained with the latest detecting processing.

Figure 29:
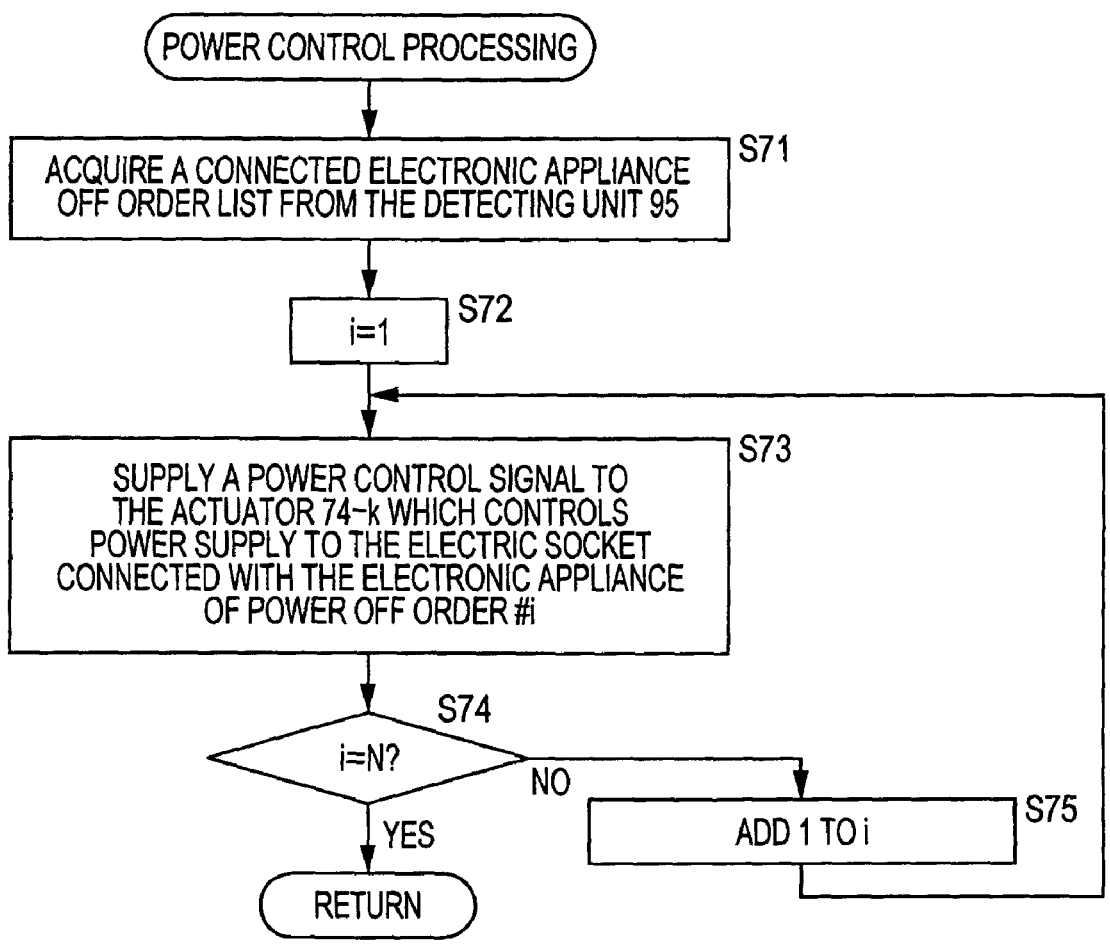
FIG. 29 is a flowchart describing power control processing.

FIG. 29 is a flowchart describing the power control processing in step S67 in FIG. 28.

In step S71, the power control unit 97 receives and acquires the connected electronic-apparatus order-of-off list supplied from the detecting unit 95, and the flow proceeds to step S72.

In step S72, the power control unit 97 initializes a variable #i representing power-off order to 1, and the flow proceeds to step S73.

In step S73, the power control unit 97 supplies a power control signal to the actuator 74-$k$ which controls power supply as to the electric socket 121-$m$ to which the electronic apparatus having the power-off order of #i of the connected electronic-apparatus order-of-off list obtained from the detecting unit 95 is connected, and thus, shuts off power supply to (the electric socket 121-$m$ connected to) the electronic apparatus, and the flow proceeds to step S74.

Here, a power control signal can include a period of grace, as if it were, until power supply is shut off. In this case, the actuator 74-$k$, after receiving the power control signal and only the period of grace contained in the power control signal passes, can shut off power supply to the electric socket 121-$m$.

In step S74, the power control unit 97 determines whether or not the variable #i is equal to the order N of the electronic apparatus having the lowest order of priority of the electronic apparatuses listed in the connected electronic-apparatus order-of-off list, i.e., whether or not power supply to all of the electric sockets connected to the electronic apparatuses listed in the connected electronic-apparatus order-of-off list has been shut off. In step S74, in the event that the variable #i is not equal to the order N of the electronic apparatus having the lowest order of priority, i.e., in the event that the electronic apparatuses of which power supply has not been shut off remain, the flow proceeds to step S75, where the power control unit 97 increments the variable #i by one, the flow returns to step S73, and hereinafter, the same processing is repeated.

On the other hand, in step S74, in the event that the variable #i is equal to the order N of the electronic apparatus having the lowest order of priority, i.e., in the event that the electronic apparatuses of which power supply has not been shut off do not remain, the flow returns.

Figure 30:
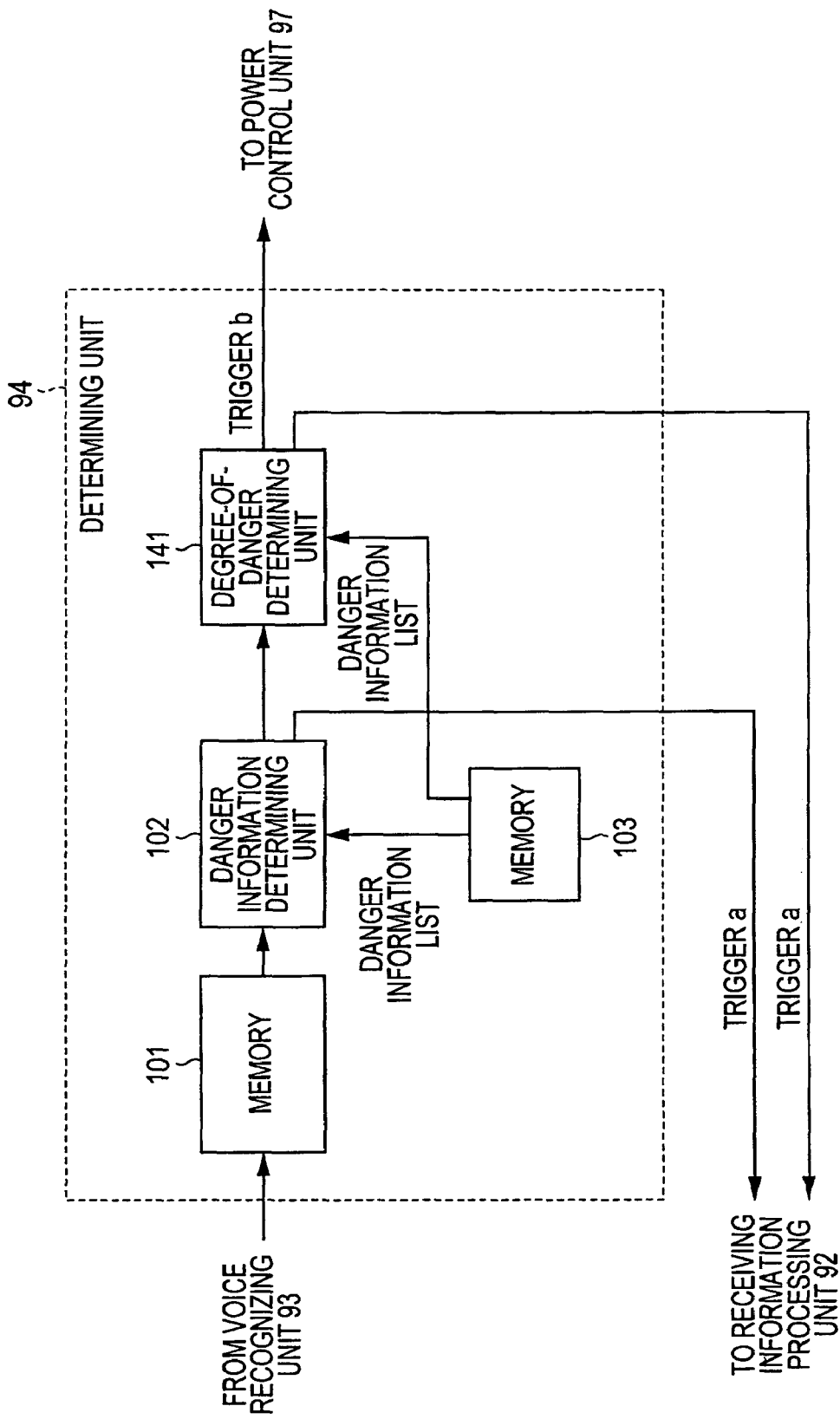
FIG. 30 is a block diagram illustrating another configuration example of the determining unit 94.

FIG. 30 is a block diagram illustrating another configuration example of the determining unit 94 in FIG. 17.

The determining unit 94 in FIG. 30 comprises memory 101, a danger information determining unit 102, memory 103, and a level-of-danger determining unit 141. The memory 101, danger information determining unit 102, and memory 103 in FIG. 30 have the same configuration as the case in FIG. 18, so description thereof will be omitted as appropriate. However, the memory 103 stores a danger information list which lists danger information accompanying a level of danger serving as importance of danger information. Also, the danger information determining unit 102, as with the case described in FIG. 18, is configured so as to detect the danger information registered in the danger information list stored in the memory 103 from the text, and determine whether or not there is a danger potential, and further supply the determination result to the level-of-danger determining unit 141, and also supply the danger information detected from the text to the level-of-danger determining unit 141.

Upon receiving information that there is a danger potential from the danger information determining unit 102, the level-of-danger determining unit 141 determines the level of danger with reference to the danger information list stored in the memory 103. That is to say, the level-of-danger determining unit 141 recognizes the level-of-danger of the danger information supplied from the danger information determining unit 102 along with the information that there is a danger potential based on the danger information list stored in the memory 103, and determines the level of the danger potential depending on the level-of-danger thereof. Subsequently, the level-of-danger determining unit 141, in the event that determination is made that the danger potential is high, as with the danger information determining unit 102 in FIG. 18, supplies a trigger b to the power supply processing unit 26 and actuator control unit 28. On the other hand, the level-of-danger determining unit 141, in the event that determination is made that the danger potential is low, as with the danger information determining unit 102 in FIG. 18, supplies a trigger a to the receiving information processing unit 22.

FIG. 31 illustrates an example of the danger information list stored in the memory 103 in FIG. 30.

The memory 103 in FIG. 30 stores the same two danger information lists shown in FIG. 19, for example.

However, with the danger information list in FIG. 31, a word serving as danger information registered therein is associated with a level-of-danger representing the level of danger in the case of the word being included in the text. Note that now, let us say that the smaller the value representing a level-of-danger, the higher the level of danger, as with the case in FIG. 14.

Now, if we say that the user's house is in the Hokkaido region, the probability that danger will reach the user (user's house) is higher when a dangerous phenomenon occurs in the Tohoku region than when a dangerous phenomenon occurs in the Kanto region. Also, the probability that danger will reach the user (user's house) is higher when a dangerous phenomenon occurs in the Hokkaido region than when a dangerous phenomenon occurs in the Tohoku region.

Accordingly, in FIG. 31, the level-of-danger of danger information "Hokkaido region" is "1" representing that the level of danger is the highest in the relevant district list which is a danger information list. Also, the level-of-danger of danger information "Tohoku region" is "2" representing that the level of danger is next highest. Subsequently, the level-of-danger of danger information "Kanto region" is "3" representing that the level of danger is one rank lower than the danger information "Tohoku region".

The danger information registered in the danger information list (keyword list) other than the relevant district list is also associated with a level-of-danger in the same way.

Figure 32:
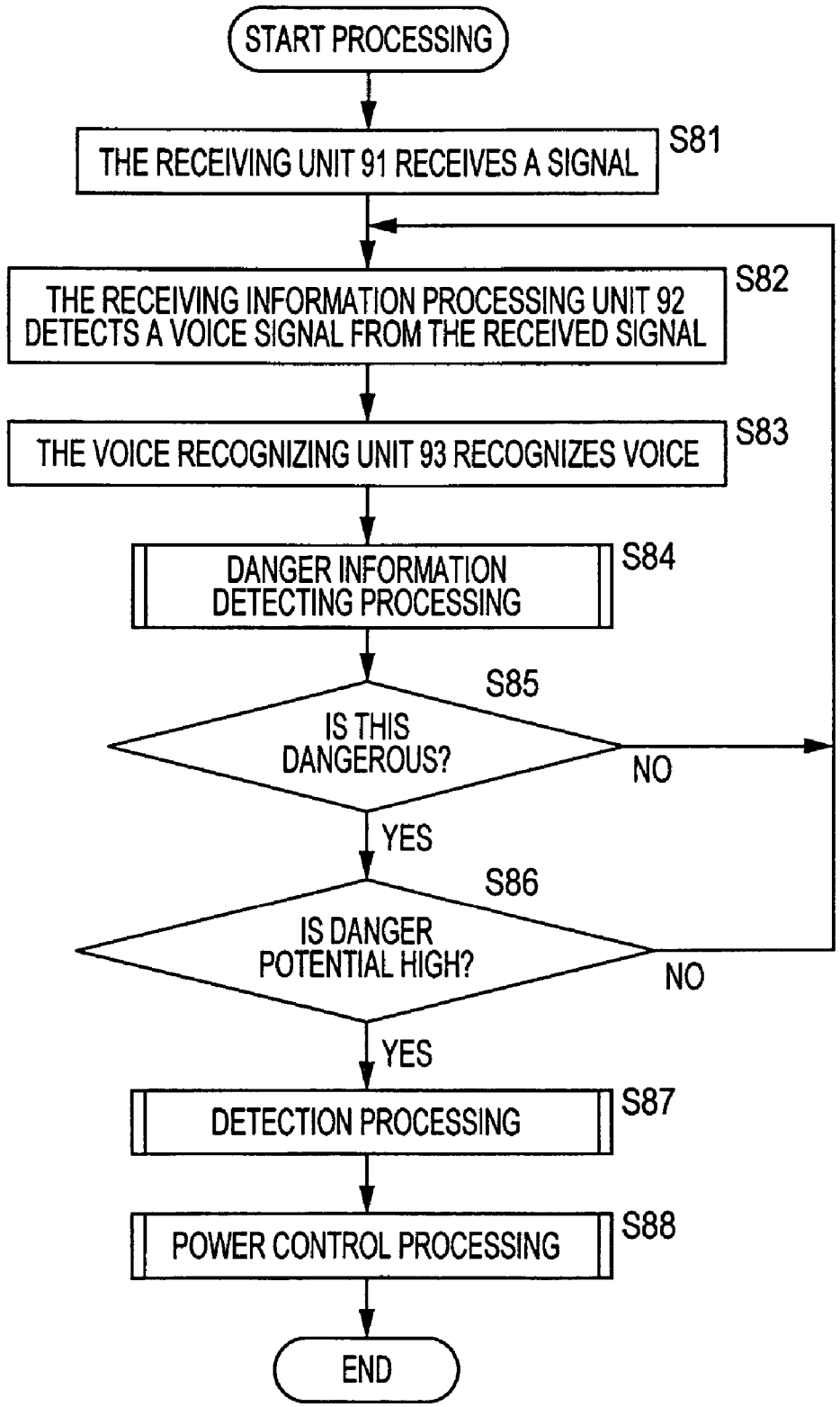
FIG. 32 is a flowchart describing the processing of the control device 73.

FIG. 32 is a flowchart describing the processing of the control device 73 in the case in which the determining unit 94 in FIG. 17 is configured such as shown in FIG. 30.

Note that as with the case in FIG. 28, the processing in FIG. 32 starts upon the power source of the control device 73 being turned on, and the control device 73 becoming operative. Also, the processing in step S81 through the processing in step S85 in FIG. 32 are the same as the processing in step S61 through the processing in step S65 in FIG. 28, so description thereof will be omitted.

However, in step S85, upon determining that there is a danger potential, the danger information determining unit 52 supplies the danger information included in the text obtained with the danger information detecting processing in step S84 corresponding to step S64 in FIG. 28 to the level-of-danger determining unit 141 along with the information that there is a danger potential, and the flow proceeds to step S86.

In step S86, the level-of-danger determining unit 141 recognizes the level-of-danger of the danger information from the danger information determining unit 52 with reference to the danger information list stored in the memory 103, and determines the level of the danger potential of the user (user's house) based on the level-of-danger.

Here, in step S86, for example, in the same way as the case described in step S46 in FIG. 15, the level of a danger potential can be determined.

In step S86, in the event that determination is made that a danger potential is not high, the flow returns to step S82, and hereinafter, the same processing is repeated. On the other hand, in step S86, in the event that determination is made that a danger potential is high, the flow proceeds to step S87, and step S88 sequentially, where the same detecting processing and power control processing as the case in step S66 and step S67 in FIG. 28 is performed.

Thus, with the house 71 in FIG. 16, in the event of receiving information informing disaster such as water immersion or flooding, when there is the probability for danger approaching the user (user's house 71), or when the probability for the danger approaching the user (user's house 71) is high, power supply to the electric socket to which an electronic apparatus is connected is shut off. Accordingly, electric shock caused by an electric device connected to an electric socket being short-circuited due to water immersion or flooding or the like, or the like can be prevented.

Also, power supply to electric sockets to which electronic apparatuses are connected is shut off in the order of priority as described above, whereby secondary disaster can be prevented, and also the evacuation route of the user can be secured.

Note that an arrangement may be made wherein, in addition to the control device 73, the control device 16 is also provided in the house 71, whereby the control device 16 and control device 73 can employ the danger information list into which both the danger information shown in FIG. 7 (FIG. 14) and FIG. 19 (FIG. 31) are registered. In this case, for example, when heavy rain falls, the house is sealed by the control device 16, whereby the house 71 can be prevented from water immersion due to the heavy rain, and electric devices can be prevented from failure due to getting wet.

Thus, the house in FIG. 3 and the house 71 in FIG. 16 can carry out sufficient avoidance of danger to danger information by controlling the state of facilities in the building intelligently and dynamically. That is to say, the house in FIG. 3 and the house 71 in FIG. 16 receive danger information, and can avoid the house from danger automatically.

The series of processing mentioned above in FIG. 3 through FIG. 32 can be executed using dedicated hardware, and also can be executed using software.

Figure 33:
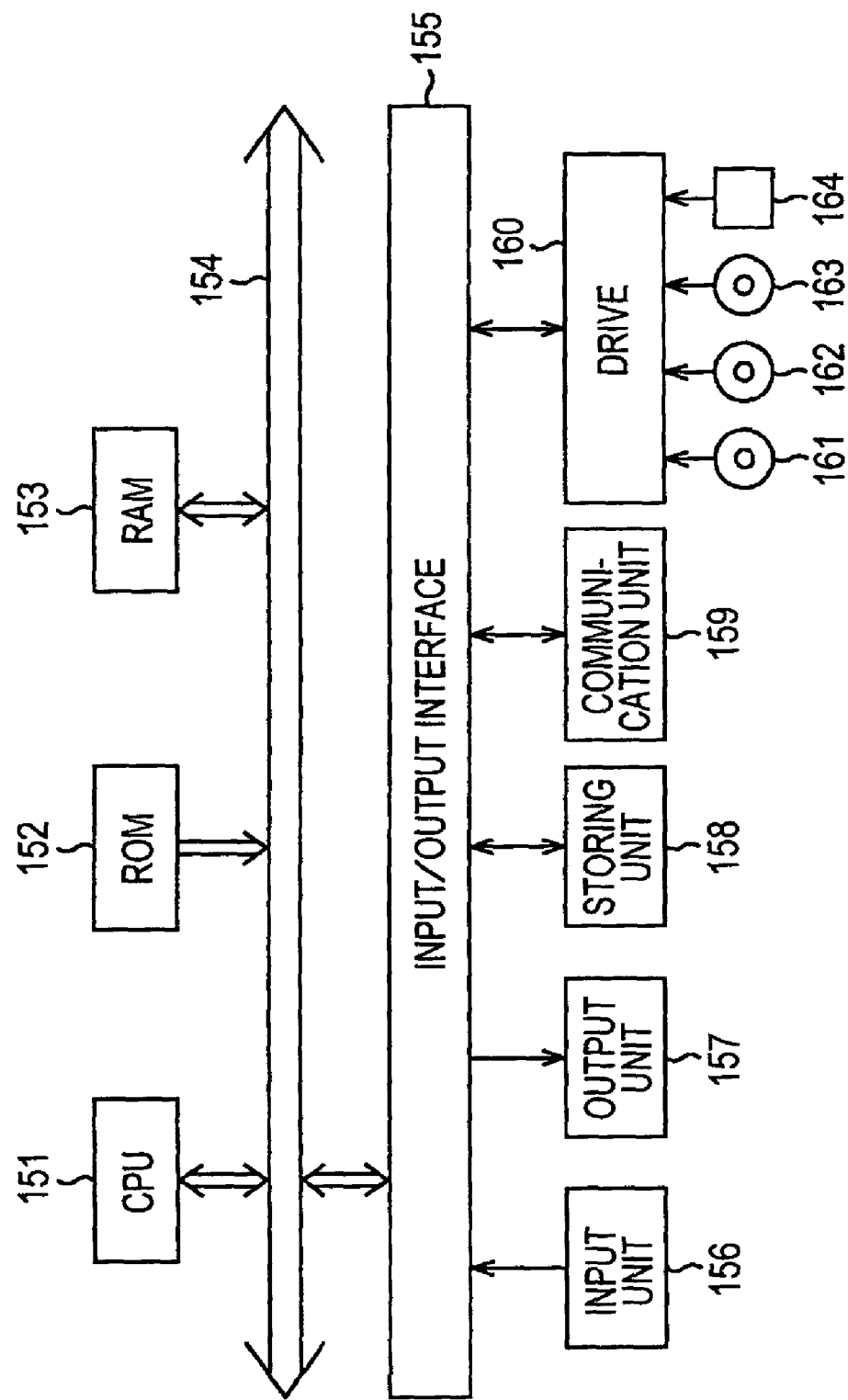
FIG. 33 is a block diagram illustrating a hardware example of a computer which realizes the control device 16 (control device 73).

In the event of executing a series of processing mentioned above in FIG. 3 through FIG. 32 using software, the control device 16 in FIG. 3 and the control device 73 in FIG. 16, for example, may be configured with a computer such as shown in FIG. 33 as a base.

That is to say, FIG. 33 illustrates a configuration example of the control device 16 (or control device 73) which is configured with a computer as a base.

In FIG. 33, a CPU (Central Processing Unit) 151 executes various processing in accordance with a program stored in ROM (Read Only Memory) 152, or a program loaded in RAM (Random Access Memory) 153 from a storing unit 158.

The RAM 153 also stores data necessary for the CPU 151 executing various processing as appropriate.

The CPU 151, CPU 152, and RAM 153 are mutually connected via a bus 154. This bus 154 is also connected with an input/output interface.

The input/output interface 155 is connected with an input unit 156 made up of a keyboard, mouse, and the like, an output unit 157 made up of a display and the like, a storing unit 158 made up of a hard disk and the like, and a communication unit 159.

The input/output interface 155 is also connected with a drive 160 as necessary, wherein a magnetic disk 161, optical disc 162, magneto-optical disc 163, or semiconductor memory 164 is mounted as appropriate, and a computer program read out therefrom is installed in the storing unit 158 as necessary.

In the event of executing a series of processing using software, a program making up the software is installed in the computer in FIG. 33 from a recording medium.

A program storing medium for storing a program which is installed in a computer, and is changed into an executable state by the computer, as shown in FIG. 33, comprises a package media made up of the magnetic disk 161 (including a floppy disk), optical disc 162 (including CD-ROM (Compact Disk-Read Only Memory), DVD (Digital Versatile Disk)), magneto-optical disk (including MD (Mini-Disk) (registered trademark)) or semiconductor memory 164, or the CPU 152 to which the program is temporarily or eternally stored, and a hard disk making up the storing unit 158, and the like. Storing a program in the program storing medium is performed using a cable or wireless communication medium such as a local area network, the Internet, and digital satellite broadcasting via an interface such as a router or modem as necessary.

The CPU 151 executes processing which the control device 16 (or control device 73) performs by executing the program installed in the storing unit 158.

Note that as for broadcasting transmitted with airwaves, television broadcasting, radio broadcasting, satellite broadcasting, and all the broadcasts that can acquire other voice information are employable.

Further, broadcasting is not restricted to broadcasting using airwaves, i.e., broadcasting using wireless communication, and may be cable broadcasting such as CATV.

Also, with the first embodiment and the second embodiment, an arrangement has been made wherein danger information is detected from voice information, but danger information may be detected from text information sent by a teletext, image information included in a broadcast signal, or the like.

Further, with the first embodiment and the second embodiment, an arrangement has been made wherein the control device 73 acquires the correlation between an electric socket and the electronic apparatus connected to the electric socket by receiving a wireless tag including the ID of the electronic apparatus, and the electric socket information of the electric socket to which the electronic apparatus is connected from the plug of the electronic apparatus, but in addition to this, this correlation can be obtained as follows, for example. That is to say, the electronic apparatus connected to an electric socket is controlled to transmit a wireless tag (airwaves) including ID. On the other hand, the detecting unit 95 is controlled to recognize the position of the electric socket beforehand, and further an antenna having directivity is employed as the antenna 96, which receives airwaves transmitted from the plug connected to the electric socket. Subsequently, the detecting unit 95 recognizes the direction of the plug from the direction of the airwaves transmitted from the plug connected to the electric socket, and also recognizes the distance to the plug from the received intensity of the airwaves. Subsequently, the detecting unit 95 recognizes the position of the plug from the recognized direction and distance of the plug, and can obtain, with the electric socket closest to the position serving as the electric socket to which the electronic apparatus having the plug is connected, the correlation between the electric socket and the electronic apparatus connected to the electric socket.

Third Embodiment

Figure 34:
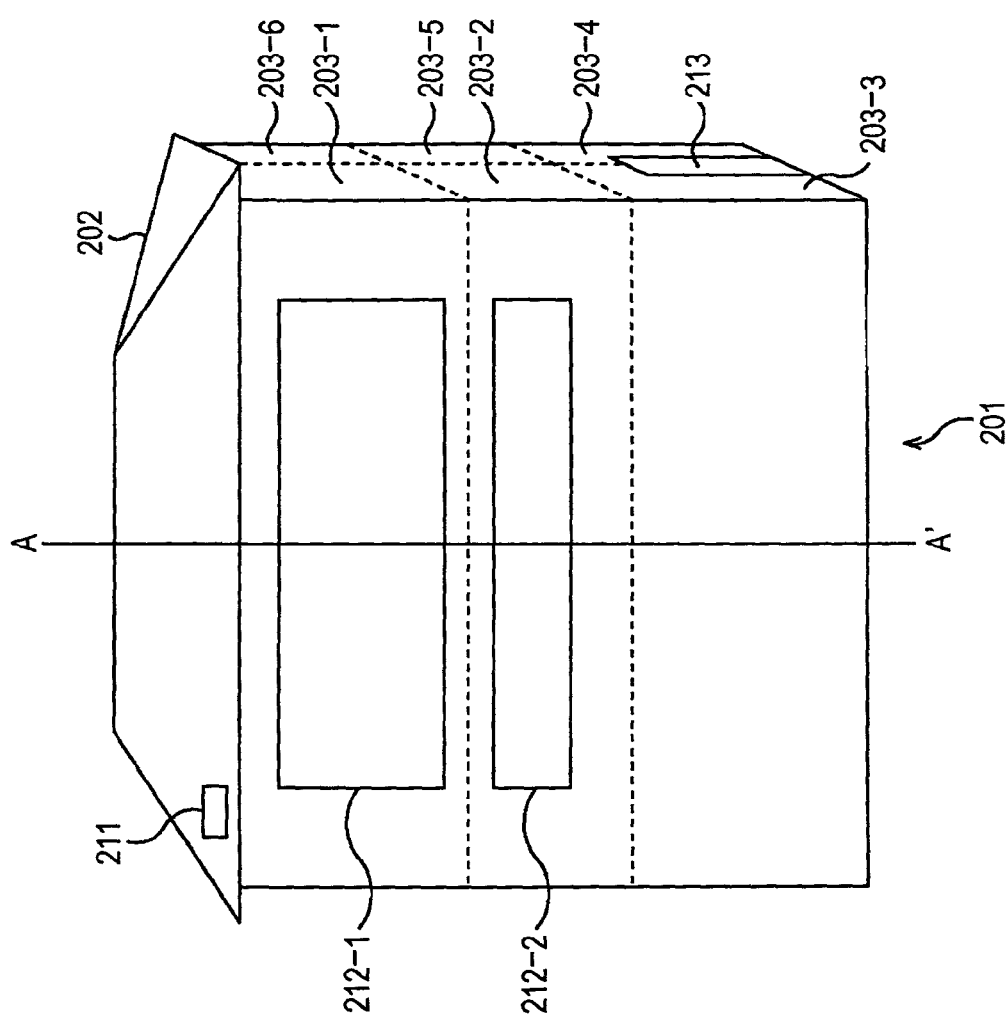
FIG. 34 is a perspective view illustrating a configuration example of a house to which the present invention is applied, serving as a third embodiment.

FIG. 34 is a perspective view illustrating a configuration example of a house to which the present invention is applied, serving as a third embodiment.

A house 201 comprises a roof 202, a residence unit 203-1 through residence unit 203-6, a sensor 211, a window 212-1 and window 212-2, an entrance 213, and so forth.

Of the house 201 in FIG. 34, the upper portion in the drawing is provided with the roof 202, and of the roof 202, the lower portion in the drawing is provided with six (multiple) generally rectangular parallelepiped residence unit (room) 203-1 through residence unit 203-6. In FIG. 34, the residence unit 203-3 and residence unit 203-4 make up the rooms of the first floor (basement), the residence unit 203-2 and residence unit 203-5 make up the rooms of the second floor, and the residence unit 203-1 and residence unit 203-6 make up the rooms of the third floor, respectively.

Also, of the roof 202, the left side in the drawing is provided with a sensor 211, the outer wall of the house 201 where the residence unit 203-1 and residence unit 203-2 are disposed in FIG. 34 is provided with a window 212-1 and window 212-2. Further, of the house 201, the central lower portion of the right side face in the drawing is provided with the entrance 213.

Now, with the present example, for example, let us say that the face where the window 212-1 and window 212-2 of the house 201 are provided is the front of the house 201.

The sensor 211 detects information from the outside of the house 201. For example, the sensor 211 comprises an antenna and receiver for detecting broadcast information, a video camera for filming the scenery of the outside of the house 201, and so forth.

With the house 201, the positions within the house 201 of the residence unit 203-1 through residence unit 203-6 are changed depending on the information detected by the sensor 211 and the like.

Figure 35:
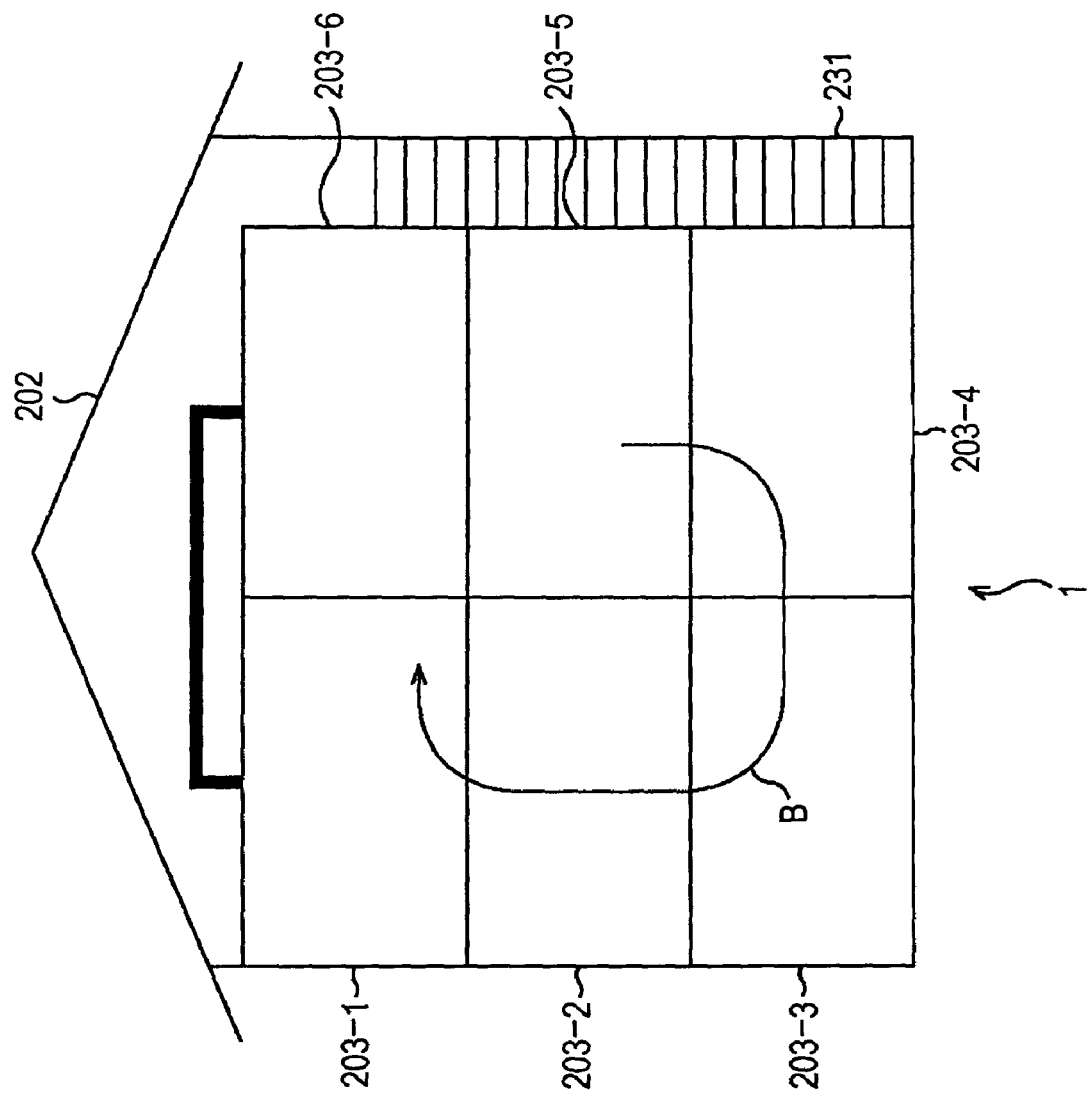
FIG. 35 is a cross-sectional view taken along a line A-A' of the house in FIG. 34.

FIG. 35 is a cross-sectional view taken along a line A-A' of the house 201 in FIG. 34, i.e., a cross-sectional view when viewing the house 201 in FIG. 34 from the right-side face direction.

With the house 201, of the residence unit 203-4 through residence unit 203-6, the right side in the drawing (the far side (back side) of the house 201 in FIG. 34) is provided with stairs 231.

The residence unit 203-1 through residence unit 203-6 are configured so as to turn in the direction of arrow B or in the opposite direction thereof, e.g., as with an automated parking tower, and thus, the positions within the house 201 of the residence unit 203-1 through residence unit 203-6 are changed. With the residence unit 203-1 through residence unit 203-6, the positions thereof within the house 201 are changed depending on the situation of each of the residence unit 203-1 through residence unit 203-6, the distribution of persons present in each of the residence unit 203-1 through residence unit 203-6 of the house, weather, time, and so forth.

Note that in FIG. 35, of the first floor, the left side in the drawing (the front side of the house 201 in FIG. 34) is positioned with the residence unit 203-3, and of the first floor, the right side in the drawing is positioned with the residence unit 203-4. Also, of the second floor, the left side in the drawing is positioned with the residence unit 203-2, and of the first floor, the right side in the drawing is positioned with the residence unit 203-5. Further, of the third floor, the left side in the drawing is positioned with the residence unit 203-1, and of the third floor, the right side in the drawing is positioned with the residence unit 203-6.

Figure 36:
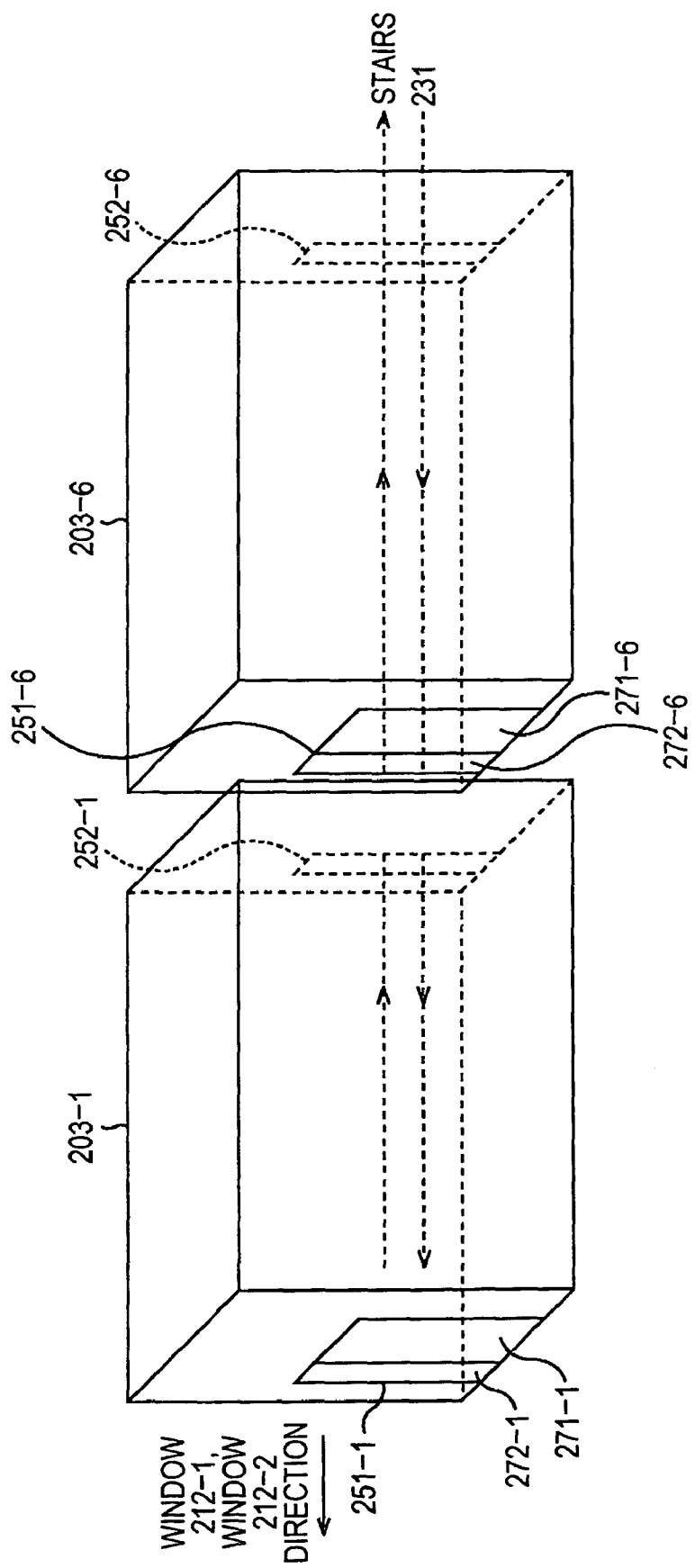
FIG. 36 is a perspective view illustrating a configuration example of a residence unit.

FIG. 36 is a perspective view illustrating a configuration example of the residence unit 203-1 and residence unit 203-6 when the residence unit 203-1 and residence unit 203-6 are arrayed in the back side direction from the front of the house 201, such as shown in FIG. 34 and FIG. 35.

In FIG. 36, for the sake of illustrating the configuration intelligibly, the residence unit 203-1 and residence unit 203-6 are illustrated with an interval, but actually, the right-side face in the drawing of the residence unit 203-1 is in contact with the left-side face in the drawing of the residence unit 203-6.

The residence unit 203-1 is provided with a window frame 251-1 and a door 252-1, and the residence unit 203-6 is provided with a window frame 251-6 and a door 252-6. Also, the window frame 251-1 of the residence unit 203-1 is provided with a windowpane 271-1, and a slide portion 272-1 serving as an opening portion is formed by this windowpane 271-1 sliding in the horizontal direction for example. The window frame 251-6 of the residence unit 203-6 is provided with a windowpane 271-6, and a slide portion 272-6 serving as an opening portion is formed by this windowpane 271-6 sliding in the horizontal direction for example.

Note that with the residence unit 203-1, the window frame 251-1 is provided on the left-side face in the drawing of the residence unit 203-1 (the front side of the house 201 (the side where the window 212-1 exists) in FIG. 34), and the door 252-1 is provided on the right-side face in the drawing of the residence unit 203-1 (the depth side of the house 201 in FIG. 34). Also, with the residence unit 203-6, the window frame 251-6 is provided on the left-side face in the drawing of the residence unit 203-6, and the door 252-6 is provided on the right-side face in the drawing of the residence unit 203-6. The door 252-1 and slide portion 272-6 are provided in positions such as arrayed on a straight line in a state in which the residence unit 203-1 and residence unit 203-6 are arrayed in the horizontal direction as shown in FIG. 36. Accordingly, in the state in FIG. 36, the door 252-1 and slide portion 272-6 are disposed on the same position.

Figure 37:
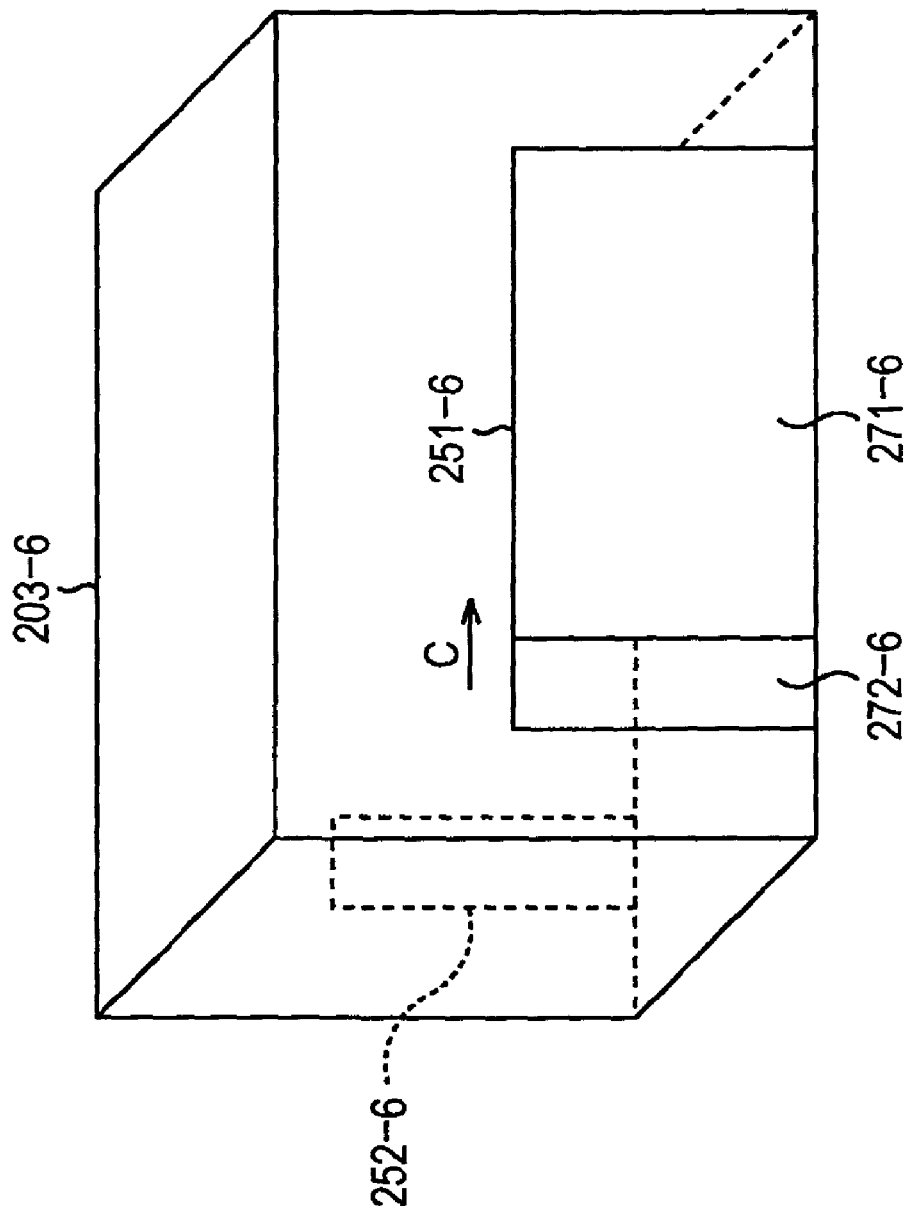
FIG. 37 is a perspective view illustrating a configuration example of the residence unit in FIG. 36 viewed from the left-hand-side face direction.

Now, FIG. 37 is a perspective view illustrating a configuration example of the residence unit 203-6, viewed from the left-hand-side face direction (the front direction of the house 201) in FIG. 36.

The windowpane 271-6 of the residence unit 203-6, as shown in FIG. 37, is configured so as to move within the frame of the window frame 251-6 in the direction of arrow C in the drawing in a slide manner, and thus, the slide portion 272-6 serving as an opening portion is formed. Note that the windowpane 271-1, window frame 251-1, and slide portion 272-1 of the residence unit 203-1 are configured in the same way as the windowpane 271-6, window frame 251-6, and slide portion 272-6 of the residence unit 203-6 shown in FIG. 37.

As shown in FIG. 36, in the event that the right-side face of the residence unit 203-1 is in contact with the left-side face of the residence unit 203-6, the windowpane 271-6 moves (slides) in a slide manner, and the slide portion 272-6 having the same size as the door 252-1 is formed in the same position as the door 252-1. Accordingly, traffic between the residence unit 203-1 and the residence unit 203-6 is achieved via the door 252-1 and slide portion 272-6, and the passage to another side from one side of the residence unit 203-1 and the residence unit 203-6 is secured. That is to say, the windowpane 271-6 of the residence unit 203-6 slides to form the slide portion 272-6, and thus, the residence unit 203-1 and the residence unit 203-6 will be penetrated through the door 252-1 and the slide portion 272-6. Accordingly, the user can go to the residence unit 203-1 through the residence unit 203-6 from the stairs 231, and can go to the stairs 231 through the residence unit 203-6 from the residence unit 203-1 within the range of the window 251-1 frame.

Further, as shown in FIG. 36, in the event that the residence unit 203-1 and residence unit 203-6 are disposed, the windowpane 271-1 can make the transition to a closed state, a full-opened (slid) state, or a slidable state in which the user can freely open and close (slide).

Note that FIG. 36 and FIG. 37, taking the residence unit 203-1 and residence unit 203-6 for the example, have described the arrangement thereof, but the residence unit 203-2, residence unit 203-3, residence unit 203-4, and residence unit 203-5 are arranged in the same way as the residence unit 203-1 and residence unit 203-6. That is to say, an arrangement is made wherein the residence unit 203-2 through residence unit 203-5 are also provided with the window frame 251-2 through window frame 251-5, and the door 252-2 through door 252-5 respectively, the window frame 251-2 through window frame 251-5 include the windowpane 271-2 through windowpane 271-5 respectively, and the slide portion 272-1 through slide portion 272-5 serving as opening portions are formed respectively by the windowpane 271-2 through windowpane 271-5 being slid.

Hereinafter, in the event that it is not necessary to distinguish the residence unit 203-1 through residence unit 203-6, the residence unit 203-1 through residence unit 203-6 are summarized as residence units 203. Also, in the event that it is not necessary to distinguish the window frame 251-1 through window frame 251-6 which are provided in the residence unit 203-1 through residence unit 203-6, the window frame 251-1 through window frame 251-6 are summarized as window frames 251. Further, in the event that it is not necessary to distinguish the door 252-1 through door 252-6 which are provided in the residence unit 203-1 through residence unit 203-6, the door 252-1 through door 252-6 are summarized as doors 252. Also, it is not necessary to distinguish the windowpane 271-1 through windowpane 271-6 which are provided in the window frame 251-1 through window frame 251-6, the windowpane 271-1 through windowpane 271-6 are summarized as windowpanes 271. Further, in the event that t is not necessary to distinguish the slide portion 272-1 through slide portion 272-6 serving as opening portions which are formed by the windowpane 271-2 through windowpane 271-6 being slid, the slide portion 272-1 through slide portion 272-6 are summarized as slide portions 272.

Figure 38:
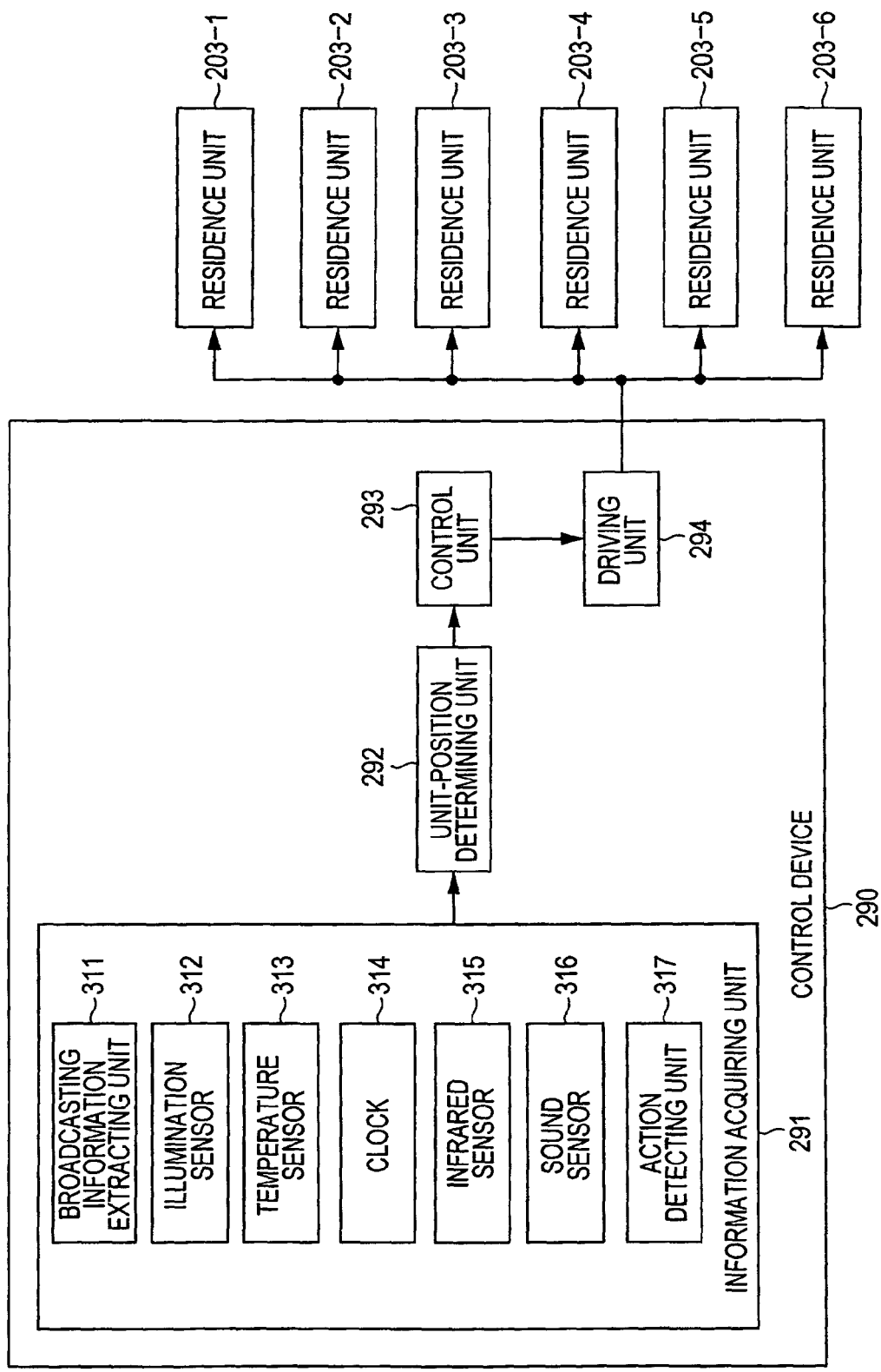
FIG. 38 is a block diagram illustrating a configuration example of a control system for performing control as to the house in FIG. 34, serving as an embodiment.

FIG. 38 is a block diagram illustrating a configuration example of a control system for performing control as to the house 201 in FIG. 34.

The control system in FIG. 38 comprises the six residence unit 203-1 through residence unit 203-6 of the house 201, and a control device 290 serving as an electronic apparatus for controlling the six (multiple) residence unit 203-1 through residence unit 203-6.

The control device 290 comprises an information acquiring unit 291, a unit-position determining unit 292, a control unit 293, and a driving unit 294.

The information acquiring unit 291 comprises a broadcasting information extracting unit 311, an illumination sensor 312, a temperature sensor 313, a clock 314, an infrared sensor 315, a sound sensor 316, and an action detecting unit 317.

The broadcasting information extracting unit 311 receives a broadcasting signal such as television broadcasting, extracts (acquires) predetermined information (e.g., weather forecast information) (status information) from the received broadcasting signal, and supplies this to the unit-position determining unit 292 as broadcasting information.

The illumination sensor 312, for example, which is provided in the respective residence units 203, detects (acquires) the illumination of the respective residence units 203 (status information), and supplies the illumination detection results to the unit-position determining unit 292.

The temperature sensor 313, for example, which is provided in the respective residence units 203, detects (acquires) the temperature of the respective residence units 203 (status information), and supplies the temperature detection results to the unit-position determining unit 292.

The clock 314 counts point-in-time, detects (acquires) the current point-in-time (status information), and supplies this to the unit-position determining unit 292 as point-in-time information.

The infrared sensor 315, for example, which is provided on the doors 252 serving as the entrances of the respective residence units, detects and counts passage of an object, and thus, and detects (acquires) information (status information) representing presence of a person within the respective residence units 203. Subsequently, the infrared sensor 315 supplies the detection results to the unit-position determining unit 292 as person's presence information.

The sound sensor 316, for example, which is provided in the respective residence units 203, detects (acquires) volume (status information), and supplies this to the unit position determining unit 292 as volume detection results.

The action detecting unit 317, for example, which is provided in the respective residence units 203, detects (acquires) the action (status information) of a person present in the respective residence units 203, for example, such as viewing/listening to a television broadcasting program, or viewing/listening to the other content stored in a DVD (Digital Versatile Disk), or the like by detecting the operation status of the electronic apparatuses provided in the respective residence units 203. Also, the action detecting unit 317 records the actions of a person present in the respective residence units 203 using a video camera or the like, and detects the actions of a person based on the filmed information. The action detecting unit 317 supplies the detected action information representing the actions of a person within the respective residence units 203 to the unit-position determining unit 292.

Note that the above sensor 211 in FIG. 34, for example, is equivalent to an antenna or the like for receiving a broadcasting signal such as television broadcasting supplied to the broadcasting information extracting unit 311 of the information acquiring unit 291.

The unit-position determining unit 292 determines the positions of the six residence unit 203-1 through residence unit 203-6 making up the house 201 within the house 201 based on the status information serving as broadcasting information, illumination detection results, temperature detection results, point-in-time information, person presence information, volume detection results, and action information, which are supplied from the information acquiring unit 291, and supplies these to the control unit 293 as positional information.

The control unit 293 controls the driving unit 294 based on the positional information supplied from the unit-position determining unit 292 to change the positions of the six residence unit 203-1 through residence unit 203-6 within the house 201, for example, by moving the six residence unit 203-1 through residence unit 203-6 making up the house 201 as with an automated parking tower. That is to say, the control unit 293 changes the configuration of the house 201.

The driving unit 294, which is controlled by the control unit 293, moves the residence unit 203-1 through residence unit 203-6 as with an automated parking tower, for example.

With the control system thus configured, the information acquiring unit 291 acquires status information, supplies this to the unit-position determining unit 292, and the unit-position determining unit 292 determines the positions of the residence units 203 within the house 201 based on the status information. Subsequently, the unit-position determining unit 292 supplies information of the determined positions of the residence units 203 to the control unit 293 as positional information, the control unit 293 changes the positions of the residence units 203 within the house 201 by controlling the driving unit 294 based on the positional information, for example, by moving the residence units 203 as with an automated parking tower.

Figure 39:
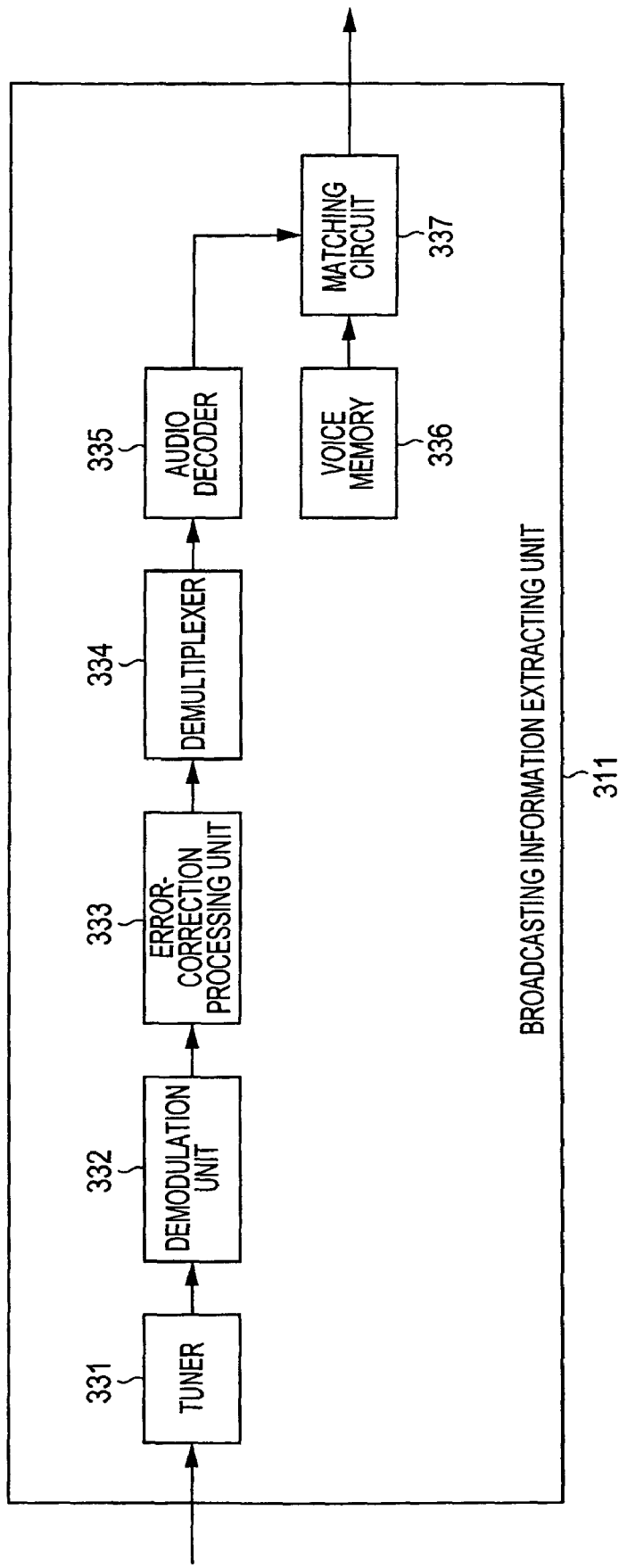
FIG. 39 is a block diagram illustrating a detailed configuration example of the broadcasting information extracting unit in FIG. 38.

FIG. 39 is a block diagram illustrating a detailed configuration example of the broadcasting information extracting unit 311 in FIG. 38.

The broadcasting information extracting unit 311 comprises a tuner 331, a demodulation unit 332, an error-correction processing unit 333, a demultiplexer 334, an audio decoder 335, voice memory 336, and a matching circuit 337.

The tuner 331 is supplied with the broadcasting signal of the digital broadcasting (television broadcasting) received by an unshown antenna. The broadcasting signal of this digital broadcasting is digital data stipulated with the MPEG (Moving Picture Experts Group)-2 or the like, and is transmitted as a transport stream made up of multiple TS (Transport Stream) packets. The tuner 331 selects the broadcasting signal of a predetermined channel (frequency) from the broadcasting signals of multiple channels supplied from the antenna, and supplies the broadcasting signal of the selected channel to the demodulation unit 332.

The demodulation unit 332 demodulates the transport stream of the broadcasting signal of a predetermined channel supplied from the tuner 331 using, for example, QPSK (Quadrature Phase Shift Keying) modulation or the like, and supplies the transport stream obtained with the modulation to the error-correction processing unit 333.

The error-correction processing unit 333 detects an error from the transport stream supplied from the demodulation unit 332, and corrects this. Subsequently, the transport stream following the correction processing is supplied to the demultiplexer 334.

The demultiplexer 334 selects audio packets from the transport stream supplied from the error-correction processing unit 333, and further, subjects the audio packets to descrambling processing as necessary, and supplies the TS packets of the audio data obtained as a result to the audio decoder 335.

The audio decoder 335 decodes the audio data supplied from the demultiplexer 334 using the MPEG-2 method, and supplies this to the matching circuit 337.

The matching circuit 337 reads out (the standard pattern of) the audio data of a keyword stored in the voice memory 336, and performs matching processing for determining whether or not the audio data of the keyword is identical with the audio data, which was decoded with the MPEG-2 method, supplied from the audio decoder 335. Here, as for the matching processing, for example, speech recognition processing can be employed, such as continuous distribution HMM (Hidden Markov Model) method.

Also, in the event that determination is made that the audio data of a keyword stored in the voice memory 336 is identical with the audio data, which was decoded with the MPEG-2 method, supplied from the audio decoder 335, i.e., in the event that the keyword is included in the voice of the broadcasting signal, the matching circuit 337 supplies (the audio data of) the keyword to the unit-position determining unit 292 as broadcasting information.

The voice memory 336 stores the audio data of the keywords relating to weather forecast such as "fine weather" and "typhoon", for example. The voice memory 336 supplies the audio data of the keyword stored therein to the matching circuit 337 as necessary. Note that the user can register a desired keyword into the voice memory 336 as necessary.

With the broadcasting information extracting unit 311 thus configured, the broadcasting signal of the digital broadcasting received from the unshown antenna is supplied to the tuner 331, the tuner 331 selects the broadcasting signal of a predetermined channel (frequency) from the broadcasting signals of multiple channels supplied from the antenna, and supplies the broadcasting signal of the selected channel to the demodulation unit 332. The demodulation unit 332 demodulates the broadcasting signal of a predetermined channel supplied from the tuner 331, and supplies the transport stream obtained as a result to the error-correction processing unit 333. The error-correction processing unit 333 detects an error from the transport stream supplied from the demodulation unit 332, and corrects this. Subsequently, the transport stream following the correction processing is supplied to the demultiplexer 334, the demultiplexer 334 selects audio data TS packets from the transport stream supplied from the error-correction processing unit 333, and supplies these to the audio decoder 335.

The audio decoder 335 decodes the audio data supplied from the demultiplexer 334 using the MPEG-2 method, and supplies this to the matching circuit 337. The matching circuit 337 reads out (the standard pattern of) the audio data of a keyword stored in the voice memory 336, and performs matching processing (for example, so-called word spotting) for determining whether or not the audio data of the keyword is identical with the audio data, which was decoded with the MPEG-2 method, supplied from the audio decoder 335, and thus, detects the keywords stored in the voice memory 336 from the broadcasting signal. Subsequently, in the event that the matching circuit 337 detects (the audio data of) a keyword, the matching circuit 337 supplies the keyword to the unit-position determining unit 292 as broadcasting information.

Next, description will be made regarding control processing performed when the control device 290 in FIG. 38 changes the positions of the residence units 203 with reference to FIG. 40. This control processing, for example, starts when the power source of the control device 290 is turned on.

In step S111, the information acquiring unit 291 acquires status information, supplies this to the unit-position determining unit 292, and the flow proceeds to step S112.

Specifically, the broadcasting information extracting unit 311 of the information acquiring unit 291 receives a broadcasting signal such as television broadcasting via the unshown antenna, extracts (acquires) weather forecast information or the like serving as status information from the received broadcasting signal, and supplies this to the unit-position determining unit 292 as broadcasting information. The illumination sensor 312 of the information acquiring unit 291 detects (acquires) the illumination of the respective residence units 203 serving as status information, and supplies the illumination detection results to the unit-position determining unit 292 as status information. The temperature sensor 313 of the information acquiring unit 291 detects (acquires) the temperature of the respective residence units 203 serving as status information, and supplies the temperature detection results to the unit-position determining unit 292. The clock 314 of the information acquiring unit 291 counts point-in-time, detects (acquires) the current point-in-time serving as status information, and supplies this to the unit-position determining unit 292 as point-in-time information. The infrared sensor 315 of the information acquiring unit 291 detects (acquires) the presence of a person present in the respective residence units 203 serving as status information, and supplies the detection results to the unit-position determining unit 292 as person presence information. The sound sensor 316 of the information acquiring unit 291 detects (acquires) volume serving as status information in the respective residence units 203, and supplies this to the unit-position determining unit 292 as volume detection results. The action detecting unit 317 of the information acquiring unit 291 detects (acquires) the action of a person present in the respective residence units 203 serving as status information, and supplies the detection results to the unit-position determining unit 292 as action information.

In step S112, the unit-position determining unit 292 determines the positions of the residence units 203 within the house 201 based on the status information supplied from the information acquiring unit 291 in step S111, supplies positional information representing the determined positions of the residence units 203 to the control unit 293, and the flow proceeds to step S113.

In step S113, the control unit 293 controls the driving unit 294 based on the positional information supplied from the unit-position determining unit 292 in step S112 to change the positions of the residence unit 203-1 through residence unit 203-6 within the house 201 respectively, and the flow proceeds to step S114. That is to say, the control unit 293 changes the configuration of the house 201.

In step S114, the control unit 293 determines whether or not the processing ends. The control unit 293, for example, in the event that the power source of the control device 290 is left on, determines that the processing does not end, the flow returns to step S111, where the above processing is repeated.

On the other hand, in step S114, for example, in the event that the power source of the control device 290 has been turned off, the control unit 293 determines that the processing ends, and the processing ends.

Note that thus, simultaneously with changing the positions of the residence unit 203-1 through residence unit 203-6 within the house 201, the control unit 293 controls the driving unit 294 to perform opening and closing of the windowpanes 271 described in FIG. 36 and FIG. 37.

For example, as shown in FIG. 36, in the event that the residence unit 203-1 is changed to the position of the front of the house 201, and the residence unit 203-6 is changed to the back side position of the house 201, the control unit 293 controls the driving unit 294 to slide the windowpane 271-6 of the residence unit 203-6, and form the slide portion 272-6 serving as an opening portion. Thus, traffic between the residence unit 203-1 and residence unit 203-6 can be performed via the door 252-1 and slide portion 272-6. Also, in the event that the residence unit 203-1 is changed to the back side position of the house 201, and the residence unit 203-6 is changed to the front of the house 201, the control unit 293 controls the driving unit 294 to slide the windowpane 271-1 of the residence unit 203-1, and form the slide portion 272-1 serving as an opening portion. Thus, traffic between the residence unit 203-1 and residence unit 203-6 can be performed via the door 252-6 and windowpane 271-1.

Figure 41:
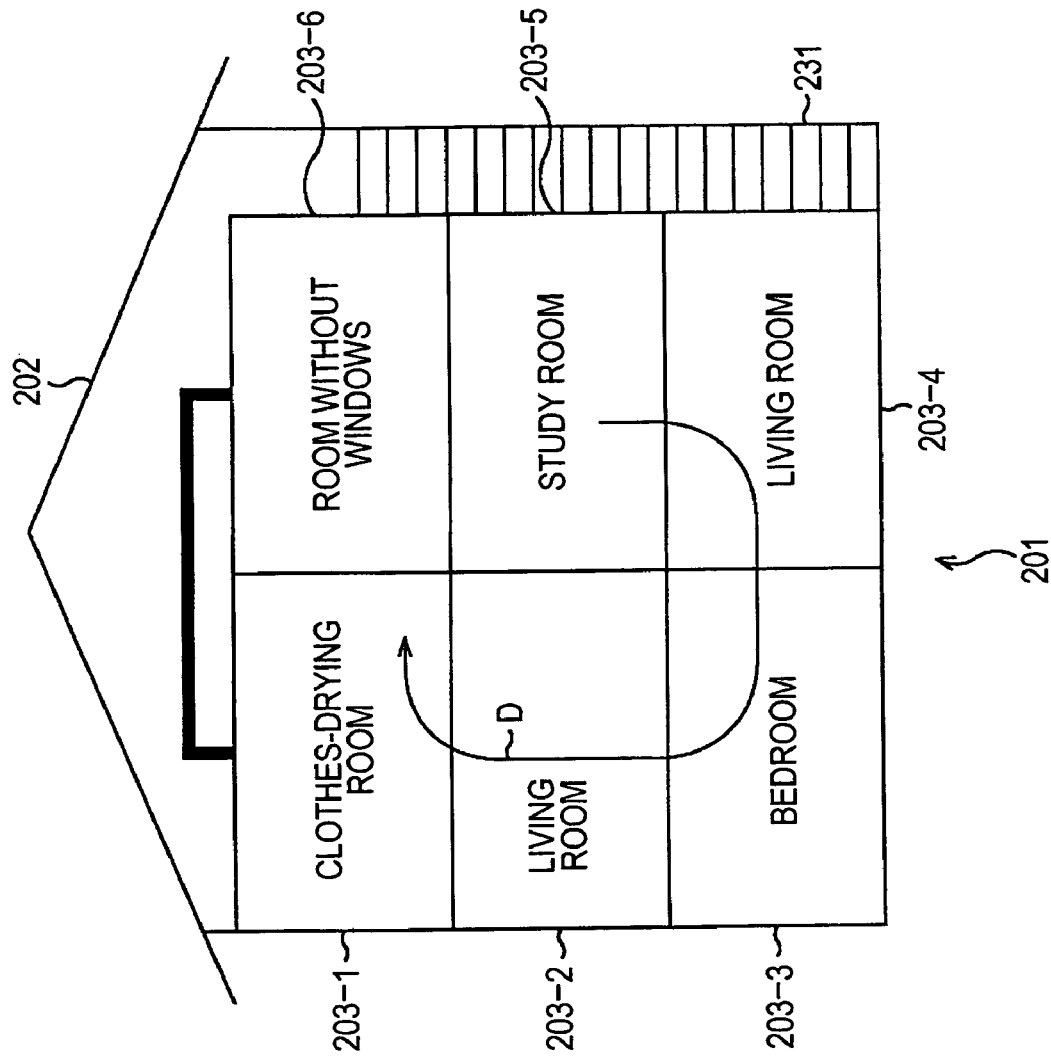
FIG. 41 is a diagram illustrating room examples assigned to the residence units of the house shown in FIG. 35.

FIG. 41 is a diagram illustrating room examples assigned to the residence unit 203-1 through residence unit 203-6 of the house 201 shown in FIG. 35.

In FIG. 41, a clothes-drying room is assigned to the residence unit 203-1, a living room to the residence unit 203-2, and a bedroom to the residence unit 203-3, respectively. Also, a living room is assigned to the residence unit 203-4, a study room to the residence unit 203-5, and a room without windows to the residence unit 203-6, respectively. The residence unit 203-1 through residence unit 203-6 are moved in the direction of arrow D (or in the opposite direction thereof) in the drawing as with an automated parking tower based on the status information obtained by the information acquiring unit 291.

Note that hereinafter, the residence unit 203-1 through residence unit 203-6 to which the clothes-drying room, living room, bedroom, living room, study room, and room without windows are assigned respectively are also referred to as the clothes-drying room 203-1, living room 203-2, bedroom 203-3, living room 203-4, study room 203-5, and room without windows 203-6.

Here, the resident of the house 201 can determine what kind of room is assigned to the residence unit 203-1 through residence unit 203-6 (what kind of room the residence unit 203-1 through residence unit 203-6 will be), for example. Also, the names of the rooms assigned to the residence unit 203-1 through residence unit 203-6 basically represent the character, a function, or a role of the room thereof, but this is only for the sake of expediency.

Next, description will be made regarding an example of position-of-bedroom determination processing in which the unit-position determining unit 292 determines the position of a bedroom 202-3 in step S122 in FIG. 40, with reference to FIG. 42.

In step S131, the unit-position determining unit 292 determines whether or not the current time zone is in the morning based on the point-in-time information, which represents the current point-in-time, supplied from the clock 314 of the information acquiring unit 291. For example, the unit-position determining unit 292, in the event that the current point-in-time is from 6 o'clock to 10 o'clock, determines that the current time zone is in the morning.

In step S131, in the event that determination is made that the current time zone is in the morning, the flow proceeds to step S132, where the unit-position determining unit 292 determines the position of the bedroom 203-3 as near the entrance 213 (FIG. 34), and the processing ends. In this case, in FIG. 41, the bedroom 203-3 positioned in the lowest position on the left side, for example, is moved to the lowest position on the right side. Thus, the user can shorten time after waking up at the bedroom 203-3 in the morning until the user goes to the entrance 213, thereby leaving the house 201 quickly.

On the other hand, in step S131, in the event that determination is made that the current point-in-time is not in the morning, the flow proceeds to step S133, where, based on volume detection result, which is supplied from the sound sensor 316 of the information acquiring unit 291, for example, of the next room of the bedroom 203-3 in FIG. 41, i.e., the living room 203-4, the unit-position determining unit 292 determines whether or not the living room 203-4 of the next room of the bedroom 203-3 is noisy. For example, in the event that the volume is greater than a predetermined value, the unit-position determining unit 292 determines that the living room 203-4 of the next room is noisy.

In step S133, in the event that determination is made that the living room 203-4 of the next room is noisy, the flow proceeds to step S134, where the unit-position determining unit 292 determines the position of the bedroom 203-3 within the house 201 as the upper or lower position (upper part or lower part) of the noisy living room 203-4, and the processing ends. In this case, in FIG. 41, the bedroom 203-3 positioned in the lowest position on the left side, for example, is moved to the second position from the top on the left side. Thus, the spatial relationship between the noisy living room 203-4 which is the next room of the bedroom and the bedroom 203-3 becomes a vertical spatial relationship, so sound cannot be heard as easily as the case where they are next doors, whereby the user present in the bedroom 203-3 can take sleep without being interrupted by the noise of the living room 203-4.

On the other hand, in step S133, in the event that determination is made that the living room 203-4 of the next room is not noisy, the flow proceeds to step S135, where the position of the bedroom 203-3 is determined as the position where the morning sun hits, for example, the position adjacent to the window 212-1 or window 212-2, and the processing ends. In this case, in FIG. 41, the bedroom 203-3 positioned in the lowest position on the left side, for example, is moved to the highest position on the left side. Thus, the user present in the bedroom 203-3 can get up comfortably, basking in the light of the morning sun which enters from the window 212-1 or window 212-2 for example.

As described above, the unit-position determining unit 292 for performing position determination processing of the bedroom 203-3 in FIG. 41 determines the position of the bedroom 203-3 as near the entrance 213 such that the user present in the bedroom 203-3 can leave the house 201 quickly when leaving for work or school. Also, the unit-position determining unit 292 determines the position of the bedroom 203-3 as the position which is not next door to the noisy next room so that sleep of the user present in the bedroom 203-3 may not be interrupted when the next room is noisy in the bedtime-hour zone which is not morning, and determines the position of the bedroom as the position where the morning sun hits so that the morning sun shines on the user present in the bedroom 203-3 when the next room is not noisy.

Thus, the control device 290 (electronic apparatus) determines situations aggressively, and changes the positions of the residence units 203 within the house 201. In other words, the house 201 determines various status information dynamically, changes the positions of the residence units 203 so that the user can live more comfortably within the house 201, thereby changing the configuration (facilities) of the house 201 in an adaptive manner. Thus, intelligent active integration of a house and electronic apparatuses is realized, whereby the user can be provided with very high convenience and so forth.

Figure 42:
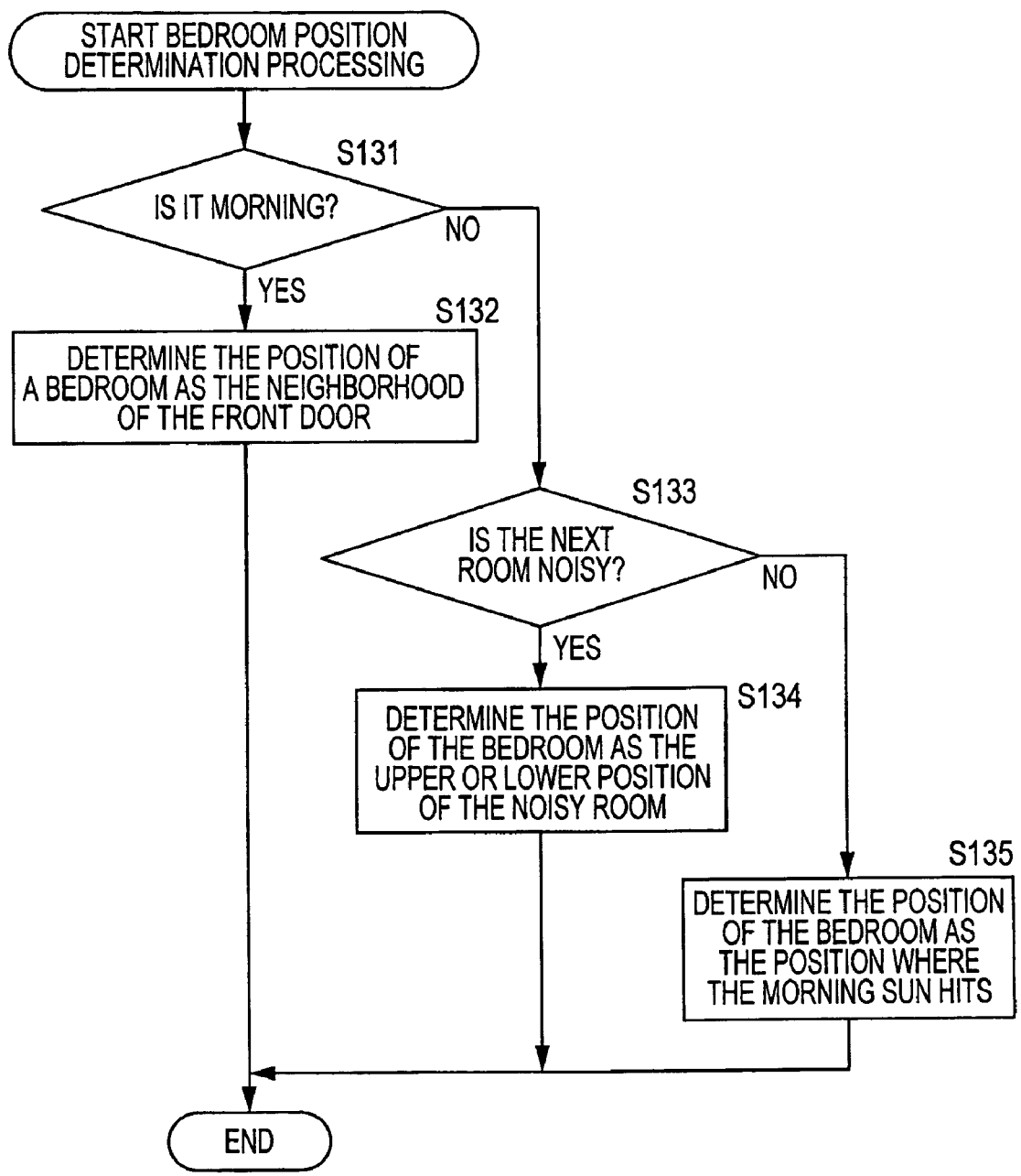
FIG. 42 is a flowchart describing position-of-bedroom determination processing for determining the position of the bedroom performed in step S112 in FIG. 40 by a unit-position determining unit.
Figure 43:
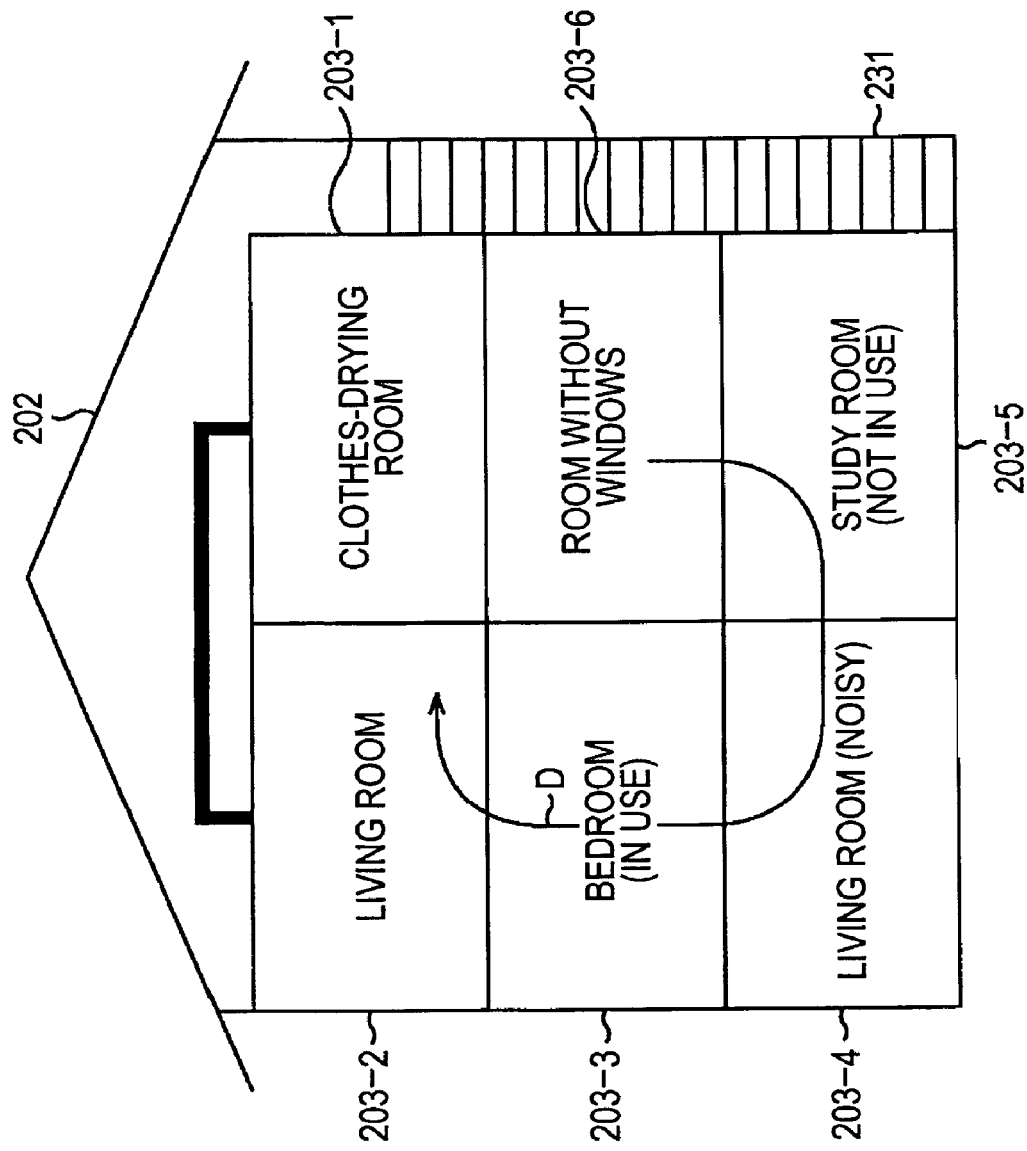
FIG. 43 is a diagram illustrating an example in which the position of the bedroom in FIG. 41 is modified by the position-of-bedroom determination processing in FIG. 42 which the unit-position determining unit performs.

FIG. 43 illustrates an example in which the position of the bedroom 203-3 in FIG. 41 is modified by the position-of-bedroom 203-3 determination processing in FIG. 42 which the unit-position determining unit 292 performs.

Now, let us say that the residence unit 203-1 through residence unit 203-6 are in the positions shown in FIG. 41, for example, the current time zone is not morning, and the living room 203-4 which is the next room of the (occupied) bedroom 203-3 where a person is present is in a noisy situation. In this case, the unit-position determining unit 292 performs processing in steps S131, S133, and S134 in FIG. 42, as shown in FIG. 43, and determines the position of the bedroom 203-3 as the position of the upper portion or lower portion of the noisy room, for example. Note that in FIG. 43, the study room 203-5 is in an unoccupied situation.

Subsequently, the unit-position determining unit 292 supplies the determined positional information of the bedroom 203-3 to the control unit 293. The control unit 293 controls the driving unit 294, for example, to move the residence units 203 by one unit in the direction of arrow D of FIG. 41 as with an automated parking tower, thereby moving the bedroom 203-3 to the position of the upper portion of the noisy living room 203-4 as shown in FIG. 43.

Note that in FIG. 42, description has been made regarding the position determination processing of the bedroom 203-3, but even with the clothes-drying room 203-1, living room 203-2, living room 203-4, study room 203-5, and room 203-6 without windows, positional determination processing is performed, in the same way, depending on the status information acquired by the information acquiring unit 291. In this case, the unit-position determining unit 292, in accordance with predetermining conditions, determines the order of priorities of the clothes-drying room 203-1, living room 203-2, bedroom 203-3, living room 203-4, study room 203-5, and room 203-6 without windows, and determines the final positions of the residence units 203 based on the order of the priorities and the positions (determined positions) determined with the position determination processing. Subsequently, the unit-position determining unit 292 supplies the position information representing the final positions to the control unit 293. That is to say, the residence units 203 are moved as with an automated parking tower for example, so all of the residence unit 203-1 through residence unit 203-6 cannot always be moved to the positions determined by the unit-position determining unit 292. Accordingly, the unit-position determining unit 292 determines the order of priorities of the residence units 203, and determines the positions of the residence units 203 having the order of high priority based on the determined order of priorities and the determined positions. Here, the order of priorities of the residence units 203 is determined according to the instructions of the user or the like, but can be determined beforehand, and also can be determined in an adaptation manner based on the status information acquired by the information acquiring unit 291, or the like.

FIG. 44 is a diagram illustrating a relation example between the acquisition information (status information) acquired by the information acquiring unit 291 and the positions of the residence units 203 determined by the unit-position determining unit 292.

The unit-position determining unit 292 determines the position where the sun hits most, and also the window 212-1 or window 212-2 is set as the position of the clothes-drying room 203-1' based on the illumination detection result (sunshine) representing the illuminations of the respective residence units 203 supplied from the illumination sensor 312 of the information acquiring unit 291. Based on the positional information representing the position of the clothes-drying room 203-1 thus determined by the unit-position determining unit 292, the control unit 293 controls the driving unit 294 to move the position of the clothes-drying room 203-1, so that the clothes-drying room 203-1 is moved to the position where the window 212-1 or window 212-2 is installed serving as the position where the sun hits most. Accordingly, the laundry hung up to dry in the clothes-drying room 203-1 dries quicker.

Also, the unit-position determining unit 292 determines whether it is morning or night based on the point-in-time information (time zone) representing the current point-in-time supplied from the clock 314 of the information acquiring unit 291, and in the event that determination is made that it is morning, the unit-position determining unit 292 determines the position of the bedroom 203-3 as the position of the first floor near the entrance 213. On the other hand, in the event that determination is made that it is night, the unit-position determining unit 292 determines the position of the bedroom 203-3 as the position where the morning sun hits (the position where the window 212-1 or window 212-2 exists in the present example) at dawn. Based on the positional information representing the position of the bedroom 203-3 thus determined by the unit-position determining unit 292, the control unit 293 controls the driving unit 294 to move the bedroom 203-3, and thus, when the time zone is in the morning, the bedroom 203-3 is moved to the position of the first floor near the entrance 213. Accordingly, the user present in the bedroom 203-3 can leave the house 201 quickly when leaving for work or school in the morning. On the other hand, in the event that the time zone is night, the bedroom 203-3 is moved to the position where the window 212-1 or window 212-2 exists serving as the position where the morning sun hits, at dawn. Accordingly, the user present in the bedroom 203-3 can wake up at break of dawn in the morning sun.

Further, the unit-position determining unit 292, based on the person's presence information representing person's presence supplied from the infrared sensor 315 of the information acquiring unit 291, determines whether a person is present in the living room 203-2 (or living room 203-4), and in the event that determination is made that a person is present, the unit-position determining unit 292 determines the position of the living room 203-2 as the position with the window 212-1, which is a scenic position, such as the highest floor of the house 201, for example. On the other hand, in the event that determination is made that a person is not present, the unit-position determining unit 292 determines the position of the living room 203-2 as an arbitrary position. Based on the positional information representing the position of the living room 203-2 thus determined by the unit-position determining unit 292, the control unit 293 controls the driving unit 294 to move the living room 203-2, so that in the event that a person is present in the living room 203-2, the living room 203-2 is moved to the position with the window 212-1, which is a scenic position, for example. Accordingly, the user present in the living room 203-2 can spend time comfortably at a scenic position.

Also, the unit-position determining unit 292, based on the action information representing a person's action supplied from the action detecting unit 317 of the information acquiring unit 291, determines what a person within the living room 203-2 (or living room 203-4) is doing, for example, in the event that determination is made that the person is viewing/listening to the content stored in a DVD or the like, the unit-position determining unit 292 determines the position of the living room 203-2 as the position (for example, the first floor of FIG. 34) where the outdoor daylight shining in from a window 212-1 or a window 212-2 does not hit. Depending on the positional information representing the position of the living room 203-2 thus determined by the unit-position determining unit 292, the control unit 293 controls the driving unit 294 to move the living room 203-2, so that in the event that the person present in the living room 203-2 is viewing/listening to the content stored in a DVD or the like, the living room 203-2 is moved to the position of the first floor where outer daylight does not hit. Accordingly, the user present in the living room 203-2 can view and listen to the content stored in the DVD or the like comfortably in a dark state in which outer daylight does not shine in.

Further, the unit-position determining unit 292, based on the weather forecast of the broadcasting information supplied from the broadcasting information extracting unit 311 of the information acquiring unit 291, determines the positions of the clothes-drying room 203-1 and living room 203-2 (or living room 203-4), and changes the positions of the clothes-drying room 203-1 and living room 203-2 within the house 201 with high priority (by setting the order of priorities thereof high).

That is to say, upon determining that the weather is fine today from the weather forecast, the unit-position determining unit 292 determines the position where the window 212-1 or window 212-2 is installed (e.g., the top position or second position on the left side in FIG. 43), which is the position where the sun hits most, as the position of the clothes-drying room 203-1 with high priority based on the illumination detection results (sunshine) representing the illuminations of the respective residence units 203 supplied from the illumination sensor 312, as described above. Based on the positional information representing the position of the clothes-drying room 203-1 thus determined by the unit-position determining unit 292, the control unit 293 controls the driving unit 294 to move the clothes-drying room 203-1, so that in the event that it is predicted that it is fine weather, the clothes-drying room 203-1 is moved to the position where the window 212-1 or window 212-2 is disposed serving as the position where the sun hits most. Accordingly, the laundry hung up to dry in the clothes-drying room 203-1 dries quicker.

Also, upon determining that a typhoon is approaching based on the weather forecast, the unit-position determining unit 292 determines the position of the living room 203-2 (or living room 203-4) with high priority as the position without the window 212-1 and window 212-2 (e.g., the first floor in FIG. 34). Based on the positional information representing the position of the living room 203-2 thus determined by the unit-position determining unit 292, the control unit 293 controls the driving unit 294 to move the living room 203-2, and thus, in the event that it is predicted a typhoon is approaching, the living room 203-2 is moved with high priority to the position without windows of the first floor. Accordingly, damage such as windowpanes being broken by a typhoon can be prevented.

As described above, the residence units 203 are moved as with an automated parking tower for example, so all of the residence units 203 cannot always be moved to the positions determined by the unit-position determining unit 292, but in the event that determination is made that the current weather is fine, the clothes-drying room 203-1 can be moved with high priority to the position where the sun hits most, so that the laundry hung up to dry in the clothes-drying room 203-1 can dry with high priority. Also, in the event that it is predicted a typhoon is approaching, the living room 203-2 (or living room 203-4) can be moved with high priority to the position without windows, whereby damage such as windowpanes being broken by a typhoon can be prevented with higher priority.

Note that with the above description, the unit-position determining unit 292 recognizes the position where the sun strikes from the position where the window 212-1 or window 212-2 is installed based on the illumination sensor 312 provided in the respective residence units 203, but an arrangement may be made wherein, for example, the position where it is predicted to be that it is sunny, such as the highest floor, is particularly recognized as the position where the sun hits most.

Also, as described above, in addition to changing the positions of the living units 203, the living room 203-2 or living room 203-4 where a person is can be moved to an shady position on a hot day, and to a sunny position on a cold day. Further, in the event that an elderly person liable to fall ill is in the living room 203-2 or living room 203-4, the living room 203-2 or living room 203-4 can be moved to a position of the first floor so as to prevent the elderly person from burden. On the other hand, in the event that a healthy elderly person is in the living room 203-2 or living room 203-4, the living room 203-2 or living room 203-4 can be moved to a position of the upper floor (higher than the first floor) so as to make the elderly person do some exercise.

Figure 45:
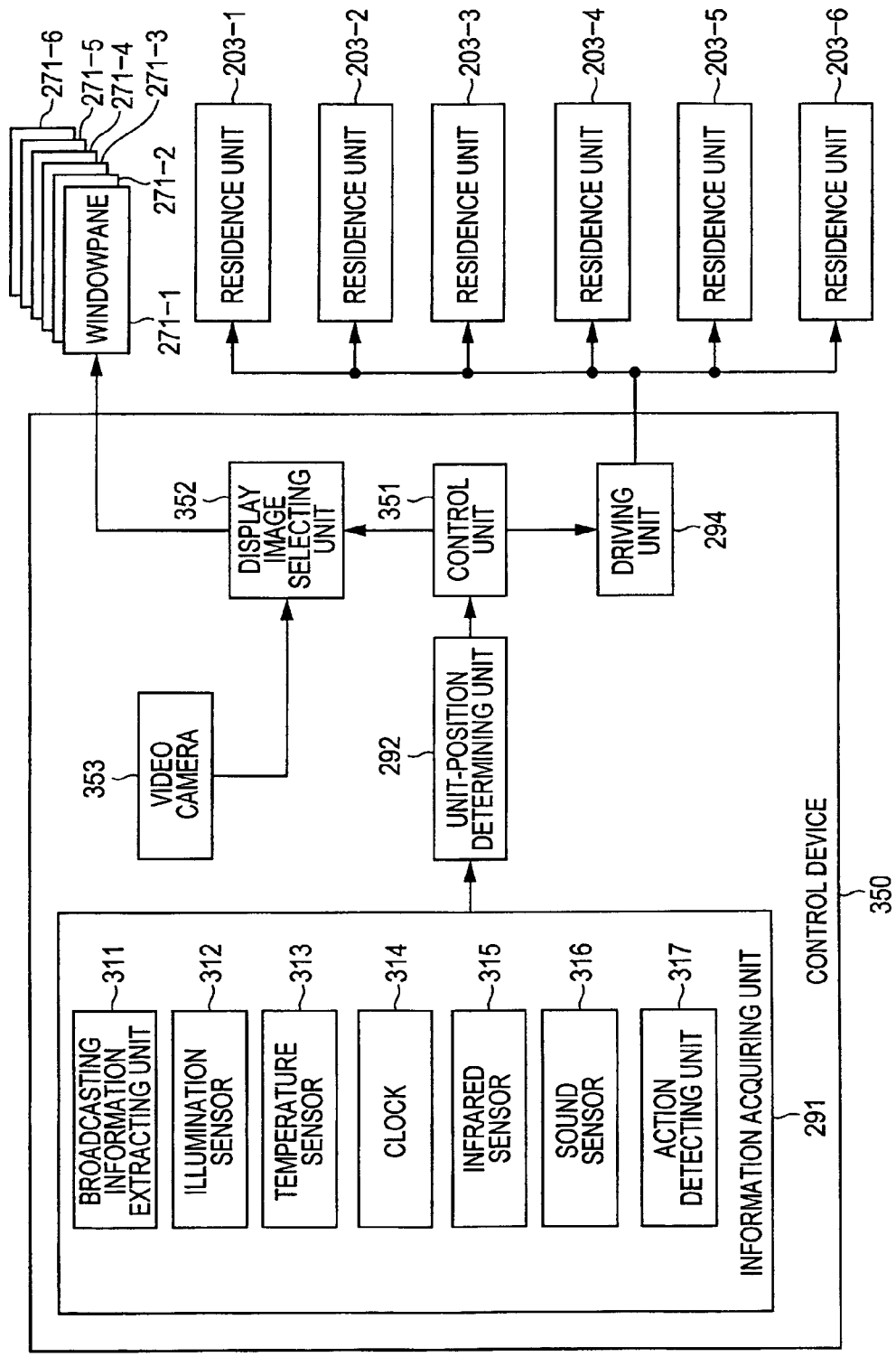
FIG. 45 is a diagram illustrating another configuration example of a control system for performing control as to the house in FIG. 34.

FIG. 45 is a block diagram illustrating a configuration example of a control system for performing control of the house 201 in FIG. 34.

With the control system in FIG. 45, in addition to changing the positions of the residence units 203 within the house 201, the functions of the windowpanes 271 of the residence units 203 are changed depending on the positions of the residence units 203.

The control system in FIG. 45 comprises a control device 350 which controls the six (multiple) residence unit 203-1 through residence unit 203-6 of the house 201, and the windowpane 271-1 through windowpane 271-6 provided respectively in the residence unit 203-1 through residence unit 203-6 and the residence unit 203-1 through residence unit 203-6.

Note that the components denoted by the same reference numerals as those in FIG. 38, i.e., the residence unit 203-1 through residence unit 203-6 in FIG. 45, information acquiring unit 291, unit-position determining unit 292, and driving unit 294 are the same components in FIG. 38, so redundant description thereof will be omitted.

Also, the windowpane 271-1 through windowpane 271-6 are provided in the residence unit 203-1 through residence unit 203-6 respectively, but in FIG. 45, in order to avoid the drawing from becoming complicated, the windowpane 271-1 through windowpane 271-6, and the residence unit 203-1 through residence unit 203-6, are separately illustrated.

The control device 350 comprises an information acquiring unit 291, a unit-position determining unit 292, a driving unit 294, a control unit 351, a display image selecting unit 352, and a video camera 353.

The control unit 351 of the control device 350, as with the control unit 293 in FIG. 38, changes the configuration of the house 201. That is to say, the control unit 351 controls the driving unit 294 based on the positional information supplied from the unit-position determining unit 292 to change the positions of the six residence unit 203-1 through residence unit 203-6 within the house 201, for example, by moving the six residence unit 203-1 through residence unit 203-6 making up the house 201 as with an automated parking tower. Also, the control unit 351 supplies the positional information supplied from the unit-position determining unit 292 to the display image selecting unit 352.

The display image selecting unit 352 determines the functions of the windowpanes 271, and controls the windowpanes 271, thereby displaying the image or the like supplied from the video camera 353 on the windowpanes 271, or changing the transparency of the windowpanes 271.

The video camera 353 films the scenery of the outside of the house 201 for example, and supplies the filmed image (data) to the display image selecting unit 352.

The windowpanes 271 comprises a liquid crystal panel for example, under control of the display image selecting unit 352, displays a predetermined image, or changes the degree of transparency.

With the control system thus configured, the information acquiring unit 291 acquires status information, supplies this to the unit-position determining unit 292, and the unit-position determining unit 292 determines the positions of the residence units 203 within the house 201 based on the status information. Subsequently, the unit-position determining unit 292 supplies information of the determined positions of the residence units 203 to the control unit 351 as positional information, the control unit 351 changes the positions of the residence units 203 by controlling the driving unit 294 based on the positional information, thereby moving the positions of the residence units 203 as with an automated parking tower, for example.

Also, the unit-position determining unit 292 supplies the positional information to the control unit 351, and the control unit 351 supplies the positional information supplied from the unit-position determining unit 292 to the display image selecting unit 352. The display image selecting unit 352 selects the image or the like filmed by the video camera 353 depending on the positional information to display the selected image on the windowpanes 271 or to change the transparency of the windowpanes 271.

Figure 46:
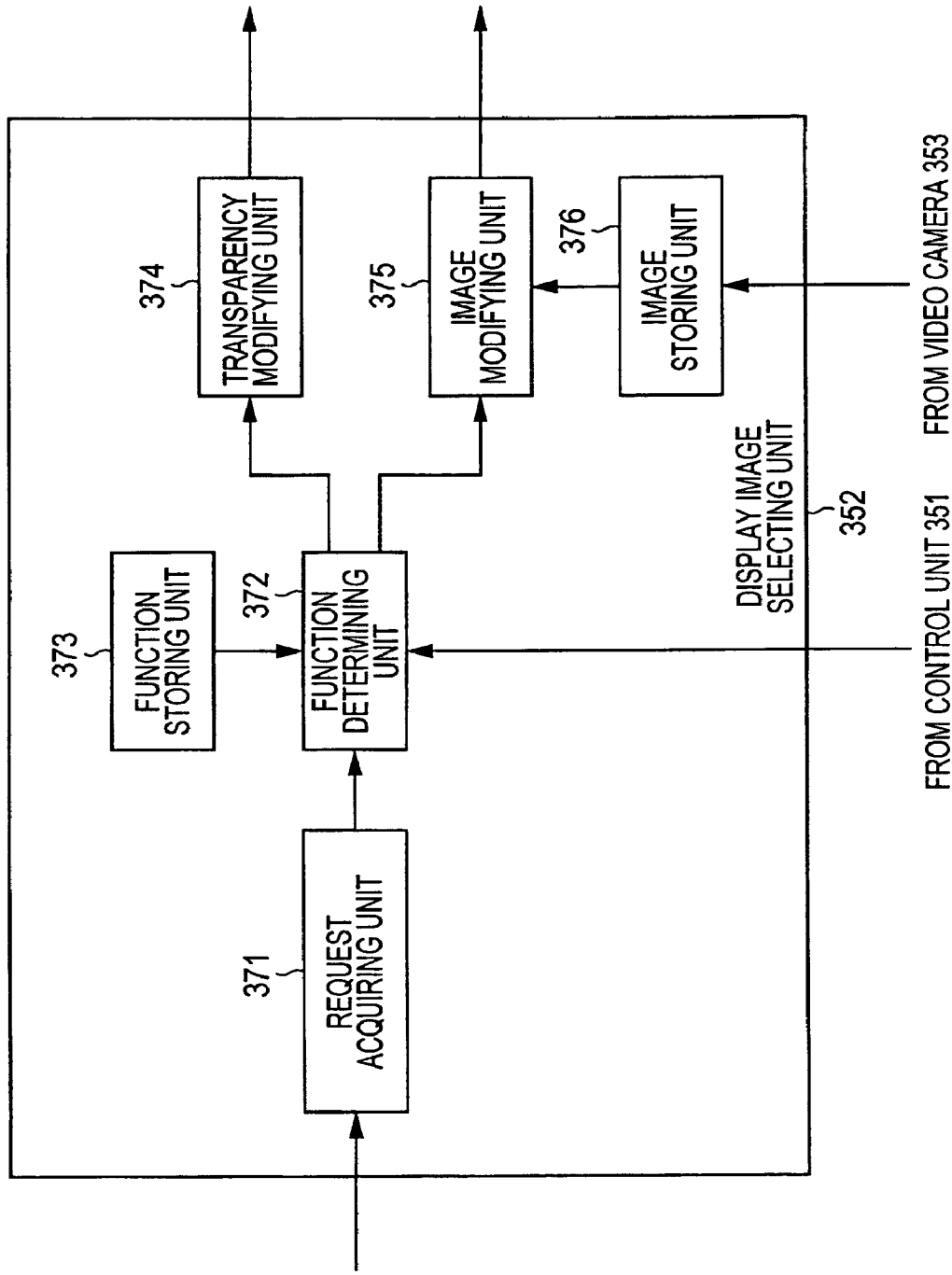
FIG. 46 is a block diagram illustrating a detailed configuration example of the display image selecting unit in FIG. 45.

FIG. 46 is a block diagram illustrating a detailed configuration example of the display image selecting unit 352 in FIG. 45.

The display image selecting unit 352 comprises a request acquiring unit 371, a function determining unit 372, a function storing unit 373, a transparency modifying unit 374, an image modifying unit 375, and image storing unit 376.

The request acquiring unit 371 is supplied with a function modification request signal representing the request of modification of the functions of the windowpanes 271 according to the operations of an unshown operating unit by the user, and the request acquiring unit 371 supplies the function modification request signal to the function determining unit 372. Also, the user selects the desired function from a later-described function list of the windowpanes 271 which is displayed on the windowpanes 271 by operating the unshown operating unit, and a selection signal representing the selected desired function is supplied to the request acquiring unit 371. The request acquiring unit 371 supplies the selection signal to the function determining unit 372.

The function determining unit 372 reads out the function list of the windowpanes 271 stored in the function storing unit 373 based on the function modification request signal supplied from the request acquiring unit 371, and the positional information supplied from the control unit 351, and displays this on the windowpanes 271. Also, the function determining unit 372 determines the functions of the windowpanes 271 in accordance with the selection signal supplied from the request acquiring unit 371, and supplies functional information representing the determined functions to the transparency modifying unit 374 and image modifying unit 375 to change the functions of the windowpanes 271. That is to say, the function determining unit 372 changes the functions of the windowpanes 271 in accordance with the positional information supplied from the control unit 351.

The function storing unit 373 stores the function list of the windowpanes 271, associating with the positions of the residence units 203.

The transparency modifying unit 374 sets and changes the transparency of the windowpanes 271 to any one of transparent, translucent, and opaque, for example, based on the functional information of the windowpanes 271 supplied from the function determining unit 372. For example, the windowpanes 271 are made up of a liquid crystal panel, and the transparency modifying unit 374 changes the transparency of the windowpanes 271 by changing voltage to be applied to the liquid crystal panels of the windowpanes 271.

The image modifying unit 375 is, for example, made up of a projector, and reads out an image to be displayed on the windowpanes 271 from the image storing unit 376 based on the functional information of the windowpanes 271 supplied from the function determining unit 372, and displays the readout image on the windowpanes 271. That is to say, the image modifying unit 375 changes an image to be displayed on the windowpanes 271 in accordance with the function determined by the function determining unit 372.

The image storing unit 376 is supplied with an image of the scenery of the outside of the house 201 from the video camera 353, and stores the image. Also, the image storing unit 175 stores beforehand images, such as the images registered by the user, a scene camera, other wallpaper patterns, a shoji pattern, a painting, vase, a bookshelf, and so forth.

With the display image selecting unit 352 thus configured, the function modification request signal of the windowpanes 271 is supplied to the request acquiring unit 371 in accordance with operations of the unshown operating unit, and the request acquiring unit 371 supplies the function modification request signal to the function determining unit 372. The function determining unit 372 is supplied with the positional information of the residence units 203 from the control unit 351, and the function determining unit 372 reads out the function list of the windowpanes 271 from the function storing unit 373 in accordance with the positional information to display this on the windowpanes 271 via the image modifying unit 375.

Subsequently, upon the user viewing the function list displayed on the windowpanes 271, operating the unshown operating unit, and selecting the desired function from the displayed function list, the selection signal representing the selected function is supplied to the request acquiring unit 371, and the request acquiring unit 371 supplies the selection signal to the function determining unit 372. The function determining unit 372 determines the functions of the windowpanes 271 based on the selection signal supplied from the request acquiring unit 371, and supplies the functional information representing the determined function to the transparency modifying unit 374 and image modifying unit 375. The transparency modifying unit 374 changes the transparency of the windowpanes 271 based on the functional information supplied from the function determining unit 372. The image modifying unit 375 reads out an image from the image storing unit 376 to display this on the windowpanes 271 based on the functional information from the function determining unit 372, and thus, changes the image to be displayed on the windowpanes 271.

Next, description will be made regarding control processing in which the control device 350 in FIG. 45 controls the residence units 203 and windowpanes 271 with reference to FIG. 47. This control processing, for example starts when the power source of the control device 350 is turned on.

Figure 40:
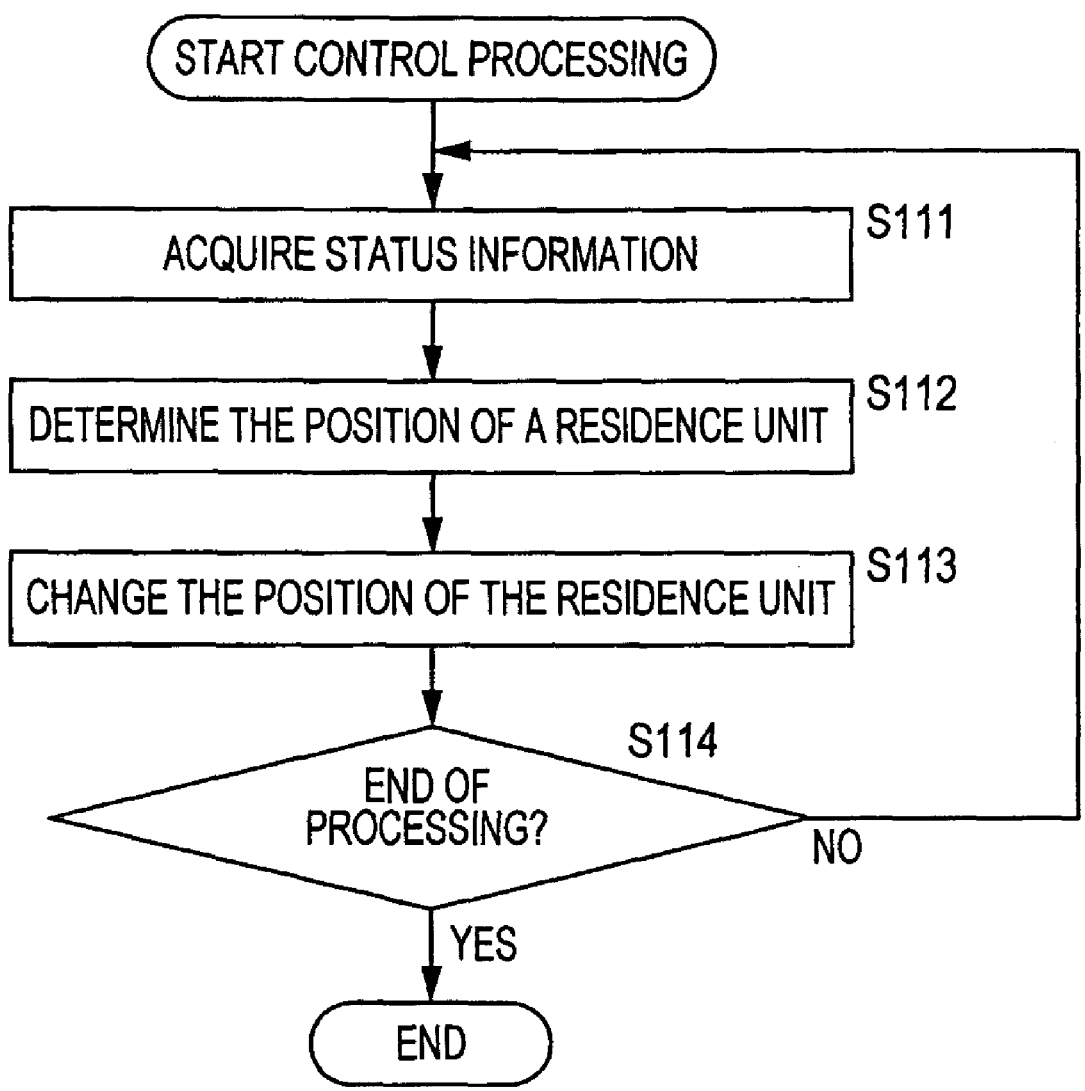
FIG. 40 is a flowchart describing control processing performed by the control device in FIG. 38 when modifying the position of a residence unit.

Note that step S151 through step S153 are the same processing as step S111 through step S113 in FIG. 40, so redundant description thereof will be omitted.

However, in step S152, following the unit-position determining unit 292 supplying the positional information to the control unit 351, the control unit 351 supplies the positional information to the display image selecting unit 352.

Following the processing in step S153, in step S154, the display image selecting unit 352 displays a predetermined image stored beforehand in the image storing unit 376 on the windowpanes 271 as an initial image, and the flow proceeds to step S155. Here, the display image selecting unit 352, which is made up of a projector as described above for example, displays the image on the windowpanes 271 by casting the light corresponding to the image on the windowpanes 271.

In step S155, the display image selecting unit 352 determines whether or not modification of the functions of the windowpanes 271 is instructed by user operations of the unshown operating unit. That is to say, the display image selecting unit 352 determines whether or not the function modification request signal representing modification request of the functions of the windowpanes 271 is supplied depending on the user operations of the unshown operating unit.

In step S155, in the event that determination is made that modification of the functions of the windowpanes 271 is instructed, the flow proceeds to step S156, where the display image selecting unit 352 determines the functions of the windowpanes 271 in accordance with the positional information supplied in step S152, and the flow proceeds to step S157.

Specifically, in step S155, in the event that determination is made that the function modification request signal is supplied depending on the user operations of the unshown operating unit, in step S156, the function determining unit 372 of the display image selecting unit 352 reads out the function list of the windowpanes 271 from the function storing unit 373 to display this on the windowpanes 271 in accordance with the positional information supplied from the control unit 351. Subsequently, upon the user viewing the function list displayed on the windowpanes 271, operating the unshown operating unit, and selecting the desired function from the displayed function list, the selection signal representing the selected function is supplied to the request acquiring unit 371, and the request acquiring unit 371 supplies the selection signal to the function determining unit 372. The function determining unit 372 determines the functions of the windowpanes 271 based on the selection signal supplied from the request acquiring unit 371, and supplies the functional information representing the determined function to the transparency modifying unit 374 and image modifying unit 375.

In step S157, the display image selecting unit 352 changes the functions of the windowpanes 271 based on the functions of the windowpanes 271 determined in step S156, and the flow proceeds to step S158.

Specifically, the transparency modifying unit 374 of the display image selecting unit 352 changes the transparency of the windowpanes 271 based on the functional information from the function determining unit 372, and the image modifying unit 375 reads out an image from the image storing unit 376 to change the image to be displayed on the windowpanes 271 based on the functional information from the function determining unit 372.

On the other hand, in step S155, in the event that determination is made that modification of the functions of the windowpanes 271 is not instructed, modification of the functions of the windowpanes 271 is not necessary, so the flow skips step S156 and step S157, and proceeds to step S158.

In step S158, the control unit 351 determines whether or not the processing ends. The control unit 351, for example, in the event that the power source of the control device 350 is left on, determines that the processing is not to end, and the flow returns to step S151, where the above processing is repeated.

On the other hand, in step S158, for example, in the event that the power source of the control device 350 has been turned off, the control unit 351 determines that the processing is to end, and the processing ends.

Next, description will be made in detail regarding the function modification processing of the windowpanes 271 for modifying the functions of the windowpanes 271 in step S156 and step S157 in FIG. 47 in the display image selecting unit 352, with reference to FIG. 48.

In step S171, the function determining unit 372 acquires the positional information from the control unit 351, and the flow proceeds to step S172.

In step S172, the function determining unit 372 reads out the function list of the windowpanes 271 from the function storing unit 373 in accordance with the positional information acquired in step S171, and the flow proceeds to step S173.

In step S173, the function determining unit 372 controls the image modifying unit 375 to display the function list read out in step S172 on the windowpanes 271, and the flow proceeds to step S174.

In step S174, the request acquiring unit 371 determines whether or not the function of the windowpanes 271 is selected by the user. That is to say, in step S174, determination is made regarding whether or not the user views the function list displayed on the windowpanes 271, and selects the desired function by operating the unshown operating unit, and the selection signal representing the selected function is supplied to the request acquiring unit 371 from the unshown operating unit.

In step S174, in the event that determination is made that the function of the windowpanes 271 is not selected, the flow waits until the function of the windowpanes 271 is selected.

In step S174, in the event that determination is made that the function of the windowpanes 271 is selected, the request acquiring unit 371 supplies the selection signal representing the function selected by the user to the function determining unit 372, and the flow proceeds to step S175.

In step S175, the function determining unit 372 determines the function based on the selection signal from the request acquiring unit 371, and supplies the functional information representing the function to the transparency modifying unit 374 and image modifying unit 375, and the flow proceeds to step S176.

In step S176, the transparency modifying unit 374 changes the degree of transparency of the windowpanes 271 based on the functional information supplied from the function determining unit 372 in step S175, and the flow proceeds to step S177.

For example, the windowpanes 271 are made up of a liquid crystal panel, and the transparency modifying unit 374 changes the transparency using voltage to be applied to the liquid crystal panels of the windowpanes 271.

Figure 47:
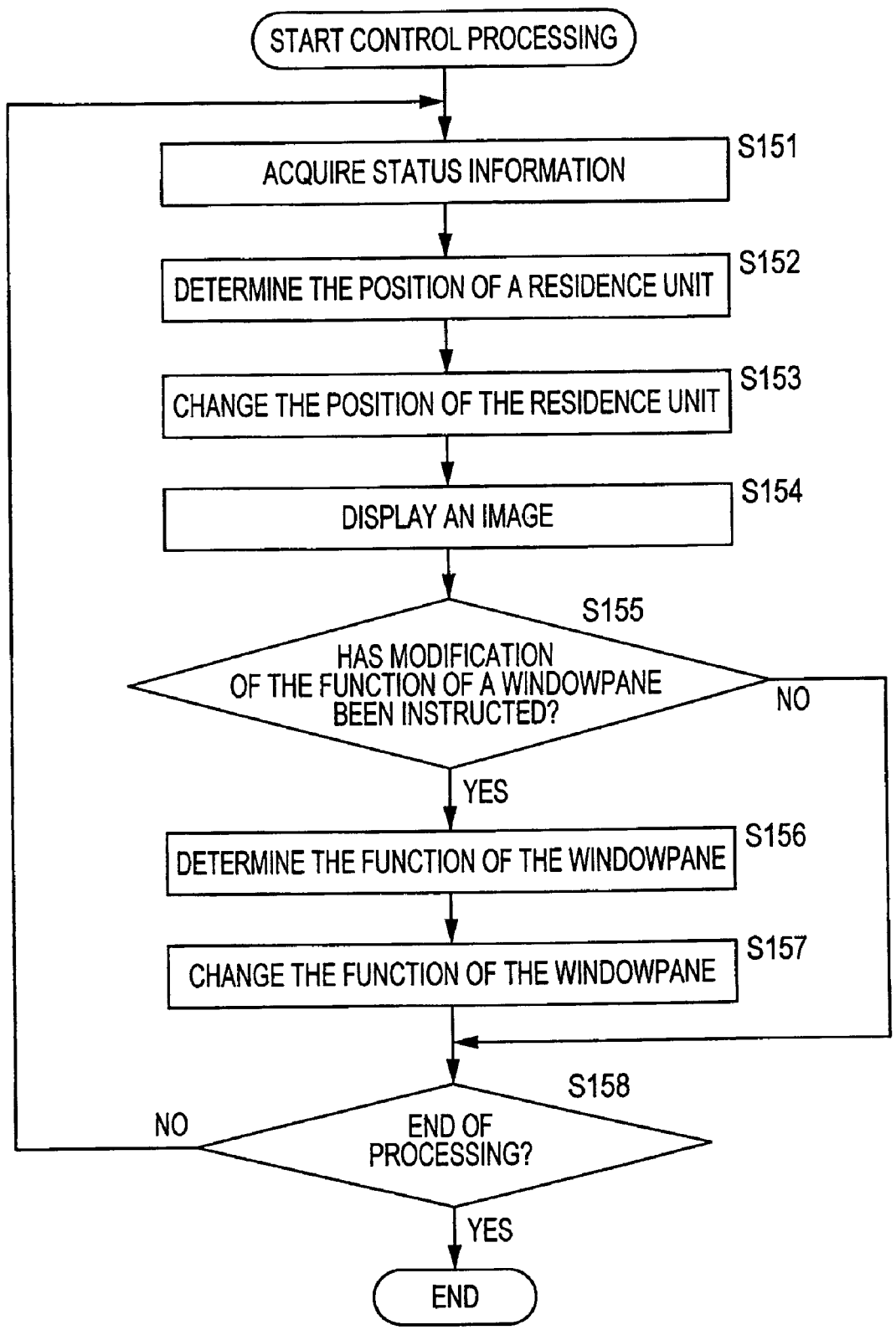
FIG. 47 is a flowchart describing control processing in which the control device in FIG. 45 controls residence units and windowpanes.

In step S177, the image modifying unit 375 changes the image to be displayed on the windowpanes 271 based on the functional information supplied from the function determining unit 372 in step S175, and the flow proceeds to step S158 in FIG. 47.

Specifically, the image modifying unit 375 reads out an image stored in the image storing unit 376 to supply this to the windowpanes 271 based on the functional information.

Figure 48:
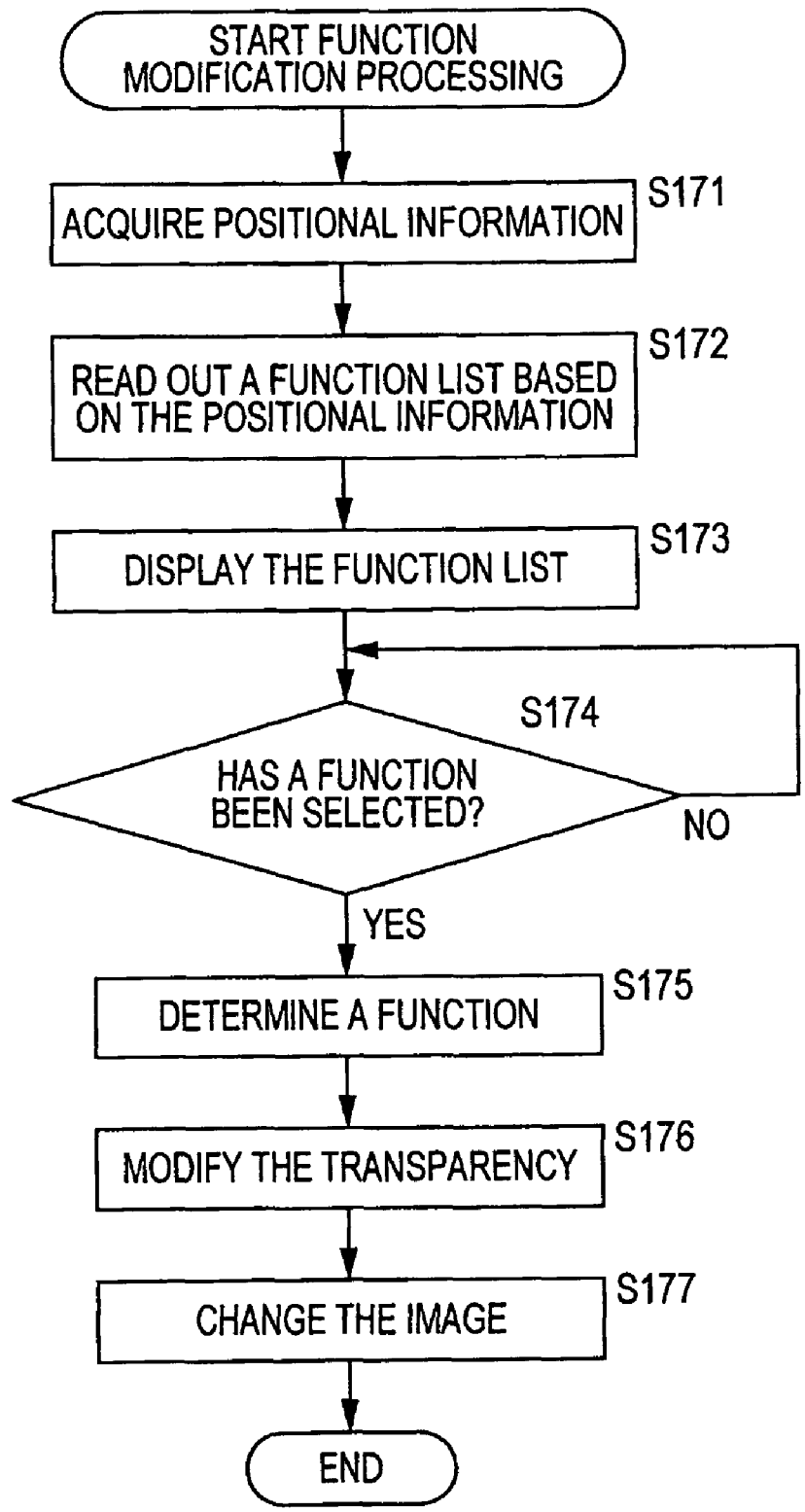
FIG. 48 is a flowchart describing function modification processing for modifying the functions of the windowpanes in step S156 and Step S157 in FIG. 47 with the display image selecting unit in detail.

Note that step S171 through step S175 in FIG. 48 correspond to step S156 in FIG. 47, and step S176 and step S177 in FIG. 48 correspond to step S157 in FIG. 47.

FIG. 49 illustrates an example of the function list to be displayed on the windowpanes 271, in the event that the positions of the residence units 203 are determined as the positions having the window 212-1 or window 212-2 on the outside (outer wall) of the residence unit 203 (e.g., the positions of the residence unit 203-1 and residence unit 203-2 in FIG. 34).

In FIG. 49, the function list is displayed on the windowpanes 271, which lists nine types of functional information of "make transparent", "make translucent", "make opaque", "wallpaper pattern", "curtain pattern", "shoji pattern", "outer scenery (camera image)", "landscape image", and "registered image".

In the event that "make transparent" is selected by the user, the transparency modifying unit 374 changes the transparency of the windowpanes 271 to make the windowpanes 271 transparent. Thus, the user can view the scenery of the outside through the windowpanes 271, and further the window 212-1 or window 212-2. That is to say, the user makes the windowpanes 271 serve as normal windows.

In the event that "make translucent" is selected by the user, the transparency modifying unit 374 changes the transparency of the windowpanes 271 to make the windowpanes 271 translucent. Also, in the event that "make opaque" is selected by the user, the transparency modifying unit 374 makes the windowpanes 271 opaque. In the event of making the windowpanes 271 translucent, the user can make the windowpanes 271 serve as frosted glass. Also, in the event of making the windowpanes 271 opaque, the user can make the windowpanes 271 serve as walls.

Also, in the event that "wallpaper pattern" is selected by the user, the image modifying unit 375 reads out a wallpaper pattern stored beforehand from the image storing unit 376 to display this on the windowpanes 271. Thus, the user can make the windowpanes 271 serve as walls, and can experience an atmosphere of wallpaper being on the walls.

In the event that "curtain pattern" is selected by the user, the image modifying unit 375 reads out a curtain pattern stored beforehand from the image storing unit 376 to display this on the windowpanes 271, or in the event that "shoji pattern" is selected by the user, the image modifying unit 375 reads out a shoji pattern stored beforehand from the image storing unit 376 to display this on the windowpanes 271. Thus, the user can make the windowpanes 271 serve as windows, and can cover curtain over a window or can experience an atmosphere such that shoji is attached thereto.

Further, in the event that "outer scenery (camera image)" is selected by the user, the image modifying unit 375 reads out the outer scenery of the house 201 supplied from the video camera 353 and stored in the image storing unit 376 to display this on the windowpanes 271. Thus, the user can make the windowpanes 271 serve as windows which project the scenery of the outside of the house 201.

Note that in the event that the image modifying unit 375 displays the images (scenery of the outside of the house 201) supplied from the video camera 353 on the windowpanes 271 in real time, the user can view the same scenery on the windowpanes 271 as the case of making the windowpanes 271 transparent. Also, for example, in the event that the scenery of the outside of the house 201 on a sunny day supplied from the video camera 353 is stored in the image storing unit 376, and the image modifying unit 375 reads out the image from the image storing unit 376 to display this on the windowpanes 271 on a rainy or cloudy day, the user can experience the atmosphere of a sunny day even on a rainy or cloudy day.

Also, in the event that "landscape image" is selected by the user, the image modifying unit 375 reads out a landscape image stored beforehand from the image storing unit 376 to display this on the windowpanes 271, or in the event that "registered image" is selected by the user, the image modifying unit 375 reads out a registered image registered beforehand be the user from the image storing unit 376 to display this on the windowpanes 271. Thus, the user makes the windowpanes 271 serve as virtual windows or posters, and can project various images such as a landscape image and a registered image.

As described above, the image modifying unit 375 displays various images on the windowpanes 271, thereby providing visual impressions as if a window, curtain, shoji, or the like existed on the windowpanes 271, to the user. That is to say, the image modifying unit 375 can visually change the configuration of the residence units 203.

Note that with the above description, an arrangement has been made wherein one function can be selected by the user, but a function realized by changing the transparency of the windowpanes 271 ("make transparent", "make translucent", or "make opaque"), and a function realized by changing the image to be displayed on the windowpanes 271 can be simultaneously selected.

For example, in the event that "make transparent" and "landscape image" are selected by the user, the transparency modifying unit 374 changes the transparency of the windowpanes 271 to make the windowpanes 271 transparent, and also the image modifying unit 375 reads out a landscape image stored beforehand from the image storing unit 376 to display this on the windowpanes 271. Thus, the user makes the windowpanes 271 serve as virtual windows, and can experience an atmosphere of viewing borrowed landscape.

FIG. 50 illustrates an example of the function list to be displayed on the windowpanes 271, in the event that the positions of the residence units 203 are determined as the positions without windows on the outside (outer wall) of the residence units 203 (e.g., the first floor in FIG. 34).

In FIG. 50, the positions of the residence units 203 are determined as the positions without windows on the outside (outer wall) of the residence units 203 (e.g., the first floor in FIG. 34), so even if the degree of transparency of the windowpanes 271 are modified, the outer wall exists, so the outer wall is projected on the windowpanes 271, which provides the same situation as in the case of being opaque. Accordingly, three types of functional information of "make transparent", "make translucent", and "make opaque" in the function list displayed on the windowpanes 271 in FIG. 49 are not displayed in FIG. 50, but instead, three types of functional information of "vase", "painting", and "bookshelf" are displayed on the function list. Thus, depending on the positions of the residence units 203, the functional information to be displayed on the function list, and consequently, the functions of the windowpanes 271 are changed, and also images which can be displayed on the windowpanes 271 are changed.

That is to say, in FIG. 50, the function list is displayed on the windowpanes 271, which lists nine types of functional information of "wallpaper pattern", "curtain pattern", "shoji pattern", "outer scenery (camera image)", "landscape image", "vase", "painting", "bookshelf image", and "registered image".

Note that "wallpaper pattern", "curtain pattern", "shoji pattern", "outer scenery (camera image)", and "landscape image" are the same as those in FIG. 49, so redundant description will be omitted.

In the event that "vase" is selected by the user, the image modifying unit 375 reads out a vase image stored beforehand from the image storing unit 376 to display this on the windowpanes 271. Thus, the user can make the windowpanes 271 serve as walls, and can experience an atmosphere such that a vase is decorated on the wall side.

In the event that "painting" is selected by the user, the image modifying unit 375 reads out a painting image stored beforehand from the image storing unit 376 to display this on the windowpanes 271, or in the event that "bookshelf image" is selected by the user, the image modifying unit 375 reads out a bookshelf image stored beforehand from the image storing unit 376 to display this on the windowpanes 271. Thus, the user can make the windowpanes 271 serve as walls, and can experience an atmosphere of a painting being decorated on the wall, or a bookshelf being placed there.

Figure 51B:
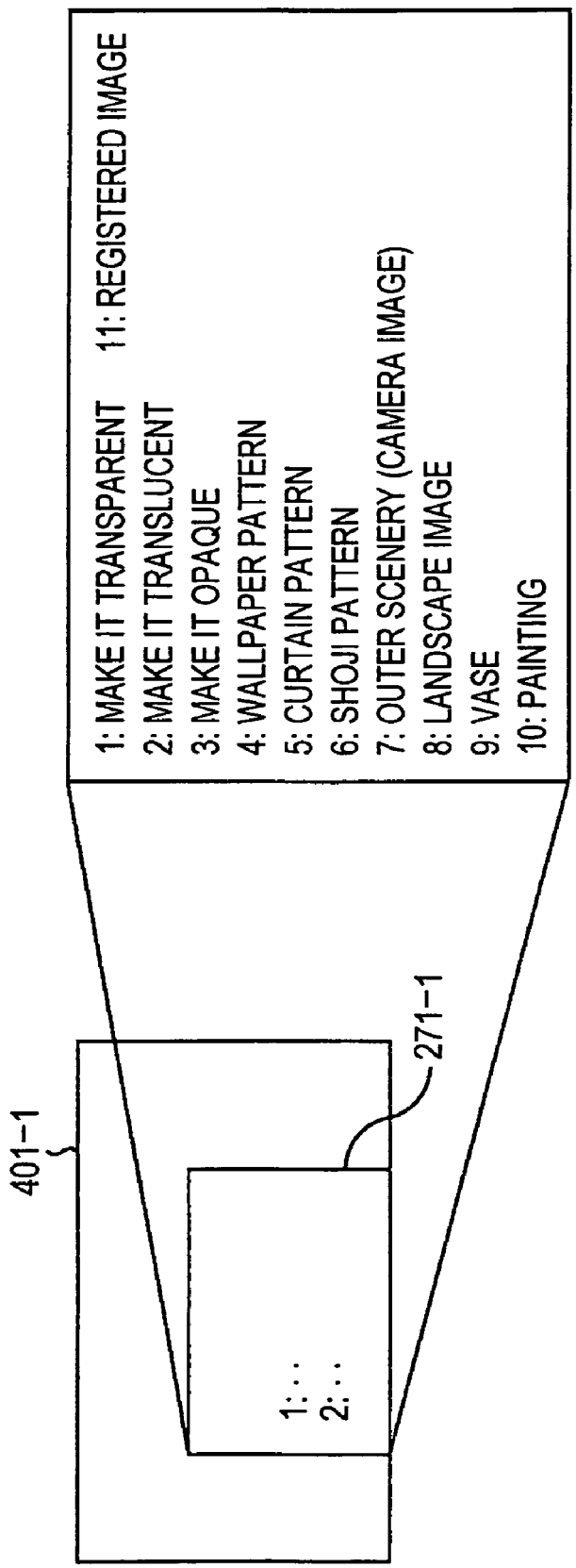
FIG. 51B illustrates examples of the functions of the windowpane to be displayed on the windowpane of the wall of the residence unit.

FIG. 51A and FIG. 51B illustrate examples of the function list of the windowpane 271-1 displayed on the windowpane 271-1 of the wall 401-1 of the residence unit 203-1. Here, the wall 401-1 is a wall in which the windowpane 271-1 is provided, of the walls making up the residence unit 203-1.

Note that in the case of the examples of FIG. 51A and FIG. 51B, let us say that the residence unit 203-1 is disposed in the position where the windowpane 212-1 exists in the outer wall.

Also, in FIG. 51A and FIG. 51B, description will be made regarding the windowpane 271-1 of the wall 401-1 of the residence unit 203-1, but the same processing is performed regarding the windowpane 271-2 through windowpane 271-6 of the residence unit 203-2 through residence unit 203-6 as well.

FIG. 51A illustrates an example in which the function of the windowpane 271-1 is determined as transparent. As shown in FIG. 51A, of the wall 401-1, the windowpane 271-1 provided in the center of the drawing is made transparent.

When the windowpane 271-1 is made transparent as shown in FIG. 51A, upon modification of the function of the windowpane 271-1 being requested by the user, the function determining unit 372 reads out the function list from the function storing unit 373 in accordance with the positional information supplied from the control unit 351 to display this on the windowpane 271-1 as shown in FIG. 51B. In the case of the examples of FIG. 51A and FIG. 51B, the residence unit 203-1 is assumed in the position where the window 212-1 exists in the outer wall, so the function list to be displayed on the windowpane 271-1 includes functional information relating to modification of transparency. That is to say, in FIG. 51B, the function list is displayed on the windowpane 271-1, which lists eleven types of functional information of "make transparent", "make translucent", "make opaque", "wallpaper pattern", "curtain pattern", "shoji pattern", "outer scenery (camera image)", "landscape image", "vase", "painting", and "registered image".

Figure 52:
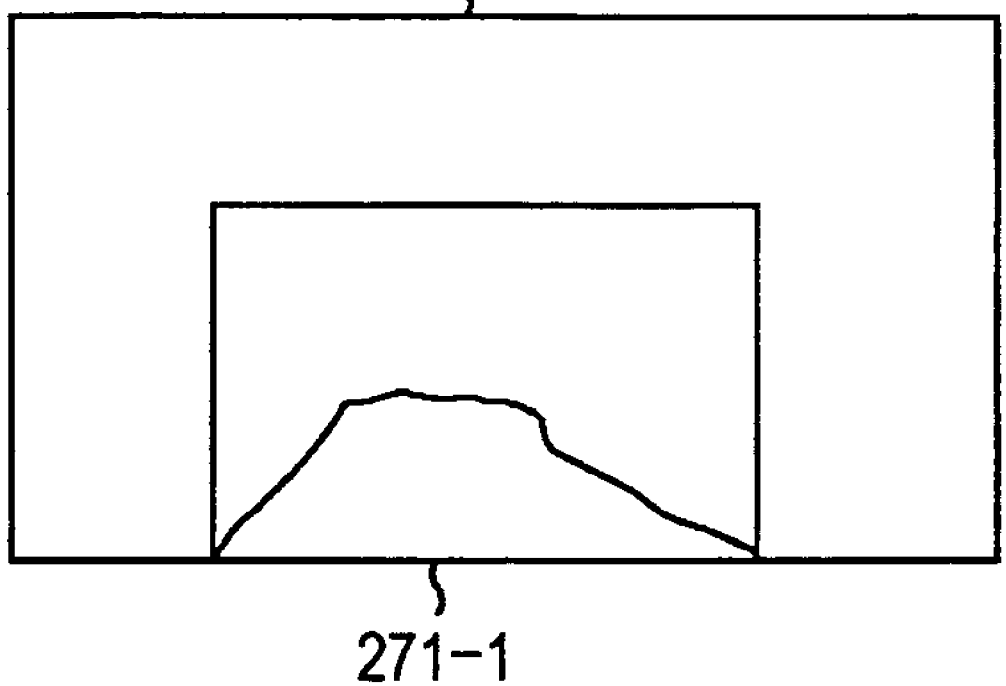
FIG. 52 is a diagram illustrating an example in which a user views the windowpane where the functions in FIG. 51B are displayed, selects his/her desired function, and the functions of the windowpane are modified.

FIG. 52 illustrates an example in which the user views the windowpane 271-1 on which the function list of FIG. 51B is displayed, selects the desired function, and the function of the windowpane 271-1 is modified in accordance with the selected function.

FIG. 52 illustrates the windowpane 271-1 when the user views the windowpane 271-1 on which the function list of FIG. 51B is displayed, and selects, for example, "landscape image" using a cursor or the like.

As shown in FIG. 52, of the wall 401-1, on the windowpane 271-1 provided in the center of the drawing, a landscape image stored beforehand in the image storing unit 376, and for example, a mountain image is displayed. That is to say, the function determining unit 372 determines the function of the windowpane 271-1 as the function representing functional information "landscape image", and supplies the functional information representing the determined function to the image modifying unit 375. The image modifying unit 375 reads out a mountain image serving as a landscape image stored beforehand from the image storing unit 376 to display the mountain image on the windowpane 271-1, based on the functional information from the function determining unit 372.

Note that with the above description, an arrangement has been made wherein the functions of the windowpanes 271 are determined according to the functional information which the user selects from the function list, but an arrangement may be made wherein the function determining unit 372 automatically selects a function. For example, the function determining unit 372 determines the functions of the windowpane 271-3 through windowpane 271-6 of the residence unit 203-3 through residence unit 203-6, which are not in the positions where the window 212-1 or window 212-2 is installed in FIG. 35, as "outer scenery (camera image)", whereby the outer scenery of the house 201 which filmed by the video camera 353 can be displayed on the windowpane 271-3 through windowpane 271-6. Thus, the user can experience an atmosphere in which a window is installed in the residence unit 203-3 through residence unit 203-6. Also, the function determining unit 372 determines the functions of the windowpane 271-1 and windowpane 271-2 of the residence unit 203-1 and residence unit 203-2, which are in the positions where the window 212-1 or window 212-2 is installed in FIG. 35, as "outer scenery (camera image)", whereby the outer scenery of the house 201 which has been filmed by the video camera 353 on a sunny day and stored in the image storing unit 376 can be displayed on the windowpane 271-1 and windowpane 271-2. Thus, the user can experience the atmosphere of fine weather even on a rainy or cloudy day.

Next, the series of processing mentioned above in FIG. 34 through FIG. 52 can be executed using dedicated hardware, and also can be executed using software. In the event of executing a series of processing using software, a program making up the software is installed in a general-purpose computer or the like.

Figure 53:
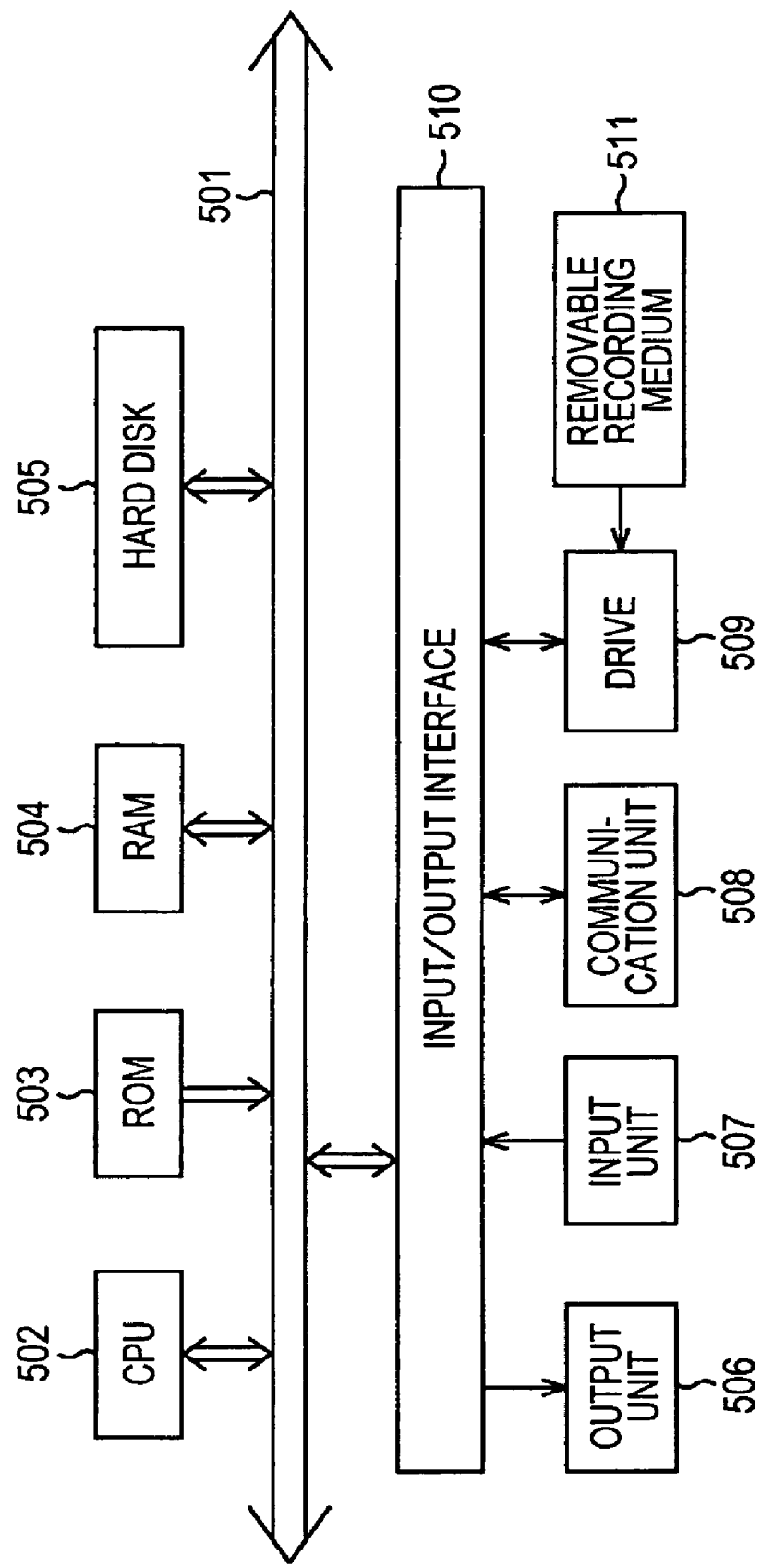
FIG. 53 is a block diagram illustrating a configuration example of a computer to which the present invention is applied, serving as one embodiment.

To this end, FIG. 53 illustrates a configuration example of one embodiment of a computer in which a program for executing a series of processing mentioned above is installed.

The program can be stored beforehand in the hard disk 505 or ROM 503 serving as a recording medium built into the computer.

Or, the program may be temporarily or eternally stored (recorded) in the removable recording medium 511 such as a flexible disk, CD-ROM (Compact Disc Read Only Memory), MO (Magneto optical) disk, DVD (Digital Versatile Disc), magnetic disk, and semiconductor memory. Such removable recording medium 511 can be provided as so-called packaged software.

Note that in addition to being installed into the computer from such a removable recording medium 511, the program can be wirelessly transferred to the computer from a download site via the earth satellite for digital satellite broadcasting, or can be cable-transferred to the computer via a network such as a LAN (Local Area Network) or the Internet, and the computer side receives the program thus transferred at the communication unit 508, and can install this in the built-in hard disk 505.

The computer has a CPU (Central Processing Unit) 502 built in. The CPU 502 is connected with the input/output interface 510 via the bus 501, and upon the user inputting instructions by operating the input unit 507 made up of a keyboard, mouse, microphone and so forth, via the input/ output interface 510, the CPU 502 executes the program stored in the ROM (Read Only Memory) 503 in accordance with the instructions. Or, also, the CPU 502 loads the program stored in the hard disk 505, the program transferred from the satellite or a network, received at the communication unit 508, and installed in the hard disk 505, or the program read out from the removable recording medium 511 mounted in the drive 509, and installed in the hard disk 505, into the RAM (Random Access Memory) 504, and executes it. Thus, the CPU 502 performs the processing in accordance with the above flowchart, or the processing performed with the configuration of the above block diagram. Subsequently, the CPU 502 outputs the processing results from the output unit 506 made up of an LCD (Liquid Crystal Display), speaker, and so forth via the input/output interface 510, or transmits the processing results from the communication unit 508, and further stores them in the hard disk 505, or the like, for example, as necessary.

Note that with the above description, the control system has realized optimization of the house 201 by changing the positions of the residence units (rooms) or the functions of the windows, but optimization of the house 201 can be also realized by changing the other facilities, i.e., for example, the magnitude (consequently, the number of stages) of the level difference of the stairs 231 depending on a person's activity situations (physical condition is poor, good, etc.) or a person. Also, in addition to the stairs 231, optimization of the house 201 can be achieved by further changing the other facilities as appropriate, such as the height of the threshold and the position of an umbrella stand or a shoebox which are provided in the house 201.

Also, the number of the residence units 203 is not restricted to six, and any number may be used.

Further, with the above description, an arrangement has been made wherein the six residence units 203 are moved together, but in addition, an arrangement may be made wherein every four of the lower portion or the upper portion of the residence units 203 are moved together.

Also, an arrangement has been made wherein the transparency of the windowpanes 271 is selected from transparent, translucent, and opaque, but an arrangement may be made wherein the user sets arbitrary transparency.

Further, with the above description, an arrangement has been made wherein digital broadcasting is received at the broadcasting information extracting unit 311 from the unshown antenna, but in addition, an arrangement may be made wherein a teletext or the like is received.

Also, the way to move the residence units 203 is not restricted to that like an automated parking tower. That is to say, for example, a mechanism may be employed wherein space capable of accommodating at least one of the residence units 203 is provided underground, and the residence unit 203-1 through residence unit 203-6 can be moved to positions of arbitrary spatial relationship.

Further, with the above description, an arrangement has been made wherein the image modifying unit 375 is made up of a projector, and an image is displayed by casting light, but an arrangement may be made wherein the image modifying unit 375 is made up of a driver for driving a liquid crystal panel making up the windowpanes 271.

Also, an arrangement may be made wherein the windowpanes 271 is made up of a device other than a liquid crystal panel that is capable of control of transparency and display of an image.

As described above, an arrangement has been made wherein with the control device 290, the information acquiring unit 291 acquires status information, the unit-position determining unit 292 changes the positions of the residence units 203 of the house 201 serving as a building based on the status information, thereby realizing intelligent active integration between electronic apparatuses and a house.

Further, an arrangement has been made wherein with the control device 350, the display image selecting unit 352 changes the image to be displayed on the windowpanes 271 depending on the positions of the residence units 203, whereby the user can live more comfortably within the house 201.

Fourth Embodiment

Figure 54:
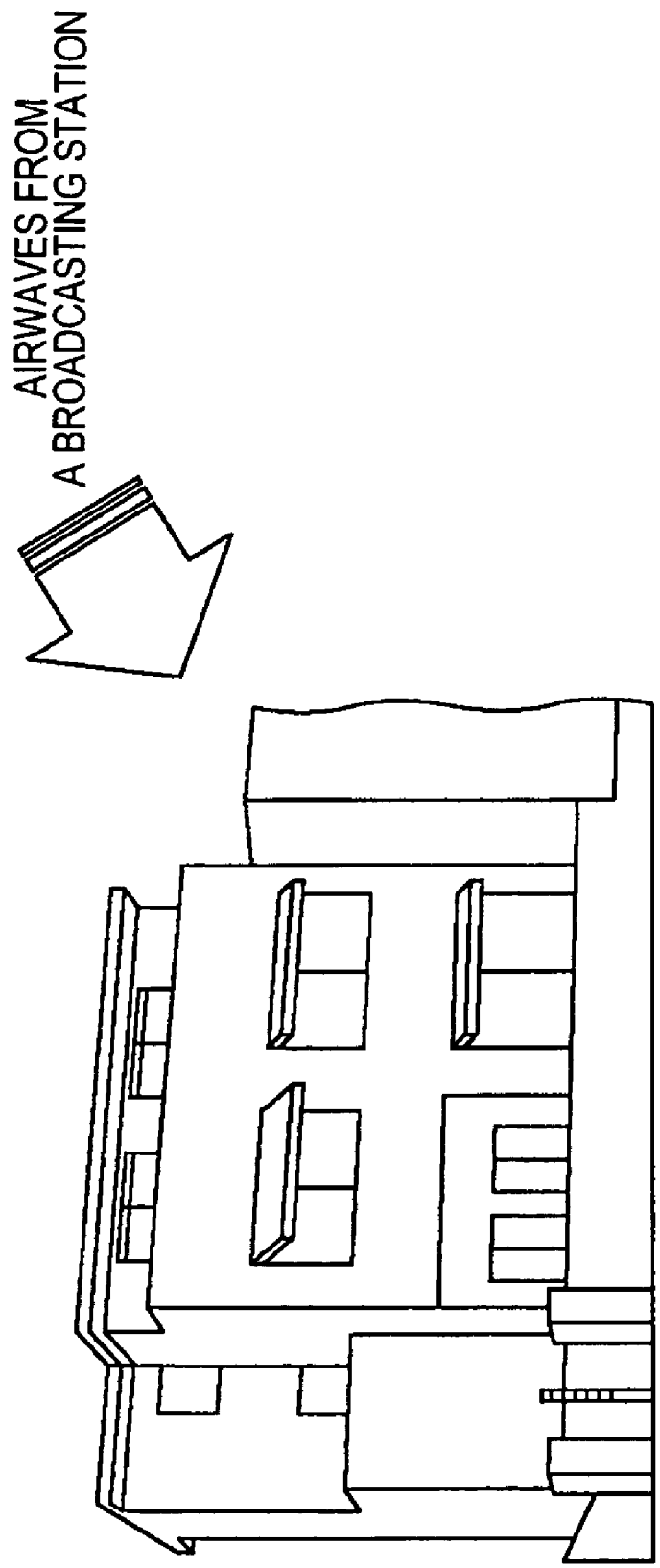
FIG. 54 is a perspective view illustrating a configuration example of a residence system to which the present invention is applied, serving as a fourth embodiment.

FIG. 54 illustrates a configuration example of a residence system (the term system means what is obtained by two or more objects being gathered logically regardless of each component object thereof being in the same case) to which the present invention is applied, serving as a fourth embodiment.

The residence system in FIG. 54 receives a broadcasting signal such as a program or the like transmitted from a broadcasting station as airwaves. A user who is a resident of the residence system views and listens to a program obtained from the broadcasting signal in a room (not shown) within the building.

Now, let us say that the number of users serving as residents of the residence system in FIG. 54 is five, for example. Let us say that the five users are a user A, user B, user C, user D, and user E.

Figure 55:
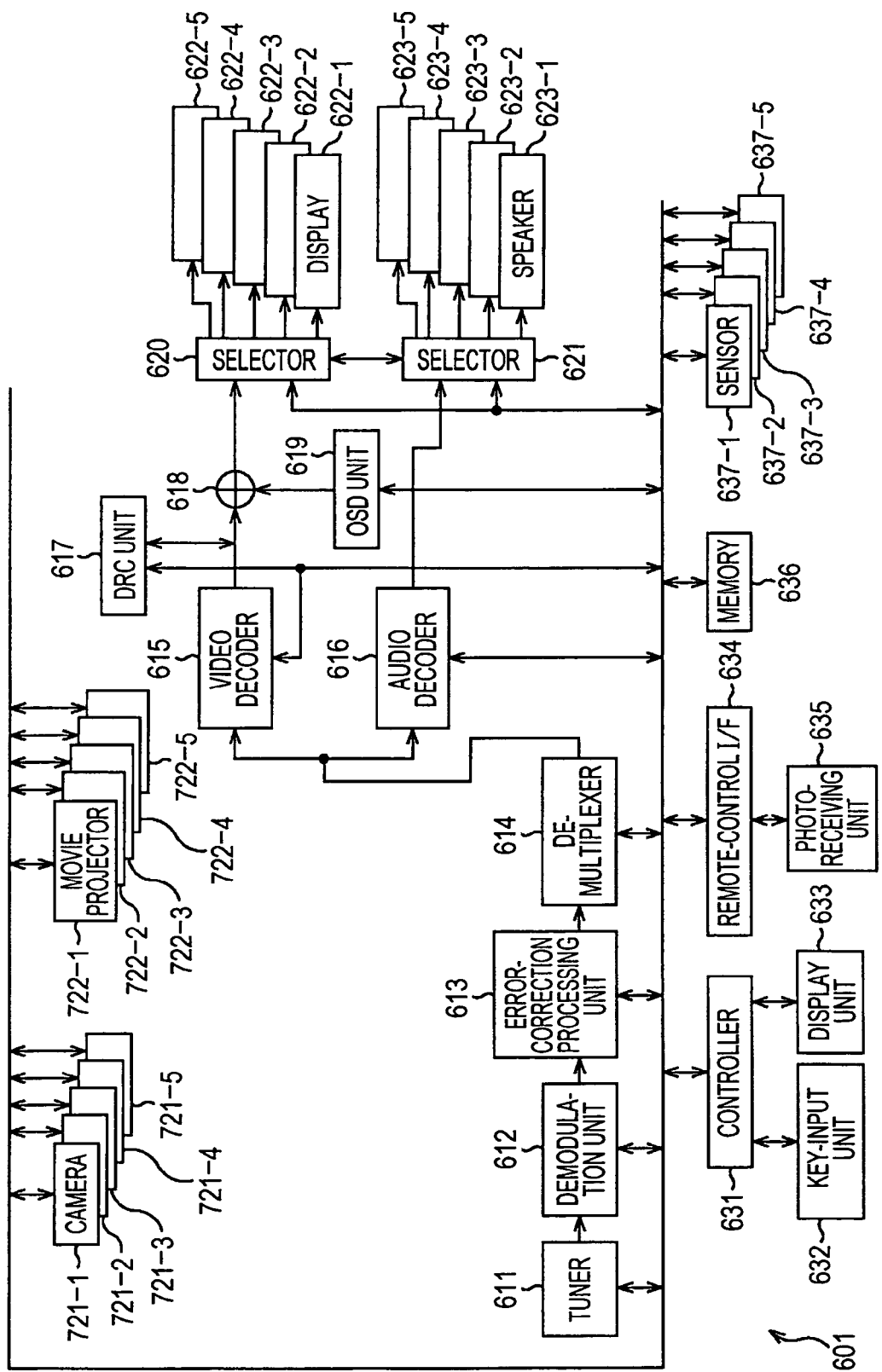
FIG. 55 is a block diagram illustrating a configuration example of a receiving device 601.

FIG. 55 is a block diagram illustrating a configuration example of a receiving device 601 to be installed within the building of the residence system in FIG. 54.

The broadcasting signal of the digital broadcasting received at an unshown antenna is supplied to a tuner 611. The broadcasting signal of this digital broadcasting is digital data stipulated with the MPEG (Moving Picture Experts Group)-2 or the like, and is transmitted as a transport stream made up of multiple TS (Transport Stream) packets. Under control of a controller 631, the tuner 611 selects the broadcasting signal of a predetermined channel (frequency) from the broadcasting signals of multiple channels supplied from the antenna, and supplies the broadcasting signal of the selected channel to a demodulation unit 612.

Later-described memory 636 stores the five users A through E, and their preferred program genres in an associated manner as user's taste information. Also, the memory 636 also stores the order of priorities of genres. The controller 631 controls the tuner 611 so as to select a channel which is broadcasting a user's preferred genre program with reference to the user's taste information stored in the memory 636. Accordingly, the tuner 611 selects a broadcasting signal of a predetermined channel from the broadcasting signals of the multiple channels supplied from the antenna based on the user's taste information stored in the memory 636.

Also, in the event that multiple programs having a user's favorite different genre are broadcasting at the same time, the controller 631 controls the tuner 611 so as to select the channel which is broadcasting the program of a genre with a high priority based on the priories of genres stored in the memory 636.

Note that the controller 631 can tell the channel and program which is broadcasting a user's favorite genre, for example, by using an EPG (Electronic Program Guide) or the like.

The demodulation unit 612 demodulates the transport stream of the broadcasting signal of a predetermined channel supplied from the tuner 611 using, for example, QPSK (Quadrature Phase Shift Keying) modulation or the like, based on the control by the controller 631, and supplies the transport stream obtained with the modulation to an error-correction processing unit 613.

The error-correction processing unit 613, under control of the controller 631, detects an error from the transport stream supplied from the demodulation unit 612, and corrects this. Subsequently, the transport stream following the correction processing is supplied to a demultiplexer 614.

The demultiplexer 614, under control of the controller 631, subjects the transport stream supplied from the error-correction processing unit 613 to descrambling processing as necessary. Also, the demultiplexer 614, under control of the controller 631, extracts the TS packets of a user's favorite genre program from the transport stream supplied from the error-correction processing unit 613 with reference to the PID (Packet Identifier) of each of the TS packets.

Subsequently, of the TS packets of the user's favorite genre program, the demultiplexer 614 supplies the video data thereof to a video decoder 615, and supplies the audio data thereof to an audio decoder 616, respectively.

The video decoder 615 decodes the video data supplied from the demultiplexer 614 using the MPEG-2 method, and supplies this to a DRC (Digital Reality Creation) unit 617 and a synthesizing unit 618.

The audio decoder 616 decodes the audio data supplied from the demultiplexer 614 using the MPEG-2 method, and supplies this to a selector 621.

Let us say that the image signal (video data) which the video decoder 615 outputs is a first image signal, and the DRC unit 617 transforms the first image signal into a high-quality image signal (video data) serving as a second image signal. Subsequently, the DRC unit 617 supplies (outputs) the high-quality image signal (video data) to the synthesizing unit 618. Note that hereinafter, let us say that a high-quality image signal (video data) represents a high-quality image signal obtained by improving the resolution of an image signal.

In the event that video data is supplied from the DRC unit 617, the synthesizing unit 618 selects the video data. On the other hand, in the event that video data is not supplied from the DRC unit 617, the synthesizing unit 618 selects video data supplied from the video decoder 615. Also, the synthesizing unit 618 superimposes the video data supplied from an OSD (On Screen Display) unit 619 on the video data on the selected side, of the video data supplied from the video decoder 615 or DRC unit 617, and supplies this to a selector 620. Note that in the event that video data is not supplied from the OSD unit 619, of the video data supplied from the video decoder 615 or DRC unit 617, the synthesizing unit 618 supplies the selected one to the selector 620 without any modification.

The OSD unit 619, under control of the controller 631, for example, generates video data such as the number and volume of the current selected channel, and supplies this to the synthesizing unit 618.

The selector 620, under control of the controller 631, selects a display for outputting the video data supplied from the synthesizing unit 618 from displays 622-1 through 622-5. Subsequently, the selector 620 supplies the video data supplied from the synthesizing unit 618 to any selected one of the displays 622-1 through 622-5. Also, the selector 620 can select multiple ones from the displays 622-1 through 622-5, and supply video data to the selected multiple displays.

The displays 622-1 through 622-5 are installed in rooms #1 through #5 provided in the residence system in FIG. 54. Each of the displays 622-1 through 622-5, upon the video data being supplied from the selector 620, transforms the video data into video data of the NTSC (National Television System Committee) method, and displays an image obtained as a result. Note that hereinafter, in the event that the displays 622-1 through 622-5 in particular do not need to be distinguished, these are referred to as displays 622.

Here, as for the displays 622, a flat display panel such as an LCD (Liquid Crystal Display) or PDP (Plasma Display Panel) can be employed, for example. In this case, the displays 622 can be installed integrally with walls so as to be embedded in the walls of the rooms of the residence system in FIG. 54. Also, in addition to this, as for the displays 622, such as a projector which uses one or more walls of the room as a screen is employable.

The selector 621, under control of the controller 631, selects a speaker for outputting the audio data supplied from the audio decoder 616 from speakers 623-1 through 623-5. Subsequently, the selector 621 supplies the audio data supplied from the audio decoder 616 to any selected one of the speakers 623-1 through 623-5. Also, the selector 621 can select multiple ones from the speakers 623-1 through 623-5, and supply audio data to the selected multiple speakers.

The speakers 623-1 through 623-5 are installed in the rooms #1 through #5 provided in the residence system in FIG. 54, respectively. The respective speakers 623-1 through 623-5, upon audio data being supplied from the selector 621, subjects the audio data to analog transformation to output this as voice. Note that hereinafter, in the event that the speakers 623-1 through 623-5 in particular do not need to be distinguished, these will be referred to as speakers 623.

Here, the speakers 623 can be installed so as to be integrated with the above displays 622, or so as to be embedded independently in the wall or floor of the room of the residence system in FIG. 54.

The controller 631 performs various processing in accordance with the program stored in the memory 636, and thus, controls, for example, the tuner 611, demodulating unit 612, error-correction processing unit 613, demultiplexer 614, video decoder 615, audio decoder 616, DRC unit 617, OSD unit 619, selector 620, and selector 621. Also, the controller 631 executes various processing based on the operating signal corresponding to a user operation supplied from the key-input unit 632 or remote-control I/F 634.

For example, the controller 631 controls the tuner 611 so as to select a channel which is broadcasting a user's preferred genre program based on the user's taste information stored in the memory 636, as described above. Also, when later-described sensors 637-1 through 637-5 detect that the users are in the rooms #1 through #5, the controller 631 controls the selectors 620 and 621 so as to select the display 622 and speaker 623 which are installed in the rooms #1 through #5.

Also, the controller 631 is connected with cameras 721-1 through 721-5 installed in each room of the rooms #1 through #5, and movie projectors 722-1 through 722-5 installed in each room of the rooms #1 through #5. Note that hereinafter, in the event that the cameras 721-1 through 721-5 in particular do not need to be distinguished, these are referred to as cameras 721. Similarly, in the event that the movie projectors 122-1 through 122-5 in particular do not need to be distinguished, these are referred to as movie projectors 722.

The controller 631 controls the cameras 721-1 through 721-5 to capture the situations within the rooms #1 through #5, or the users A through E present within the rooms #1 through #5 as necessary. Subsequently, the controller 631 controls the memory 636 to temporarily record (store) the capturing signals output by the cameras 721. Further, the controller 631 supplies the capturing signals temporarily recorded in the memory 636 to the movie projectors 722 from the memory 636.

Further, the controller 631 may detect whether or not the users are in the rooms by processing the capturing signals output by the cameras 721. In this case, with the receiving device 601 in FIG. 55, the sensors 637-1 through 637-5 can be omitted.

The key-input unit 632 is, for example, made up of switch buttons or the like, receives an operation and the like when the user selects the desired channel, and supplies the operating signal corresponding to the user operation to the controller 631. A display unit 633, based on the control signal supplied from the controller 631, displays a processing state in which the receiving device 601 performs processing, or the like, for example. For example, the display unit 633 displays the channel selected by the tuner 611, or the like.

The remote-control I/F (Interface) 634 supplies the operating signal corresponding to a user operation supplied from a photo-receiving unit 635 to the controller 631. The photo-receiving unit 635 receives the operating signal corresponding to a user operation transmitted from a remote commander (not shown), and supplies this to the remote-control I/F 634.

The memory 636 is, for example, made up of a hard disk, semiconductor memory, or the like, and stores a program, data, and so forth for the controller 631 executing various processing. This program for the controller 631 executing various processing is stored in a recording medium such as a magnetic disk (including floppy), optical disc (including CD-ROM (Compact Disk-Read Only Memory) and DVD (Digital Versatile Disk)), magneto-optical disk (including MD (Mini-Disk)), or semiconductor memory, and is installed in the memory 636 via the recording medium or a network such as the Internet.

Also, the memory 636 stores the five users A through E, and their preferred program genres in an associated manner as user's taste information, as described above. Also, the memory 636 also stores the order of priorities of genres.

Further, the memory 636 stores the correlation between the five users A through E, rooms #1 through #5, displays 622-1 through 622-5, speakers 623-1 through 623-5, and sensors 637-1 through 637-5. That is to say, the memory 636 also stores information of, for example, which room the user A's room is, and which displays 622-1 through 622-5, speakers 623-1 through 623-5, and sensors 637-1 through 637-5 are installed in that room.

Note that description will be made later regarding the details of storage content (data) such as user's taste information stored in the memory 636 with reference to FIG. 56.

The sensors 637-1 through 637-5 are installed in the rooms #1 through #5 respectively, and detect whether or not the users are within the rooms #1 through #5. Subsequently, the sensors 637-1 through 637-5, upon detecting that the users are within the rooms #1 through #5, supplies a detection signal to the effect that that the users presence within the rooms has been detected (represents that the users are present within the rooms), to the controller 631. As described later with reference to FIG. 56, the memory 636 stores the users A through E and the rooms #1 through #5 in an associated manner, the controller 631 can recognize in which of the user's rooms the users (persons) are present, of the users A through E, based on the detection signals supplied from the sensors 637-1 through 637-5, the correlation between the users A through E, sensors 637-1 through 637-5, and rooms #1 through #5 stored in the memory 636. Here, as for the sensors 637-1 through 637-5, temperature sensors, infrared sensors, ultrasonic sensors, or the like may be employed, for example. Note that hereinafter, in the event that the sensors 637-1 through 637-5 in particular do not need to be distinguished, these will be referred to as sensors 637.

The cameras 721-1 through 721-5 are installed in the rooms #1 through #5, respectively. The cameras 721-1 through 721-5, under control of the controller 631, capture the situations within the rooms #1 through #5, or the users A through E present within the rooms #1 through #5, respectively. Also, the camera 721-1 through 721-5, under control of the controller 631, capture viewing/listening situations in which the users A through E view and listen to the program output from the display 622 and speaker 623 within the rooms #1 through #5, respectively. The image signals captured by the cameras 721 (hereinafter, referred to as capturing signals) are supplied to the movie projectors 722 via the memory 636 (following being recorded in the memory 636 temporarily).

The movie projectors 722-1 through 722-5 are installed in the rooms #1 through #5, respectively. The movie projectors 722-1 through 722-5, under control of the controller 631, project an image obtained from the capturing signals which the memory 636 outputs on the rooms #1 through #5, respectively. Accordingly, the movie projectors 722-1 through 722-5, under control of the controller 631, project (display) the image of viewing/listening situations in which the users in the other rooms are viewing/listening to a program on the walls or floors of the rooms #1 through #5, respectively.

Thus, the feeling of viewing/listening to a program together with the users of the other rooms can be provided to the user who is viewing/listening to the desired genre program within the user's room in solitude. Projecting the viewing/listening situation of such a user of the other rooms who is viewing/listening to the same program in the user's room is referred to as a sensation mode here.

The user can turn off the sensation mode, in the event that the user does not want to show the users within the other rooms the his/her own viewing/listening situation, or in the event that the user does not want to display the other users' viewing/listening situations on the wall of his/her own room. In this case, the key-input unit 632 and unshown remote control are provided with an operating button for turning on/off the sensation mode, for example. Subsequently, the operating signal corresponding to the user operation for turning on/off the sensation mode is supplied from the key-input unit 632 or remote-control I/F 634 to the controller 631. The controller 631 controls a predetermined block in accordance with the operating signal corresponding to the user operation for turning on/off the sensation mode.

Also, the controller 631 stores the on/off state of the sensation mode operated immediately before. Subsequently, based on the on/off state of the sensation mode, in the event that the sensation mode is off, the controller 631 prevents the cameras 721 installed in the respective rooms from capturing the users' viewing/listening situations by controlling the cameras 721. Also, in the event that the sensation mode is off, the controller 631 can prevent the movie projectors 722 from projecting the users' viewing/listening of the other rooms captured by the cameras 721 by controlling the movie projectors 722 installed in the respective rooms. On the other hand, in the event that the sensation mode is on, the controller 631 controls the cameras 721 installed in the respective rooms to capture the users' viewing/listening situations. Further, the controller 631 controls the movie projectors 722 to project the image of the captured users' viewing/listening situations on the wall or floor of the room, which is a different room from the room in which the user's viewing/listening situation is captured, of the user who is viewing/listening to the same program.

Here, the movie projectors 722 can be made up of a projector and so forth, for example. Also, instead of the movie projectors 722, an arrangement may be made wherein for example, a flat display panel such as an LCD or PDP is embedded in the wall or floor of the users' rooms, and the controller 631 displays the image of viewing/listening situations in which the users in the other rooms are viewing/listening to a program on the embedded LCD and PDP screens.

The receiving device 601 thus configured outputs an image and voice serving as a digital broadcasting program from the displays 622-1 through 622-5 and speakers 623-1 through 623-5 of the rooms #1 through #5 where the users A through E are as follows.

Specifically, the controller 631 detects the desired (favorite) genre program of the user. The tuner 611 selects the broadcasting signal of the channel of the user's desired (favorite) genre program from the transport stream serving as the broadcasting signal of the digital broadcasting received at the antenna. Subsequently, the sensors 637-1 through 637-5 detect whether or not the users A through E who registered the program of the genre detected by the controller 631 as their favorite genre are in their rooms.

In the event that detection is made that the users A through E who registered the program of the genre detected by the controller 631 as their favorite genre are in their rooms, the transport stream of the program detected by the controller 631 is supplied to the demultiplexer 614 via the demodulating unit 612 and error-correction processing unit 613.

Of the TS packets of the user's favorite genre program, the demultiplexer 614 supplies the video data thereof to the video decoder 615, and supplies the audio data thereof to the audio decoder 616, respectively.

The video decoder 615 MPEG-decodes the video data of the TS packets supplied from the demultiplexer 614, and the DRC unit 617 transforms the video data obtained as a result into the video data of a high-quality image, and supplies this to the selector 620.

Also, the audio decoder 616 MPEG-decodes the audio data of the TS packets supplied from the demultiplexer 614, and supplies the audio data obtained as a result to the selector 621.

The selectors 620 and 621 select, of the displays 622-1 through 622-5 and speakers 623-1 through 623-5 installed in the rooms #1 through #5, the displays and speakers corresponding to the rooms #1 through #5, in which the users A through E, who have stored the program genre detected by the controller 631 in the memory 636 as their favorite genre, are detected to be present.

Accordingly, in the event that the user who likes the received program as his/her favorite genre program is in his/her room, the images and voice of the program are output to the displays 622-1 through 622-5 and the speakers 623-1 through 623-5 of his/her room. Here, in the event that of the users A through E, the two or more users who like the received program as their favorite genre program are present, the images and voice of the program are output to the displays and speakers of all of their rooms.

Further, with the receiving device 601 in FIG. 55, in the event that the two or more users who want the program genre detected by the tuner 611 are present, the cameras 721 installed in each of the users' rooms capture the viewing/listening situations of the users who are viewing/listening to the program of the digital broadcasting output from the displays 622 and speakers 623. Subsequently, the capturing signal is supplied to the movie projectors 722 installed in the rooms of the other users who are viewing/listening to the same program. Accordingly, the viewing/listening situations of the users who are viewing/listening to the same program other than themselves are displayed (projected) on the wall of the room.

For example, in the event that determination is made that the users A and B who desire the program genre (e.g., soccer) detected by the tuner 611 are present in their rooms #1 and #2, the camera 721-1 installed in the room #1 captures the viewing/listening situation of the program of the user A, and the camera 721-2 installed in the room #2 captures the viewing/listening situation of the program of the user B. Subsequently, the movie projector 722-1 installed in the room #1 projects the viewing/listening situation of the user B who is viewing/listening to the program, which was captured by the camera 721-2 installed in the room #2, in the room #1. Similarly, the movie projector 722-2 installed in the room #2 projects the viewing/listening situation of the user A who is viewing/listening to the program, which was captured by the camera 721-1 installed in the room #1, in the room #2.

Also, the controller 631 controls whether or not the viewing/listening situation of the user of an arbitrary room, which is captured by the cameras 721, is displayed in the other rooms. For example, in the event that the program detected by the tuner 611 is a movie program, the user usually wants to watch it alone in many cases. In such a case, even in the event that another user is viewing/listening to the same movie program, the user turns off the sensation mode. Thus, the controller 631 controls the movie projectors 722 so as not to display the viewing/listening situation of the user who is viewing/listening to the same movie program in another room. Accordingly, the user can watch the movie program alone.

FIG. 56 illustrates data relating to the users A through E stored in the memory 636 in FIG. 55.

The memory 636 in FIG. 56 stores the taste information representing what kind of genre of a program each of the five users A through E likes, and the priorities of genres are stored (registered).

As shown in the table on the left side in FIG. 56, examples of the genres of programs stored in the memory 636 include sports in general, soccer, MLB, animation, news in general, and drama. With the present example, let us say that the genres of programs represent six genres of sports in general, soccer, MLB, animation, news in general, and drama.

Also, as for the users who like the genre of sports in general, the users A, B, and C are registered. Further, as for the users who like soccer, the users A and B are registered. Similarly, as for the users who like MLB, animation, news in general, and drama, the users A and C, users D and E, users D, and users C and E are registered, respectively.

Also, as for the priorities of each genre, news in general is registered in the priority of the 1st place, and soccer is registered in the priority of the 2nd place. Hereinafter, in the same way, MLB, sports in general, animation, and drama are sequentially registered in the priorities of the 3rd, 4th, 5th, and 6th places.

Accordingly, in the event that the program of the genre of sports in general, soccer, MLB, animation, news in general, or drama is detected by the tuner 611, the controller 631 can determine (recognize) who the user who likes the genre is by referring to the data of the table on the left side of FIG. 56.

Also, in the event that two or more programs having a user's favorite different genre are broadcasting at the same time, the controller 631 can control the tuner 611 to select a program of which genre is a higher priority by referring to the data of the table on the left side in FIG. 56.

Also, as shown in the table on the right side in FIG. 56, the memory 636 in FIG. 55 stores the rooms #1 through #5, the displays 622-1 through 622-5 (displays #1 through #5), and the speakers 623-1 through 623-5 (SP #1 through #5), which are associated with the users A through E.

That is to say, the memory 636 stores that the user A's room is the room #1, and the displays and speakers installed in the room #1 are the display 622-1 and speaker 623-1. Also, the memory 636 stores that the user B's room is the room #2, and the displays and speakers installed in the room #2 are the display 622-2 and speaker 623-2. Similarly, regarding the users C through E, the memory 636 also stores that the rooms of the users C through E are the rooms #3 through #5 respectively, and the displays and speakers installed in the rooms #3 through #5 are the displays 622-3 through 622-5 and the speakers 623-3 through 623-5 respectively.

Also, as shown in the table on the right side in FIG. 56, the memory 636 in FIG. 55 stores the rooms #1 through #5, and the sensors 637-1 through 637-5 (sensors #1 through #5) which are associated with the users A through E.

That is to say, the memory 636 stores that the sensor installed in the user A's room #1 is the sensor 637-1. Also, the memory 636 stores that the sensor installed in the user B's room #2 is the sensor 637-2. Similarly, regarding the users C through E as well, the memory 636 stores that the sensors installed in the rooms #3 through #5 of the users C through E are the sensors 637-3 through 637-5, respectively.

Accordingly, in the event that the user who regards the program detected by the tuner 611 as a favorite genre is determined with the data of the table on the left side in FIG. 56, the controller 631 can recognize which room the user's room is, and which sensor sends a detection signal representing whether or not the user, who regards the program detected by the tuner 611 as a favorite genre, is in his/her room, by referring to the data of the table on the right side in FIG. 56. Also, the controller 631 can recognize the display 622 and speaker 623 installed in the room. Accordingly, the controller 631 can recognize which display 622 and speaker 623 should be made to select by controlling the selectors 620 and 621.

Figure 57:
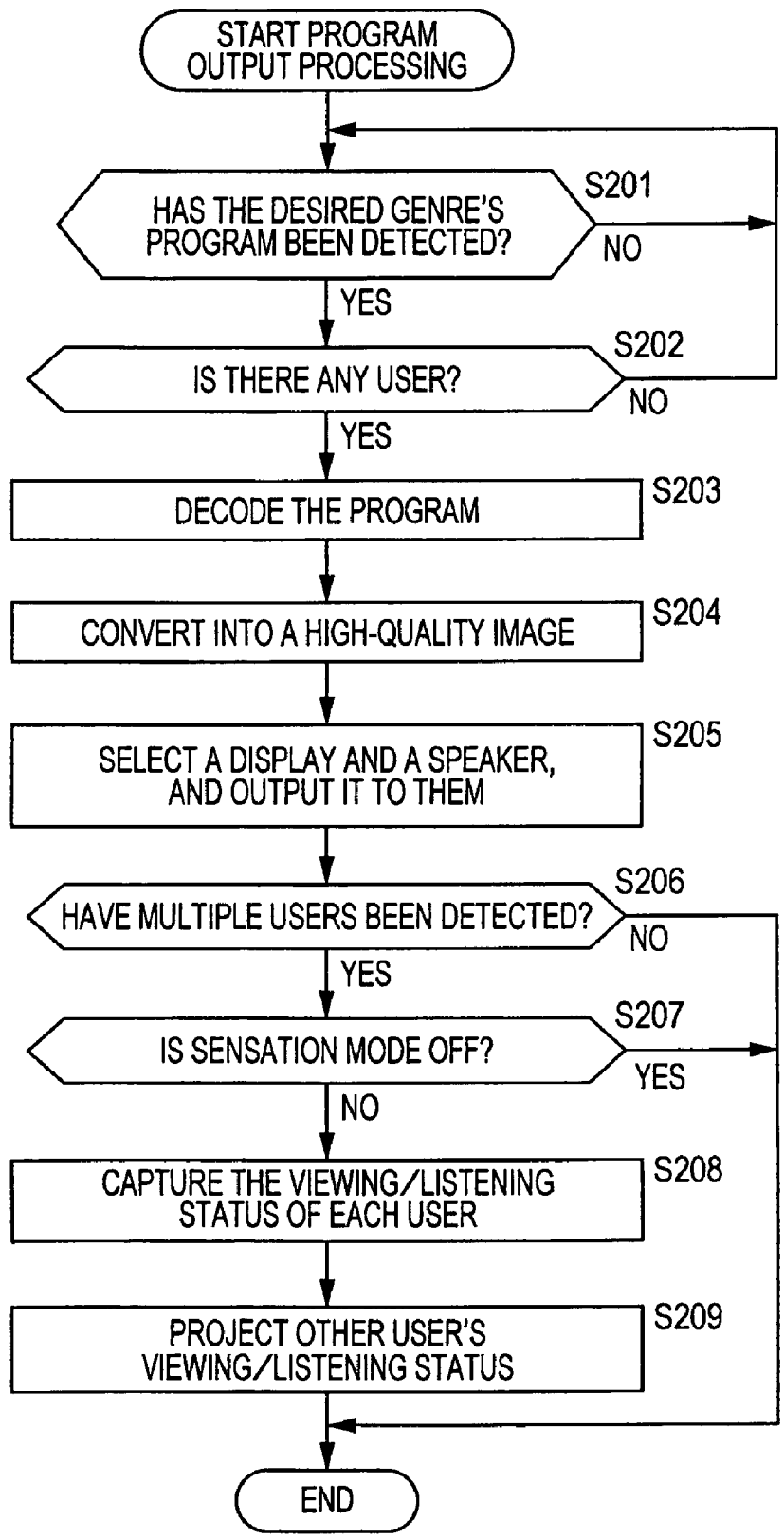
FIG. 57 is a flowchart describing program output processing.

Next, description will be made regarding program output processing in which the receiving device 601 in FIG. 55 outputs the images and voice of the program of the desired genre to the display and speaker in the room where a user is, with reference to FIG. 57. This processing is always performed, while the power supply of the receiving device 601 is turned on.

First, in step S201, the controller 631 determines whether or not the program corresponding to the desired (favorite) genres of the users A through E stored in the memory 636 has been detected from the broadcasting signals of the digital broadcasting input to the tuner 611 from the antenna, such as described with reference to FIG. 56. Subsequently, the processing in step S201 is repeated until the program corresponding to the desired (favorite) genres of the users A through E is detected.

In step S201, in the event that determination is made that the program corresponding to the desired (favorite) genres of the users A through E have been detected, the flow proceeds to step S202, where the controller 631 determines whether or not the user who desires the genre of the program detected in step S201 is in his/her room. That is to say, the controller 631 first determines regarding who the user desires the genre of the program detected in step S201 is with reference to the data of the table on the left side in FIG. 56 stored in the memory 636. Next, the controller 631 recognizes the room of the user who desires the genre of the program detected in step S201, and the sensor sensing the room with reference to the data of the table on the right side in FIG. 56 stored in the memory 636. Subsequently, the controller 631 determines whether or not from the sensor 637 installed in the room of the user who desires the genre of the program detected in step S201 a detection signal representing that the user is in the room has been received. Here, in the event that two or more users who desire the genre of the program detected in step S201 are present, determination is made regarding all of the users' rooms, whether or not the users are present.

In step S202, in the event that determination is made that no users are in the rooms of the users who desire the genre of the program detected in step S201, i.e., in the event that the controller 631 has not received detection signals detecting that the users are in the rooms, from the sensors 637 installed in the rooms #1 through #5 of the users A through E who desire the genre of the program detected in step S201, the flow returns to step S201.

On the other hand, in the event that determination is made that at least one user is in the rooms of the users who desire the genre of the program detected in step S201, i.e., in the event that the controller 631 has received a detection signal detecting that the user is in the room, from at least one of the sensors 637-1 through 637-5 installed in the rooms of the users who desire the genre of the program detected in step S201, the flow proceeds to step S203.

In step S203, the transport stream of the program detected by the tuner 611 is supplied to the demultiplexer 614 via the demodulating unit 612 and error-correction processing unit 613. Subsequently, of the TS packets of the user's favorite genre program, the demultiplexer 614 supplies the video data thereof to the video decoder 615, and supplies the audio data thereof to the audio decoder 616, respectively.

The video decoder 615 MPEG-decodes the video data of the TS packets from the demultiplexer 614 to supply this to the DRC unit 617.

Also, the audio decoder 616 MPEG-decodes the audio data of the TS packets from the demultiplexer 614 to supply this to the selector 621, and the flow proceeds to step S204 from step S203.

In step S204, the DRC unit 617 takes the MPEG-decoded video data output by the video decoder 615 as a first image signal, and transforms the first image signal into a high-quality (high-image-quality) image signal (second image signal) to supply this to the synthesizing unit 618. In the event that the video data to be superimposed is input from the OSD unit 619, the synthesizing unit 618 superimposes the video data which the OSD unit 619 outputs on the high-quality image signal supplied from the DRC unit 617 to output this to the selector 620. On the other hand, in the event that the video data to be superimposed is not input from the OSD unit 619, the synthesizing unit 618 outputs the high-quality image signal supplied from the DRC unit 617 to the selector 620 as it is.

The flow proceeds to step S205 from step S204, where of the rooms of the users who desire the genre of the program detected in step S201, the controller 631 controls the selectors 620 and 21 to select the displays 622 and speakers 623 of the rooms where the users are present, detected in step S202. The selector 620 outputs the video data supplied from the synthesizing unit 618 to the displays 622 selected under control of the controller 631. Accordingly, the high-quality image transformed from the image of the program detected by the tuner 611 is displayed on the displays 622 selected by the selector 620.

Also, the selector 621 outputs the audio data supplied from the audio decoder 16 to the speakers 623 selected under control of the controller 631. Accordingly, the voice of the program detected by the tuner 611 is output from the speakers 623 selected by the selector 621.

As described above, in steps S201 through S205, in the event that the program of the genre which the users desire is detected, detection is performed regarding whether or not the users who desire the detected genre are in their rooms, and the detected program can be output to all of the displays 622 and speakers 623 in the rooms where the users are.

Accordingly, by utilizing the features within the building according to the contents of the broadcasting signal of the digital broadcasting which the receiving device 601 receives, the users can view and listen to the contents (program) of the broadcasting signal in a way that is convenient for themselves, i.e., the users can view and listen to the programs of their desired genres without performing any operation.

The flow proceeds to step S206 from step S205, where the controller 631 determines whether or not the presence of users has been detected in two or more rooms when determining whether or not the users who desire the genre of the program detected in step S201 exit in step S202. In step S206, in the event that determination is made that it has not been detected that the users are in two or more rooms, i.e., in the event that a user is in one room alone in step S202, the flow skips steps S207 through S209, and processing ends.

On the other hand, in step S206, in the event that determination is made that users have been detected in two or more rooms, the flow proceeds to step S207, where the controller 631 determines whether or not the sensation mode is off. In step S207, in the event that determination is made that the sensation mode is off, the flow skips steps S208 and S209, and the processing ends.

On the other hand, in step S207, in the event that determination is made that the sensation mode is not off, the flow proceeds to step S208, where the controller 631 controls the cameras 721 installed in all of the rooms determined as the users exiting, to capture the viewing/listening situations of the users who are viewing/listening the program detected in step S201. The cameras 721 installed in the rooms determined where the users are present, starts capturing of the viewing/listening situations of the users who are viewing/listening to the program detected in step S201 under control of the controller 631, and the flow proceeds to step S209. Here, the capturing signals captured by the cameras 721 are supplied to the memory 636 to be stored therein temporarily.

In step S209, the movie projectors 722 installed in all of the rooms regarding which determination has been made that the users are present in step S202 starts projection of the viewing/listening situations of the users of the other rooms who are viewing/listening to the program, which are supplied from the memory 636, under control of the controller 631, and the processing ends.

As described above, in steps S206 through S209, in the event that determination is made that two or more users are present, and also the sensation mode is on, in the room of the user who is viewing/listening to the program, the viewing/listening situations of the other users who are viewing/listening to the same program are projected.

Thus, the movie projectors 722 can give the user who is viewing/listening to the program visual impressions as if the rooms of other users who are viewing/listening to the same program are present in his/her room (as if the user is in the same room as the other user who is viewing/listening to the same program). That is to say, the image modifying unit 722 can visually change the configurations of the rooms. As a result, the user who is viewing/listening the desired genre program in his/her room alone can be given feeling that he/she is viewing/listening to the program together with the other users (the users of the other rooms), whereby the users can get (feel) a sense of togetherness, presence, and so forth at the time of viewing/listening to a program.

Accordingly, by utilizing the features within the building according to the contents of the broadcasting signal of the digital broadcasting which the receiving device 601 in FIG. 55 receives, the users can view and listen to the contents (program) of the broadcasting signal in a manner that is convenient for them.

Figure 58:
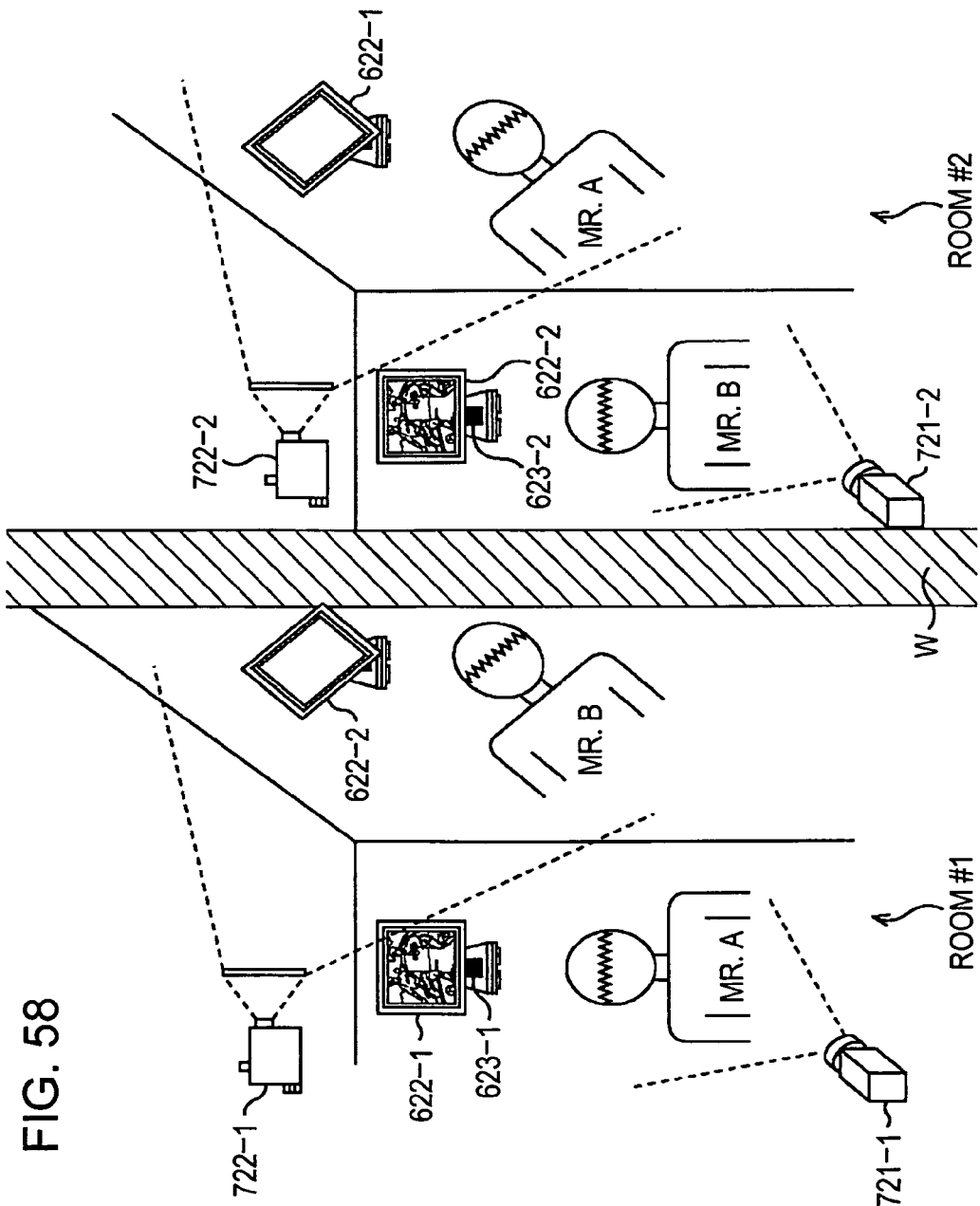
FIG. 58 is a diagram illustrating the situation of a user's room in the program output processing.

FIG. 58 is a diagram describing a state in which when the sensation mode is on, in the room of the user who is viewing/listening to a program the viewing/listening situation of another user who is viewing/listening to the same program in another room is projected.

In FIG. 58, the user A's room #1 and the user B's room #2 are adjacently disposed across the wall W. Also, with the room #1, the display 622-1, speaker 623-1 (integrated with the display 622-1 in FIG. 58), camera 721-1, and movie projector 722-1 are fixedly installed in a predetermined place such as the wall, ceiling of the room. Similarly, with the room #2, the display 622-2, speaker 623-2 (integrated with the display 622-2 in FIG. 58), camera 721-2, and movie projector 722-2 are fixedly installed in a predetermined place such as the wall, ceiling of the room.

The users A and B are viewing/listening to the relay program (the genre corresponds to soccer) of a soccer game in each of the rooms #1 and #2. The displays 622-1 and 622-2 installed in the rooms #1 and #2 are displaying the image of the relay program of the soccer game. Also, in FIG. 58, the voice of the relay program of the soccer game is outputting from the speakers 623-1 and 623-2 which are integrated with the displays 622-1 and 622-2.

The camera 721-1 in the room #1 is capturing the viewing/listening situation in which the user A is viewing/listening to the relay program of the soccer game in the room #1. Similarly, the camera 721-2 in the room #2 is capturing the viewing/listening situation in which the user B is viewing/listening to the relay program of the soccer game, which is the same program, in the room #2.

The movie projector 722-1 in the room #1 is projecting the image of the viewing/listening situation in which the user B is viewing/listening to the relay program of the soccer game which was captured by the camera 721-2 in the room #2 on the wall. Similarly, the movie projector 722-2 in the room #2 is projecting the image of the viewing/listening situation in which the user A is viewing/listening to the relay program of the soccer game which was captured by the camera 721-1 in the room #1 on the wall, at the right side in the drawing.

Accordingly, the user A in the room #1 can obtain (physically feel) the sense of viewing/listening the relay program of the soccer game together with the user B who is viewing/listening the same program in the room #2. Similarly, the user B in the room #2 can obtain (physically feel) the sense of viewing/listening the relay program of the soccer game together with the user A who is viewing/listening the same program in the room #1.

With the above fourth embodiment, an arrangement has been made wherein upon the sensation mode being turned on or off at the receiving device 601, the sensation mode is turned on or off regarding all of the users (user rooms) who desire the genre of the program detected by the tuner 611, but an arrangement may be made wherein the sensation mode is turned on or off for each user (user room), and the viewing/listening situation of another user who is viewing/listening to the same program is projected only as to the users whose sensation mode is on.

For example, when the users A and B view and listen to a program in the rooms #1 and #2 respectively, in the event that the users A and B are both on in the sensation mode, the viewing/listening situation of the user B is projected (displayed) on the wall or floor of the user A's room, and the viewing/listening situation of the user A is projected (displayed) on the wall or floor of the user B's room. On the other hand, in the event that the users A and B are both have the sensation mode off, the viewing/listening situations of neither of the users are projected on the wall or floor of the other's room.

Also, for example, of the users A and B, in the event that the user A is on in the sensation mode, but the user B is off in the sensation mode, the user B's viewing/listening situation is projected on the wall or floor of the room #1 of the user A whose sensation mode is on. On the other hand, the user A's viewing/listening situation is not projected in the room #2 of the user B whose sensation mode is off. However, in the event that the user B does not want to show his/her viewing/listening situation to the other room's user, the user B can prevent his/her viewing/listening situation from showing (projecting) to the other room's user.

Also, in the event that three or more users are viewing/listening the same program, when the movie projectors 722 project in-room a user's viewing/listening situation captured in another room, of the other rooms which are viewing/listening the same program, the viewing/listening situation of any one of the users may be projected, or the viewing/listening situations of all of the users' rooms may be projected.

For example, in the event that four users: A, B, C, and D, are viewing/listening to the same program, the image which the movie projector 722-1 of the room #1 of the user A projects (displays) may be the image of the viewing/listening situation of any one of the users B, C, and D, or may be the image of the viewing/listening situations of all of the three users: B, C, and D.

With the above fourth embodiment, an arrangement has been made wherein the broadcasting signal detected by the tuner 611 is a digital broadcasting signal, but the present invention is not restricted to broadcasting signals of digital broadcasting, and can be applied to analog broadcasting signals as well. Further, the broadcasting media is not restricted to terrestrial wave, satellite broadcasting, CATV (Cable Television), or the like.

Also, with the above fourth embodiment, an arrangement has been made wherein the displays 622-1 through 622-5 and speakers 623-1 through 623-5 are a part of the configuration of the receiving device 601, but the receiving device 601 may be configured so as to connect to the other displays and speakers.

Further, the above fourth embodiment has been described as comprising one tuner, but an arrangement may be made wherein two or more tuners are provided, and the programs of two or more desired genres are received.

The above receiving device 601 can be employed as the receiving device of a television receiver, for example.

Note that with the present specification, steps described in a program recorded in a recording medium include processing to be performed serially in time sequence, of course, but are not restricted to being performed in time sequence and also include processing to be performed in parallel or individually.

Also, with the present specification, the term "system" represents the entire equipment made up of two or more devices.

Further, the program may be processed by one computer, or may be processed in a dispersive manner by two or more computers. Also, the program may be a program which is transferred to a remote computer to be executed.

Further, the present invention is not restricted to a house serving as a residence, and can be applied to any building, such as a multi-level concrete-and-steel building.

The invention claimed is:

1. A control device for controlling components of a building, comprising:
    control means for changing a configuration of at least one component of components making up said building;
    acquiring means for acquiring status information; and
    determining means for determining an importance of said status information acquired by said acquiring means,
    wherein, based on said importance of said status information acquired by said acquiring means, said control means applies current to a shape-variable member disposed around a point of entry in said building to transform said shape-variable member from a shape-fixed state to a shape-variable state to physically deform a shape of said shape-variable member.

2. The control device according to claim 1, wherein said status information includes information indicating at least one of a status of a person present in said component, illumination in said component, temperature in said component, volume in said component, information to be transmitted by broadcasting, and point-in-time.

3. The control device according to claim 1, further comprising status information storing means for storing a list relating to said status information.

4. A control method of a control device for controlling components of a building including:
    changing a configuration of at least one component of components making up said building;
    acquiring status information; and
    determining an importance of said status information,
    wherein, based on said importance of said status information, said changing the configuration of at least one component of components making up said building applies current to a shape-variable member disposed around a point of entry in said building to transform said shape-variable member from a shape-fixed state to a shape-variable state to physically deform a shape of said shape-variable member.

5. A building, comprising:
    control means for changing a configuration of at least one component of components making up said building;
    acquiring means for acquiring status information; and
    determining means for determining an importance of said status information acquired by said acquiring means, wherein,
    based on said importance of said status information acquired by said acquiring means, said control means applies current to a shape-variable member disposed around a point of entry in said building to transform said shape-variable member from a shape-fixed state to a shape-variable state to physically deform a shape of said shape-variable member.

6. The control device according to claim 1, wherein, based on said status information acquired by said acquiring means, said control means displays images on an inner portion of said building to visually change said configuration.

7. The control method according to claim 4, wherein, based on said status information, said changing the configuration of at least one component of components making up said building displays images on an inner portion of said building to visually change said configuration.

8. The building according to claim 5, wherein, based on said status information acquired by said acquiring means, said control means displays images on an inner portion of said building to visually change said configuration.

9. The building according to claim 5, wherein said status information includes information indicating at least one of a status of a person present in said component, illumination in said component, temperature in said component, volume in said component, information to be transmitted by broadcasting, and point-in-time.

10. The building according to claim 5, further comprising status information storing means for storing a list relating to said status information.

11. A control device for controlling components of a building, comprising:
   a control unit configured to change a configuration of at least one component of components making up said building;
   an acquiring unit configured to acquire status information; and
   a determining unit configured to determine an importance of said status information acquired by said acquiring unit,
   wherein, based on said importance of said status information acquired by said acquiring unit, said control unit applies current to a shape-variable member disposed around a point of entry in said building to transform said shape-variable member from a shape-fixed state to a shape-variable state to physically deform a shape of said shape-variable member.

12. The control device according to claim 11, wherein said status information includes information indicating at least one of a status of a person present in said component, illumination in said component, temperature in said component, volume in said component, information to be transmitted by broadcasting, and point-in-time.

13. The control device according to claim 11, further comprising a status information storing unit for storing a list relating to said status information.

14. The control device according to claim 11, wherein, based on said status information acquired by said acquiring unit, said control unit displays images on an inner portion of said building to visually change said configuration.

15. The control device according to claim 1, wherein the shape-variable member is made of a shape memory alloy material.

16. The control device according to claim 1, wherein the shape-variable member is a door frame.

17. The control device according to claim 1, wherein, based on said importance of said status information acquired by said acquiring means, said control means controls power supply to an electric socket disposed in said building to physically change said configuration.

18. The control method according to claim 4, wherein, based on said importance of said status information, said changing the configuration of at least one component of components making up said building controls power supply to an electric socket disposed in said building to physically change said configuration.

19. The building according to claim 5, wherein, based on said importance of said status information acquired by said acquiring means, said control means controls power supply to an electric socket disposed in said building to physically change said configuration.

20. The control device according to claim 11, wherein, based on said importance of said status information acquired by said acquiring unit, said control unit controls power supply to an electric socket disposed in said building to physically change said configuration.

* * * * *